United States Patent [19]

Masuda et al.

[11] Patent Number: 4,530,063

[45] Date of Patent: Jul. 16, 1985

[54] IMAGE FORMING DEVICE

[75] Inventors: Shunichi Masuda, Tokyo; Katsuichi Shimizu, Hoya; Toshiaki Yagasaki, Hino; Hisashi Sakamaki, Yokohama, all of Japan

[73] Assignee: Canon Kabushiki Kaisha, Tokyo, Japan

[21] Appl. No.: 406,315

[22] Filed: Aug. 9, 1982

Related U.S. Application Data

[63] Continuation of Ser. No. 83,643, Oct. 11, 1979, abandoned.

[30] Foreign Application Priority Data

| | | | |
|---|---|---|---|
| Oct. 15, 1978 | [JP] | Japan | 53-126720 |
| Oct. 15, 1978 | [JP] | Japan | 53-126722 |
| Oct. 15, 1978 | [JP] | Japan | 53-126723 |
| Oct. 15, 1978 | [JP] | Japan | 53-126726 |
| Oct. 15, 1978 | [JP] | Japan | 53-126727 |
| Oct. 15, 1978 | [JP] | Japan | 53-126728 |
| Nov. 2, 1978 | [JP] | Japan | 53-135201 |
| Dec. 11, 1978 | [JP] | Japan | 53-153375 |
| Dec. 11, 1978 | [JP] | Japan | 53-153372 |
| Dec. 11, 1978 | [JP] | Japan | 53-153378 |

[51] Int. Cl.[3] ...................... G06F 15/20; G03G 21/00

[52] U.S. Cl. .................................. 364/518; 355/14 R

[58] Field of Search ............... 364/137, 518, 107, 523, 364/525; 356/14 R, 14 C, 14 E, 145 H; 355/14 R, 14 C

[56] References Cited

U.S. PATENT DOCUMENTS

| | | | |
|---|---|---|---|
| 4,099,860 | 7/1978 | Connin | 355/14 |
| 4,107,779 | 8/1978 | Fisk et al. | 364/518 |
| 4,133,477 | 1/1979 | Marino et al. | 371/20 |
| 4,144,550 | 3/1979 | Donohue et al. | 364/107 |
| 4,188,668 | 2/1980 | Finlay | 355/14 R X |
| 4,198,680 | 4/1980 | Gray | 364/518 |
| 4,280,763 | 7/1981 | Arai et al. | 364/518 X |
| 4,343,036 | 8/1982 | Shimizu et al. | 364/518 |

*Primary Examiner*—Edward J. Wise

*Attorney, Agent, or Firm*—Fitzpatrick, Cella, Harper & Scinto

[57] ABSTRACT

A printing or copying apparatus of a type provided with a recording medium, operable device for forming an image on the recording medium, device for operating a first signal required for the timing operation of the operable device, keys for instructing to start or stop the execution of image formation, first control device controlling the operable device in accordance with the first signal, and which comprises a memory for storing a program for operation control of the operable device for image formation, and second control device for controlling the first control device in accordance with the key instructing device for controlling the execution of image formation and for controlling at least one of the operable devices, and which comprises a memory for storing a program for operation control of the first control device.

38 Claims, 86 Drawing Figures

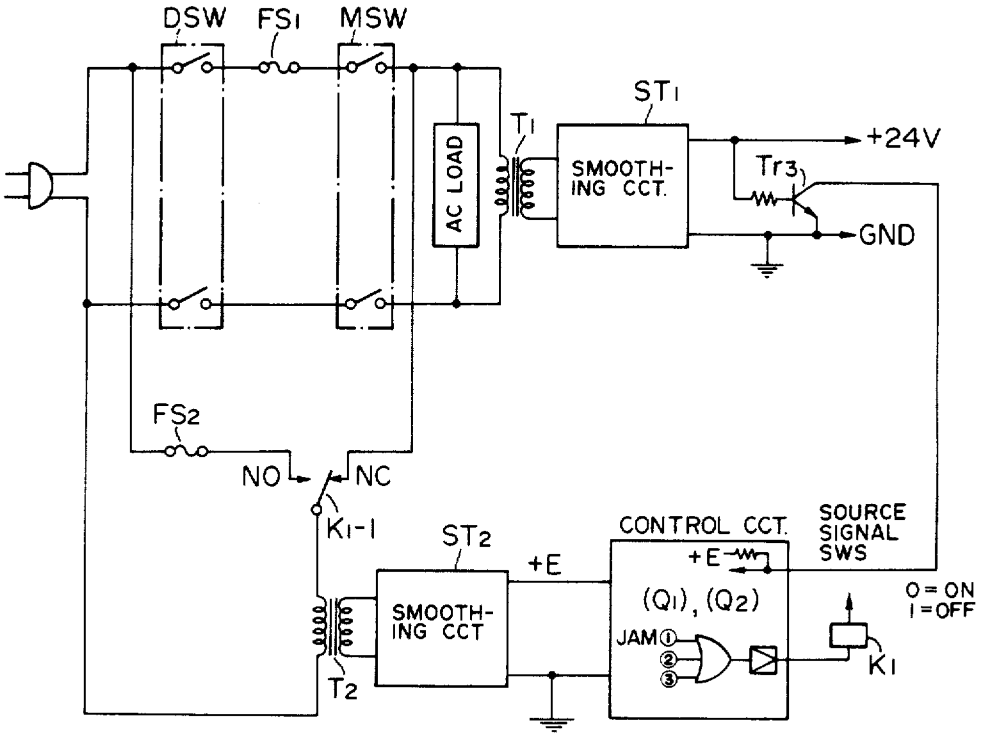
FIG. 9
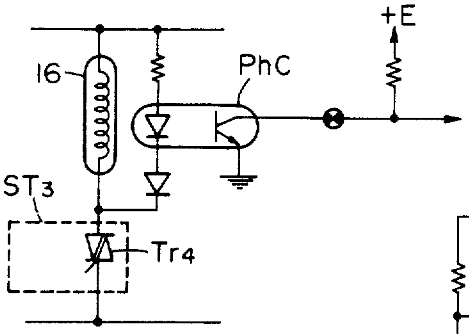
FIG. 10
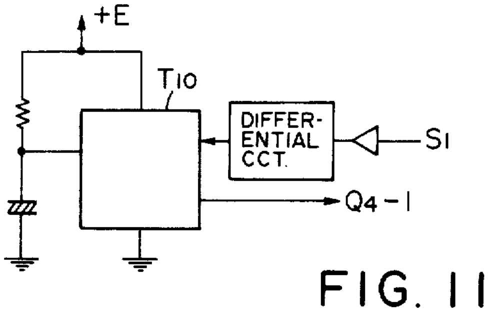
FIG. 11
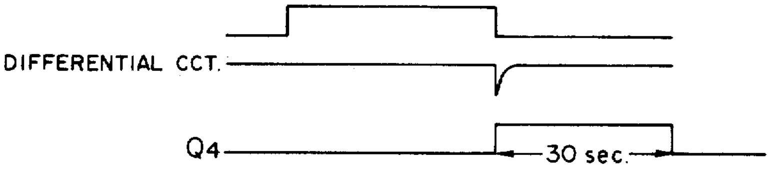

| | COPY-KEY | | | ORIGINAL STAND-BY | C-KEY | | | INTERRUPTION KEY | | | STOP-KEY | | |
|---|---|---|---|---|---|---|---|---|---|---|---|---|---|
| | ④ | ⑤ | ⑥ | ⑥ | ④ | ⑤ | ⑥ | ④ | ⑤ | ⑥ | ④ | ⑤ | ⑥ |
| (1) COPY=SET | ○ | ○ | 0 → COPY | 0 → COPY | ○ | ○ | ⊠ | W | ○ | ⊠ | × | ○ | ⊠ |
| (2) STOP KEY | ○ | ○ | 0 → COPY | 0 → COPY | ○ | ○ | ⊠ | W | ○ | ⊠ | ⊠ | ○ | ⊠ |
| (3) NO SHEET | × | ○ | COPY → COPY | ⊠ / 0 → COPY (AFTER C KEY & INTERRUPTION) | ○ | ○ | ⊠ | W | ○ | ⊠ | × | ○ | ⊠ |
| (4) INTERRUPTION KEY | × | ○ | 0 → COPY | 0 → COPY | × | ○ | ⊠ | × | × / ○ (AFTER STOP) | ⊠ | × | ○ | ⊠ |
| (5) JAM | × | × / ○ (AFTER RELEASE) | COPY → COPY | ⊠ / 0 → COPY (AFTER C KEY & INTERRUPTION) | × | × / ○ (AFTER RELEASE) | ⊠ | × | × / ○ (AFTER RELEASE) | ⊠ | × | × / ○ (AFTER RELEASE) | ⊠ |

FIG. 18-1A

| UP/DOWN KEY | | | TEN-KEY | | | ADF ENABLE | | | ORIGINAL OFF LAMP | | | WHEN JAMING DURING BACKWARD ROTATION | WHEN OCCURING NO SHEET DURING BACKWARD ROTATION |
|---|---|---|---|---|---|---|---|---|---|---|---|---|---|
| ④ | ⑤ | ⑥ | ④ | ⑤ | ⑥ | ④ | ⑤ | ⑥ | ④ | ⑤ | ⑥ | | |
| O | O | | × / O | × / O | | O | O | × | O | O | × | SPEC. (1) | SPEC. (1) |
| O | O | | × / O | × / O | | O | O | × | O | O | × | SPEC. (2) | SPEC. (2) |
| O | O | | × / O | × / O | | × | × / O | × | × | × | × | SPEC. (1) | |
| × | O | | × | O | | O | O | × | O | O | × | AFTER RELEASE INTER-RUPTION | SPEC. (4) |
| × | × / O | | × | × / O | | × | × / O | × | × | × | × | | SPEC. (5) |

AFTER RELEASE; AFTER C KEY; AFTER RELEASE & C KEY; AFTER C KEY; AFTER RELEASE, C KEY & INTERRUPTION

FIG. 18-1B

| UP/DOWN KEY | | | TEN-KEY | | | ADF ENABLE | | | ORIGINAL OFF LAMP | | | WHEN JAMING DURING BACKWARD ROTATION | WHEN OCCURING NO SHEET DURING BACKWARD ROTATION |
|---|---|---|---|---|---|---|---|---|---|---|---|---|---|
| ④ | ⑤ | ⑥ | ④ | ⑤ | ⑥ | ④ | ⑤ | ⑥ | ④ | ⑤ | ⑥ | | |
| X | O | | X | X / O | | O | O | X | O | O | X | SPEC. (4) | SPEC.(1) |
| X | O | | X | X / O | | O | O | X | O | O | X | SPEC.(4) | SPEC.(2) |
| X | O | | X | X / O | | X | X / O | X | X | X | X | SPEC.(4) | |
| X | X / O | | X | X / O | | X | X / O | X | X | X | X | | SPEC.(4) |

AFTER RELEASE
AFTER C KEY
AFTER STOP KEY & C KEY
AFTER RELEAS, STOP KEY & C KEY

FIG. 18-2B

| | COPY-KEY | | | ORIGINAL STAND-BY | C-KEY | | | INTERRUPTION KEY | | | STOP-KEY | | |
|---|---|---|---|---|---|---|---|---|---|---|---|---|---|
| | ④ | ⑤ | ⑥ | ⑥ | ④ | ⑤ | ⑥ | ④ | ⑤ | ⑥ | ④ | ⑤ | ⑥ |
| (1) WHEN COPY=SET | X | O | O → COPY | O→COPY | X | O | | X | O | | X | O | |
| (2) STOP KEY | X | O | O → COPY | O→COPY | X | O | | X | O | | X | O | |
| (3) NO PAPER | X | O | COPY → COPY | O→COPY (AFTER C KEY) | X | O | | X | O | | X | O | |
| (4) JAM | X | O (AFTER RELEAS) | COPY → COPY | O→COPY (AFTER C KEY) | X | X → O (AFTER RELEAS) | | X | X | | X | X | |

FIG. 18-3A

| UP DOWN KEY ④ | UP DOWN KEY ⑤ | UP DOWN KEY ⑥ | TEN-KEY ④ | TEN-KEY ⑤ | TEN-KEY ⑥ | ADF ENABLE ④ | ADF ENABLE ⑤ | ADF ENABLE ⑥ | ORIGINAL OFF LAMP ④ | ORIGINAL OFF LAMP ⑤ | ORIGINAL OFF LAMP ⑥ | WHEN JAMING DURING BACKWARD ROTATION | WHEN OCCURING NO SHEET DURING BACKWARD ROTATION |
|---|---|---|---|---|---|---|---|---|---|---|---|---|---|
| × | ○ | ⊠ | × | × → ○ (AFTER C KEY) | ⊠ | ○ | ○ | × | × | × | × | SPEC. (4) | SPEC. (1) |
| × | ○ | ⊠ | × | × → ○ (AFTER C KEY) | ⊠ | ○ | ○ | × | × | × | × | SPEC. (4) | SPEC. (2) |
| × | ○ | ⊠ | × | × → ○ (AFTER C KEY) | ⊠ | × | × → ○ (AFTER C KEY) | × | × | × | × | SPEC. (4) | ⊠ |
| × | × → ○ (AFTER RELEAS) | ⊠ | × | × → ○ (AFTER RELEAS & C KEY) | ⊠ | × | × → ○ (AFTER RELEAS & C KEY) | × | × | × | × | ⊠ | SPEC. (4) |

FIG. 18-3B

IMAGE FORMING DEVICE

This is a continuation of application Ser. No. 083,643, filed Oct. 11, 1979 now abandoned.

BACKGROUND OF THE INVENTION

1. Field of the Invention

This invention relates to an image forming device such as reproduction apparatus, and so forth.

2. Description of the Prior Art

There has so far been known a reproduction apparatus of a type, in which the process sequence control is carried out by a computer program. In this type of reproduction apparatus, however, as the apparatus becomes sophisticated in mechanism so that it may have verstile functions of high speed copying operation, of making reproduction copies on various sizes of paper, of automatic feeding of image originals, and so on, there inevitably occurs increase in the amount of information inputs for the reproduction, operating loads for simultaneous actuations of various components in the apparatus, and number of indicators and displays, whereby giving and receiving of signals within the reproduction apparatus becomes very frequent. On account of this, there would arise various inconveniences with the computer program which can primarily process those input data with a time sequence such that entry timing and entry pattern of the input informations relative to the copying operation are very limited, and an indicator for the copy number cannot be operated with the same time interval during execution of the sequence to thereby cause flickering.

In the conventional original automatic feeders (hereinafter abbreviated as "ADF"), there are such types that: (1) feeding and discharging of the image originals are carried out in association with driving force of the reproduction apparatus without a driving source and a control section for its own being provided; and (2) feeding and discharging of the image originals are carried out by receipt of control signals from the reproduction apparatus with the driving source for ADF's own being provided. However, it is extremely difficult and complicated in such subordinate relationship between ADF and the reproduction apparatus as mentioned above to positively discriminate the operating conditions for the ADF and to control the operational timing and prohibition of the operations. Also, when errors in input and output of the reproduction and detection informations increase, the key entry for the copying operations becomes impossible at all.

In the reproduction apparaus which continuously makes copies depending on preset number of copy sheet, an apparatus having such functions of interrupting its continuous copying operation, replacing an original image for copying, and, thereafter, executing copying of the remaining number of sheet for the continuous copying, i.e., interrupting function, has become common. In this type of reproduction apparatus, however, when the conditions for the interruption copying such as set number of sheet for interruption etc. are uniformly instructed to each of the process modes during execution of the copy cycle, or during an interval between previous and subsequent copy cycles, or during stoppage prior to commencement or after termination of the copying operations, there arises such apprehension that the number of copy sheet, etc. before the interruption becomes difficult to be distinguished.

In the reproduction apparatus having the ADF, the feeding and discharging of the image originals are controlled in accordance with the reproduction operations, on account of which much time is required for setting the image original when the reproduction operation is stopped due to shortage in the reproduction paper, jamming of the reproduction paper, and others, after which such interrupted operation is released to resume the reproduction operation. In this consequence, there has been such inconveniences that resumption of the reproduction operation is delayed, and the reproduction speed is slowed down accordingly.

The reproduction apparatus in general has a function of detecting paper jammed in the reproduction apparatus and discontinuing the reproduction operations so as to prevent any trouble in the reproduction operations. This function is performed by a sensor provided in the paper feeding path, depending on whether it detects the paper at a predetermined timing, or not. However, in case the paper jamming takes place frequently to repeat interruption of the reproduction, such frequent disorder is due to the mechanical and electrical component parts in the reproduction apparatus being out of order or operating erroneously. Also, when the sensor for detecting the paper jamming is out of order, it occurs sometimes that the reproduction operation is repeatedly interrupted in spite of the paper being regularly conveyed. Moreover, when the paper jamming takes place withing the innermost part of the paper feeding path, it is difficult to locate the place where the paper jamming has taken place, and to remove the paper at jammed, whereby re-starting of the reproduction operation becomes apprehensively impossible.

With the recent tendency to high performance and high speed operation in the reproduction apparatus, the electrical control section of the apparatus becomes highly sophisticated with the consequence that a very slight trouble in the electrical driving system in the machine develops into a serious disorder in the reproduction apparatus as a whole, hence its detection in operations. Even if the trouble is not so serious, considerable time and labor should be expended for repair and mending of the disordered machine.

The exposure surface of the image original mounting table in the reproduction apparatus (hereinafter simply called "platen") is subjected from time to time to breakage due to temperature increase through high temperature light irradiation or prolonged light irradiation. In order to prevent such temperature rise in the platen, there is sometimes provided a heat expelling blower to cool the surface of this platen or the neighborhood area of the exposure lamp. Even with provision of such heat expelling blower, the platen is exposed to a danger of high temperature due to continued reproduction operations over a long period of time, or reduction in operating function of this blower, or unusually continued lighting of the exposure lamp.

When two loads, which should not be driven simultaneously, such as the forwarding and returning clutches for reciprocating a scanning means in a conventional scanning type reproduction apparatus, happen to be operated simultaneously due to a disorder in the control means, it is not possible to foresee what kind of unexpected mechanical trouble would arise. Also, when very large operating loads of high electric consumption, which are not usually driven simultaneously, are driven at the same time, there would be high possibility of excessive electric current flowing through the circuit to bring about the short-circuit, and other dangerous situations.

Further, in some reproduction apparatuses, there is provided means for detecting oblique forwarding of the reproduction paper. In the apparatus of a system, wherein the oblique forwarding is detected with one pattern irrespective of whether the reproduction paper is large or small in size, even when the detected result reveals the regular forwarding with the small sized paper, jamming would sometimes take place with a large-sized paper.

In the reproduction apparatus of a type, wherein the jamming of the reproduction paper is detected and the machine is locked to be inoperative, if the release of the machine locking is done by a switch installed in the machine disregards the location of the jamming, the paper removing operation becomes extremely troublesome, in case the jammed paper can be taken out very easily.

In other type of the reproduction apparatus, there is such one that the number of the reproduction paper wasted by jamming is subtracted from the total number to be reproduced and the remaining number of the copy sheet is indicated on an indicator. It is, however, very difficult to determine the number of paper to be wasted by such jamming, when a plurality of sheets of paper exist in a long paper feeding path of the reproduction apparatus. In addition, removal of such plurality of sheets requires much labor, and takes long time until its re-starting.

In the conventional image-transfer type reproduction apparatus, the feeding of the image transfer paper has been controlled by detecting a particular reciprocating point of the exposure scanning system so as to carry out transfer of the toner image on the photosensitive body onto the image transfer paper in exact registration therebetween. However, in case the paper feeding path for the image transfer paper is long, or the image transfer paper is continuously fed in, the number of rollers for the paper feeding increases, or rotation of the rollers increases, with the consequence that there takes place slipping of the image transfer paper depending on its quality to make it difficult to perform accurate paper feeding, or to cause displacement in the image transfer position, or to cause paper jamming.

Weight of the reciprocating members such as optical system, image original mounting table, and so forth are rather heavy, hence the returning speed of these members is made higher than that at the time of the exposure so as to shorten the time for returning them to their original positions after completion of the exposure. Accordingly, it occurs that the image original mounting table collides with the terminal end of the reciprocating motion at the end of the movement. With such collision of the reciprocating member, shock is imparted to the optical system and other components parts of the reproduction apparatus to disorder its optical axis, or shorten the life of the exposure lamp, or cause displacement in the transferred image.

In order to rectify a slant movement of the image transfer paper, the register roller to forward the paper to the image transfer section forms a slackened portion or loop in the image transfer paper, after which it sends the image transfer paper to the image transfer position by its rotation at a predetermined timing which coincides with the tip end of the formed image at the image transfer position. However, in case the quantity of the slackened portion is not accurately controlled, the image transfer operation is done without the slant movement being sufficiently rectified, or, to the worst of the case, jamming of the paper is resulted.

SUMMARY OF THE INVENTION

It is the primary object of the present invention to provide an image forming device, from which the afore-described various disadvantages have been removed.

It is the secondary object of the present invention to provide an image forming device which utilizes an improved process controller due to a computer program.

It is the third object of the present invention to provide a reproduction system capable of controlling various related devices for the reproduction apparatus with less signal lines.

It is the fourth object of the present invention to provide an image forming device which is capable of controlling possibilities of introducing the image forming conditions and instructions as inputs in various ways in accordance with machine modes of variety so as to facilitate operation of the machine.

It is the fifth object of the present invention to provide an image forming device of high reliability, from which possible errors in the input operation and control operation of the image forming conditions and instructions have been reduced.

It is the sixth object of the present invention to provide an image forming device which makes it possible to perform an interruption copying even in the sequence process mode, and to verify various informations such as number of copy sheet remaining due to interruption of the reproduction operation by such interruption copying.

It is the seventh object of the present invention to provide an ADF reproduction apparatus which is easy in handling, and which is capable of controlling feeding and discharging of the image originals in accordance with discontinuance and completion of the reproduction process, or natural interruption, or artificial interruption.

It is the eighth object of the present invention to provide an image forming device capable of performing overall monitoring of the machine, wherein the apparatus has an examination mode for constantly monitoring any disorder in any component parts of the machine, and another examination mode to check any disorder within any particular time period, and also checks any disorder in a sensor for taking operating timing of each component part, and another sensor to detect paper jamming and other troubles.

It is the ninth object of the present invention to provide an image forming device, which is capable of indicating an area of location in the paper feeding path where the paper jamming takes place, of statically indicating the entire paper feeding path and flash-indicating the jammed position to make the warning more distinct, and further of re-checking the detector after detection of the trouble so as to confirm the exact location of the trouble such as paper jamming, etc.

It is the tenth object of the present invention to provide an image forming device, which is capable of monitoring individual process drive control sections to indicate any troubled or disordered section, i.e., any trouble within the machine is prevented beforehand by discriminating a logical state between the electrical signal input into the control section and the electrical signal output from the control section to detect the trouble.

It is the eleventh object of the present invention to provide an image forming device, capable of controlling to bring the driving conditions to a safe side, when a plurality of process loads, which are not usually driven simultaneously, are driven simultaneously.

It is the twelfth object of the present invention to provide an image forming device which is capable of not only preventing the platen from damage under any circumstances, but also clearly indicating which is the cause for turning-off of the lamp, thereby facilitating the measures to be taken by an operator concerning the lamp.

It is the thirteenth object of the present invention to provide an image forming device capable of checking troubles in the device in utilization of a timing signal generator for executing the process, whereby there becomes no necessity for particularly providing a reference signal generator for checking the troubles, and the examination of troubles occurred in the reproduction apparatus can be done with a simple construction.

It is the fourteenth object of the present invention to provide an image forming device to carry out oblique movement of copy sheets irrespective of their sizes, whereby the oblique movement of the sheet at the paper feeding starting section can be readily disposed of to make it possible to promptly re-start the reproduction operation, unlike the jamming trouble within the machine.

It is the fifteenth object of the present invention to provide an image forming device, in which lost number of sheets due to jamming is counted and displayed in consideration of the location where the jamming takes place, the size of the jammed paper, and the timing for processing the jam, whereby the optimum copy numbers can be displayed.

It is the sixteenth object of the present invention to provide an image forming device which is capable of collecting the jammed sheet at one specific location where the wheets are most readily removable.

It is the seventeenth object of the present invention to provide an image forming device which prevents occurrence of paper jamming due to quality of the sheet, slipping of the sheet feeding means per se, and so forth, even when the sheet feeding path is fairly long or the sheet feeding means are in a plurality of numbers, so that an image may be formed on an accurate position on the image transfer sheet.

It is the eighteenth object of the present invention to provide a reproduction apparatus which is capable of preventing a scanning member from any external shock at the terminal end of a scanning path with a simple construction, of reinstating the scanning member to its initial position by shutting off a blank moving force with a signal corresponding to the movement of the member, and of reinstating the scanning member with a predetermined moving force so as to quickly set the same at the initial position, when the scanning member is out of its initial position prior to commencement of the scanning operation, thereby smoothly re-starting the reproduction operation.

It is the nineteenth object of the present invention to provide a reproduction apparatus which is capable of shortening as far as possible the time required for the reproduction operation by an operator by means of detection of the image original and the display control, and of preventing any image original for reproduction from being excluded due to overlook, thereby highly improving operability of the device by the operator.

BRIEF DESCRIPTION OF THE DRAWING

FIG. 1-2 is a cross-sectional view of the ADF;

FIG. 2 is a plan view of an operating panel for the reproduction apparatus shown in FIG. 1-1;

FIGS. 5-1 to 5-4 are time charts for the operational timing and the control signals for the operational control circuit shown in FIG. 4;

FIG. 9 shows a power source circuit;

FIG. 10 shows a halogen lamp circuit;

FIG. 11 shows a timer circuit;

FIG. 14-1 shows a driver examination circuit;

FIG. 14-2 shows a main motor and clock source examination circuit;

FIG. 14-3 is an operational time chart for the circuit shown in FIG. 14-2;

FIG. 14-4 shows a potentiometer examination circuit;

FIG. 14-5 shows a fuse detection circuit;

FIGS. 15-1 to 15-4 are management control flow charts;

FIGS. 18-1 to 18-3 are tables showing the key entry and other conditions;

FIGS. 29-1 to 29-3 are respectively explanatory diagrams for back-home position;

DESCRIPTION OF THE PREFERRED EMBODIMENTS

In the following, the present invention will be described in detail in reference to the accompanying drawings for each component and its operation in the image forming device.

(Reproduction Device)

Figure 1:
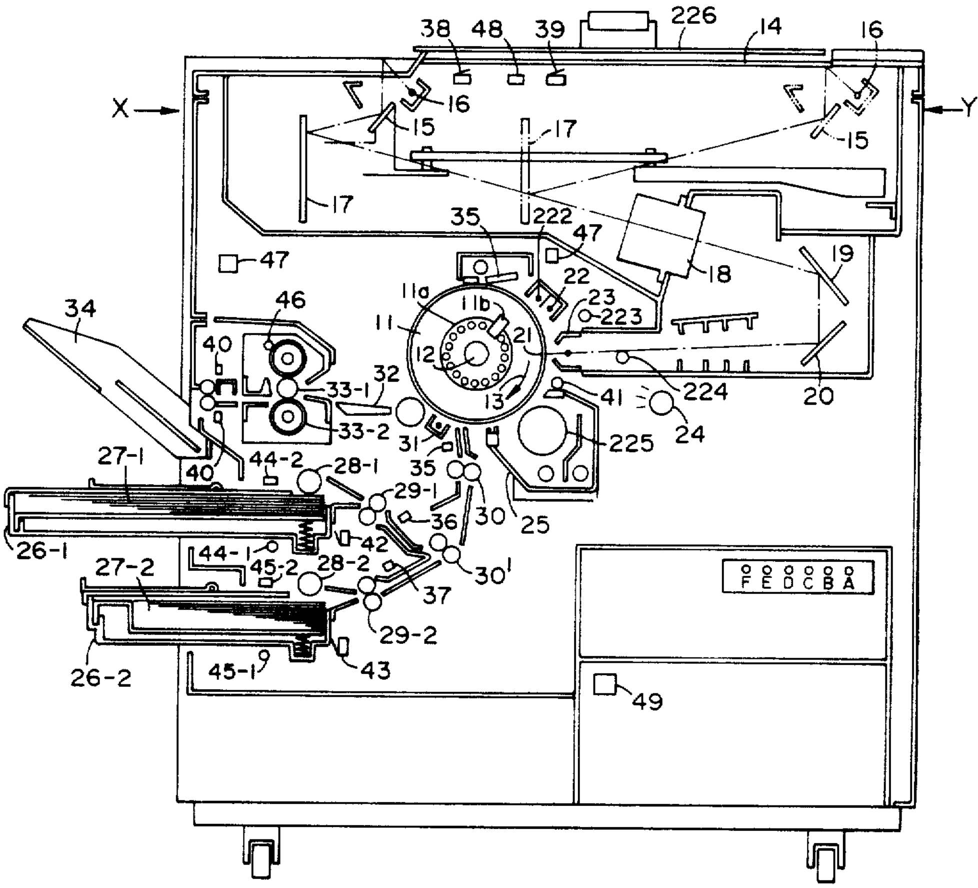
FIG. 1-1 is a side elevational view, in cross-section, of one embodiment of the reproduction apparatus according to the present invention.

FIG. 1 is a cross-sectional view, in side elevation, of a reproduction apparatus, to which the present invention is applicable.

The surface of a drum 11 is composed of a photosensitive member in a three-layer structure using a CdS photoconductive body. This photosensitive member is rotatably supported on a shaft 12 to be rotated in an arrowed direction 13 in accordance with a copy instruction.

As soon as the drum 11 reaches a fixed position, an image original mounted on an image original mounting glass table 14 is illuminated by an illuminating lamp 16 which is integrally constructed with a first scanning mirror 15, and reflected light from the image original is scanned by the first scanning mirror 15 and a second scanning mirror 17. The first and second scanning mirrors 15, 17 move at a mutual speed ratio of $1:\frac{1}{2}$, whereby the scanning of the image original is performed with a light path length in front of a lens 18 being always maintained constant.

The abovementioned reflected light image passes through the lens 18 and a third mirror 19, after which it passes through a fourth mirror 20 and is focused on the photosensitive drum 11 at an exposure section 21.

After the photosensitive drum 11 is charged by a primary charger 22 in the positive polarity (+), for example, the image which has been illuminated by the illuminating lamp 16 is subjected to slit-exposure at the abovementioned exposure section 21. At the same time, charge removal in alternating current or in a polarity opposite to the primary charge, e.g., in the negative polarity (−), is done by a charge remover 23. After the charge removal, the photosensitive drum 11 is subjected to overall exposure by means of an overall exposure lamp 24 to form thereon an electrostatic latent image of high contrast. The electrostatic latent image on the photosensitive drum 11 is then rendered visible as a toner image by a developer 25.

Image transfer paper 27-1 or 27-2 in a paper cassette 26-1 or 26-2 is forwarded into the reproduction apparatus by means of a paper feeding roller 28-1 or 28-2. Then, the paper takes a rough timing with a first register roller 29-1 or 29-2, followed by an exact timing by a second register roller 30 which is driven by a signal obtained from a switch 39 for detecting a particular passing position of the optical system, thereby causing the tip end of the paper forwarded in the direction of the photosensitive drum 11 and the tip end of the toner image on the photosensitive drum 11 to be coincided. Subsequently, the toner image on the photosensitive drum 11 is transferred onto the image transfer paper 27 while it is passing between an image transfer charger 31 and the photosensitive drum 11. After completion of the image transfer, the paper, on which the image has been transferred, is guided to a conveyor belt 32, and further to a pair of image fixing rollers 33-1, 33-2 to fix the transferred image under pressure and heat, after which the paper is discharged into a receiving tray 34. On the other hand, the photosensitive drum 11 after the image transfer is cleaned its surface by a cleaning blade 35 constructed with a resilient blade to be prepared for the subsequent reproduction cycle.

In order to control the above-described image forming cycle at every time instant, a drum clock pulse DCK is generated by a sensor 11*b* which detects optically a clock points on a clock disc 11*a* rotating together with the photosensitive drum 11.

As the cycle to be executed prior to the abovementioned copy cycle, there are steps of closing a power source switch MSW to rotate the photosensitive drum 11, extinguishing residual electric charge and memory on the photosensitive drum 11 by means of a pre-exposure lamp 223, a pre-AC charge remover 222, and so on, and cleaning the surface of the photosensitive drum by means of a cleaning roller or cleaning blade 35. This cycle will be called "preliminary rotation", and is for rendering the sensitivity of the photosensitive drum 11 to be adequate for the image formation on a clean surface. Incidentally, it is possible to automatically vary the time (number) of this preliminary rotation based on various condition.

Also, as the cycle to be executed after termination of the copying cycle in set numbers by a numerical key 72, there are a step of removing residual electric charge and memory on the surface of the photosensitive drum with use of the charge remover 23, etc. by rotating the photosensitive drum 11 for several numbers of revolution to thereby clean the surface of the drum. This cycle will hereinafter be called "post-rotation", and is for cleaning the photosensitive drum 11 both electrostatically and physically so as to be ready for the subsequent copying cycle.

41 refers to a surface potentiometer which is provided in contiguity to the photosensitive drum for measuring the surface potential at the center part of the drum 11. The potentiometer 41 is for detecting an electric potential from an a.c. waveform to be obtained by rotating a cage type rotating member, comparing the detected potential with a predetermined value, and setting a vessel bias voltage of a developer 25 at the optimum value. It has an electric motor to rotate a rotating body. It also has cooling fans (not shown) at both left and right sides in FIG. 1 to cool the optical system, a blower, an air in-take fan, and a discharge fan to cool the interior of the apparatus. These members perform their controlled operations in conjunction with the process sequence.

A door switch to be turned on by closure of both upper left door and front door of the main body of the reproduction apparatus (not shown in FIG. 1) is provided. By turning-off of the switch, power supply to the apparatus, except for the drum heater, is entirely discontinued, as is the case with the power source switch. However, the power sources for display and control are so made that they may be conductive, even if the door switch and the power source switch are turned off, when the paper jam takes place.

Also, a micro-switch to be turned on and off by up-and-down movement of an image original cover 226 is provided near a pivotal point to permit the cover 226 to be turned upward and downward, thereby to indicate that the image original still remains on the platen, or the image original table. This micro-switch is positioned to the side of the main body of the reproduction apparatus, but outside the platen surface.

36, 37 refer to sensor groups to detect oblique movement of the copy sheet and erroneous paper feeding. Each sensor group consists of three photoelectric reflection type sensors arranged in one row. 35 refers to a photoelectric reflection type sensor to detect the paper jam which takes place in the feeding path up to the image transfer section. 40 designates a sensor to detect the paper jam in the vicinity of the image fixing section and the image bearing paper discharging section. This sensor is a photo-interruptor which detects movement of a lever movable by paper in a photoelectric transmission style.

42, 43 refer to micro-switches to determine presence or absence of the upper and lower cassettes as well as the cassette size. 44-1, 44-2 designate sensors composed of a lamp and CdS to detect presence or absence of paper in the upper cassette, while 45-1, 45-2 designate sensors composed of a lamp and CdS to detect presence or absence of paper in the lower cassette.

46 refers to a thermister to control a temperature on the surface of the image fixing roller at a constant level, and 47 designates a reset switch to release a prohibited state for re-starting of the copying operation due to paper jam and other troubles.

224 denotes a blank lamp which lights up when the image original is not exposed, and irradiates the drum surface simultaneously with AC, thereby removing irregularity in charge on the drum surface. 225 indicates a sleeve roller incorporating therein a magnet to impart toner onto the drum surface.

38 refers to a hole element provided at a predetermined position corresponding to a first mirror stoppage position prior to starting. 48, 39 are the hole elements provided on the way of the forwarding path of the first mirror. The hole elements operate when the magnet provided in the base table for the hole elements come closer thereto as the first mirror moves to thereby produce an output signal. The signal constitutes a basis for the stop control of the optical system, the operating control of the paper feeding roller, turn-on control of the image original illuminating lamp, and operating control of the register roller. (ADF Device)

Figures 1, 2:
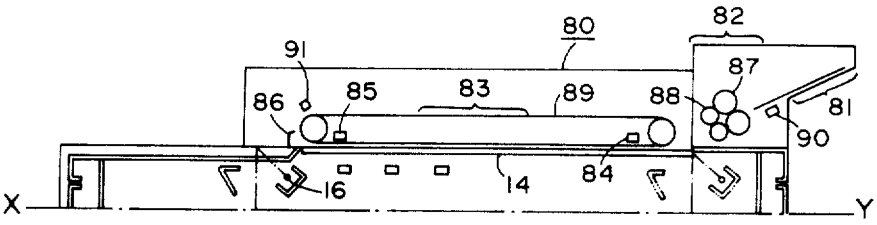
Figure 2:
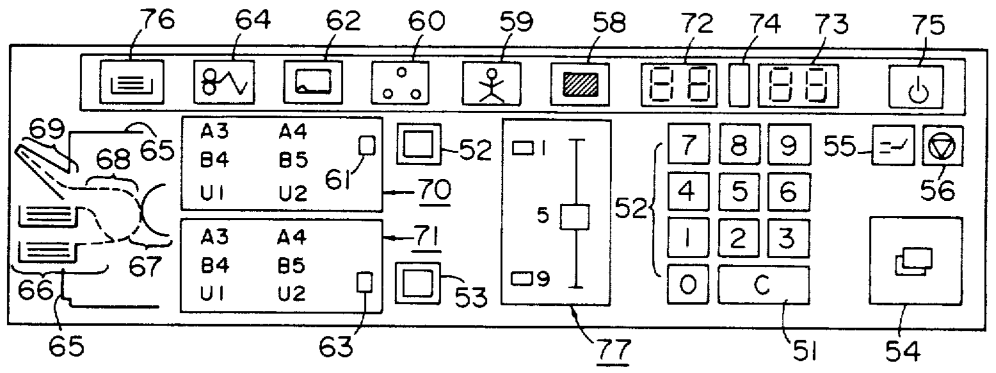

FIG. 1-2 shows a state, wherein the image original cover 14 in FIG. 1-1 has been removed, and an automatic image original forwarding device 80 (hereinafter abbreviated as "ADF") is mounted. The ADF is mechanically mounted on, and dismounted from, the reproduction apparatus, and is electrically connectable with a connector.

In the drawing, 81 refers to a bucket section to mount a thin image original thereon. 82 denotes a feeder section to feed a single sheet of the image original. 83 designates a setting section to set the image original on the image original table 14. 84 indicates an image original conveying belt. 86 a stopper for stopping the image original. 84, 85 and 90 designate respectively photoelectric sensors to detect arrival and passage of the image original so as to contribute to the automatic feeding controls.

After the image originals are placed in the bucket section 81 and the power source for the reproduction apparatus is closed, the mode switch in the ADF operating section is turned on. As soon as the waiting time of the reproduction apparatus has lapsed, a lamp is lit on by the mode switch, and the bottom-most image original out of the image originals in the bucket section is separated by a separating roller 87 to bring it to a feed roller 88. By operating the roller 88 for a time period required for feeding a single sheet with a predetermined timing, the image original is forwarded to a conveyor belt 89 which is rotating over the image original platen 14. The image original held on the belt 89 is forwarded up to a pawl 86 which has previously been lowered with a predetermined timing, where it is stopped. The belt 89 further rotates slightly, and stops with a predetermined timing. The belt 89 continues its slide movement over the image original until its stoppage. Then, the forwarding movement of the lamp 16 and the mirrors 15, 17 of the reproduction apparatus start to perform the scanning exposure of the image original, whereby a reproduction image is obtained on the image transfer paper as mentioned in the foregoing. As soon as the copying operations for the numbers set by the numerical key 52 to be described later, a termination signal (ADF signal) is sent to ADF80 to lift up the pawl 86, and rotate again the belt 89 to discharge the image original from the platen 14. Along with this discharging operation, the rollers 87, 88 operate to forward the subsequent image original toward the belt 89. In this manner, the image originals are sequentially exchanged for repeated reproduction operation. 90 designates a detector in ADF80 to detect whether the image originals are placed in the bucket section, or not. 84 a detector to detect whether the image original has been obliquely forwarded to the setting section, or not. 85 a detector to detect the image original at the exposure position. 91 a detector to detect discharge of the image original. These detectors 84, 85, 90 and 91 are of the reflection type, in which a plurality of light emitting diodes are used for a single light receiving element. It should, however, be noted that the detectors may be of a transmission type, or mechanical sensors such as microswitch, etc.. The belt 89 is grounded to the main body so as to remove electrostatic charge which has been generated and accumulated on the belt due to conveyance of the image original held thereon.

ADF80 is set in a freely swingable manner from the side of the operator to the frontward with respect to the reproduction apparatus so that it may be separated from the platen 14. A switch, which automatically releases the ADF operation when the ADF80 is separated, is provided in the ADF80. By this switch, the ADF80 is prevented from erroneous operations. In this state, it is possible to make a copy by placing an image original of heavy thickness on the image original table 14. Also, when an image original in thin thickness is placed on the table 14 and the copy button is depressed by lowering ADF80, there can be obtained set numbers of copies, after termination of which the image originals are automatically discharged.

(Operating and Displaying Sections)

FIG. 2 is a plan view of the operating panel of the main body of the apparatus.

In the drawing, 50 refers to numerical keys to set desired numbers of copy sheets, by which the numbers in two numerical places can be set. Setting of the number is possible during stoppage of the copying operations and when the operation enters the termination mode (hereinafter referred to as "post-rotational mode"). No setting can be effected even by depression of the keys, at the time of the paper jamming as well as the service-man-call (to be described later). When the number setting is executed, there arises oscillating sound and set numbers are digitally displayed on a segment display device 72 for cassette numeral indication. Incidentally, the number setting is meant by storage of the key numbers into a memory (to be described later).

56 designates a stop key to stop the continuing copy operation and to release the interruption copying operation. After commencement of the copying operation by the copy key, when the key is turned on in the course of the initial mode (referred to as "preliminary rotation"), the copying operation successively shifts to the post-rotational mode, whereby the drum performs one rotation and stops. When the copy key is turned on during the forward movement of the optical system, the copying process at that time is terminated, and the drum stops. When the copy key is turned on during the return movement of the optical system, copying of the following single sheet is executed, and thereafter the drum stops as mentioned above. Further, after instruction of the interruption copying, if the copy key is turned on prior to commencement of the copying operation, the lamp for indicating the interruption copying is extinguished, and the set numbers and copy numbers which have been set aside by the intervening key are read out (hereinafter referred to as "recall") and they are displayed. When the copy key is turned on during this interruption copying, the process at that time is executed, and after termination of the process, the drum is stopped to perform the recall and display in the same manner as mentioned above.

51 denotes a clear key to clear the set numbers by the numerical keys. By this clear key, display of the set numbers and copy numbers is cleared, and codes "1" and "0" are respectively displayed for these set numbers and the copy numbers. When this copy key is added with the same function as that of the abovementioned stop key, the number of cancellation keys can be reduced.

52 refers to an upper cassette designating key to feed paper from the upper paper feeding cassette, and 53 a lower cassette designating key to feed paper from the lower paper feeding cassette. By this designation of the paper feeding cassette, the paper feeding roller which operates with a designated paper feeding timing is selected.

54 indicates a copy key to start the copying operation. No time, in which the copying operation is impossible, can be made an input into this key. The time which can be received into these keys 51, 52 and 53 is substantially same as that for the above-mentioned numerical keys, the details of which will be described later.

55 designates an interruption key to enable interruption of a plurality of different copies to be executed during copying operation of pre-set numbers of copy sheets. When this key is depressed during stoppage of the photosensitive drum, the set numbers for copying and the numbers of finished copies in the display device are withdrawn into the memory, and, instead, codes "1" and "0" are respectively indicated on the display device. On the other hand, when this interruption key is depressed during execution of the copying operation, the copying process at that time is terminated to stop the photosensitive drum, after which the same withdrawal and display as mentioned above are performed. Thereafter, the abovementioned numerical keys are depressed for input of the desired numbers of sheets, whereby the number of copy sheet for the interruption copying can be further set, and the interruption copying can be started upon depression of the copy key.

The abovementioned keys 51 to 55 do not at all work for input, even if they are turned on at the time of the paper jamming and the service-man-call. When these keys are effectively turned on, very brief oscillating sound is generated as is the case with the numerical keys.

57 refers to a lamp for indicating warning to an operator who left the image originals on the image original table through overlook. The lamp lights on when the process has entered the post-rotation, and lights off when the image original cover is lifted up.

58 denotes a lamp indicating non-setting of a key counter to count the total copy number in the apparatus main body. During lighting of this lamp, the copy key is not effectively received. When this lamp is lit during the multicopying operation, the copying operation is discontinued as soon as the copying has been done on the paper which has already been fed.

59 designates a service-man-call lamp which lights on when the apparatus main body gets in trouble. As will be described later, when those troubles such as troubles in the sequence control base plate, troubles in a stabilizer for the halogen lamp, abnormal temperature rise in the surface of the image original table, and so forth are detected, the lamp lights on to stop the machine operation. In the interior of the apparatus main body, the location where the trouble has occurred is displayed by light emitting diodes A to F (FIG. 1).

60 indicates a lamp to light on when the toner has been exhausted in the hopper. This has nothing to do with the operations of the reproduction apparatus.

62 refers to a lamp which lights on when no cassette has been loaded in the cassette stage as designated by the key 52 or 53, and when the paper in the cassette loaded on the designated cassette stage has been exhausted.

70 designates a lamp for indicating the size of the copy paper in the upper cassette, and 71 a lamp for indicating the size of the copy paper in the lower cassette.

72 denotes a segment display device which indicates set number of copy sheets by the key 51. The display device indicates a code "1" at the time of the power source closure, instruction for interruption copying, and clearance of the set number. The indication is extinguished when the paper jamming takes place, the main switch is turned off, and the door switch is turned off, although the numerical values which have already been set in the memory previously are maintained. While the numerical values which have been set previously are maintained even after stoppage of the copying operation by turning the stop key on, or stoppage of the copying operation due to exhaustion of the copy paper, this numerical indication is extinguished and the code "1" is displayed, if the stop key is turned on or the desired number of sheets has been reached to stop the copying operation, after which no copy key is turned on within a time instant of 30 seconds. In either case, the code "0" for the higher numerical place is not displayed. Further, this segment indicator 75 indicates the sensor in trouble as detected in the examination operation of the sensor which is carried out by the self-examination switch 49, in terms of a code number. In more detail, the sensor for detecting the oblique paper movement from the upper cassette is indicated by the code numbers 1-3, the sensor for detecting the oblique movement from the lower cassette is indicated by the code numbers 11-13, the image transfer sensor is denoted by a code number 4, the discharge sensor is denoted by a code number 5, the register sensor is denoted by a code number 6, and "no abnormality" is denoted by a code number 88.

73 is an indicator for cumulatively displaying the number of copy sheets accommodated in the discharge tray 34. The numerical figures displayed on the indicator change at the time of reverse motion of the optical system. No change in the numerals occurs by the discontinued copying operation due to exhaustion of the copy paper and other reasons. Upon lapse of 30 seconds after the copying operation is discontinued by the stop key or the copying operation stops due to the desired numbers of copy sheet having been reached, the numerical indication becomes zero. When the copy key is turned on within this time instant, the cumulative indication is started after the previous numerical value is cancelled. In other occasion than the stoppage of the copying operation by depression of the stop key or the stoppage of the copying operation after the desired number of sheets has been reached, the previous figure is added with +1 at the start of the return motion of the optical system. "10" is indicated at the time of the power source connection, interruption, and clear. At the time of the paper janning, either −0 or −1 or −2 is added to the previous figures. No high numerical place "0" is indicated. When the main switch and the door switch are turned off at the time of the paper jam, the display is extinguished, but the previous figures are retained in the memory.

74 refers to a lamp for interruption copying which lights on when the interruption key is input. The interruption lamp is extinguished simultaneously at the time of release by the stop key during stoppage of the copying operation, and extinguished after termination of the copy cycle at the time of release of the interruption during the copy cycle.

75 denotes a wait lamp which prevents the copy key from being input. It lights on when the developer is at a low temperature.

64 and 76 indicate lamps, either one of which lights on when erroneous feeding or jamming of the copy paper takes place.

65 to 69 are lamps to light on and off to indicate the location where the erroneous paper feeding or paper jamming has occurred in the form of a pictorial design simultaneously with lighting of any one of the abovementioned lamps 64 and 76. Of the lamps 65 to 69, any one of the lamps 66 to 69 lights on and off (the remaining lamps being kept on) to show the actual location of the trouble occurred. At this time, the segment display device 73 is rendered "no change", or −1, or −2 to display the copy numbers equal to that of the copy sheets previously accommodated in the tray, and the operation of the apparatus main body is discontinued not to receive the entire key input.

76 is a lamp which lights on when no paper feeding is done at the paper feeding port from the cassette, and when the paper is obliquely forwarded. In this case, the lamps 65 to 69 light on, of which the lamp 66 alone lights on and off, thereby inhibiting re-start of the reproduction operation. Release of the prohibiting in this case can be performed by taking out the cassette 26 in FIG. 1 and removing the paper on the paper detecting sensor. The lamp 64 lights on when the paper jamming takes place in the apparatus main body, and causes the line mark 65 to light on and off. When the paper is jammed on its way to the photosensitive drum, the lamp 67 is lighted on and off. When the paper is jammed on its way to the image fixing device from the photosensitive drum, the lamp 68 is lighted on and off. When the paper is jammed in the vicinity of the image fixing device, the lamp 69 lights on and off. In this way, restarting of the reproduction is prohibited. In this case, release of the prohibition is performed by opening the door of the apparatus main body to take out the jammed paper, depressing the reset button 47 in the apparatus main body, and closing the door again.

77 denotes a sliding type variable resistor for varying the copy density. Adjustment of the copy density is done by varying light quantity from the halogen lamp 16 with the quantity of current conduction in this lamp being varied by the variable resistor.

(Control Block)

Figure 3:
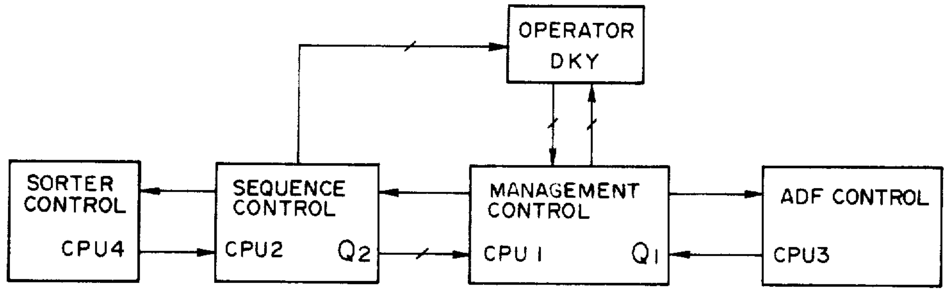
FIG. 3 is a block diagram for controlling the reproduction apparatus according to the present invention.

FIG. 3 is a control block diagram for a preferred embodiment of the image forming device according to the present invention. According to this embodiment, two program CPU's (one-chip microcomputer) are used for the control section of the reproduction apparatus, one of which is mainly used for the sequential control such as control of the reproduction process operation, etc., and the other of which is used for real time control such as the segment display, etc., and input discrimination such as copy keys, etc. The signals required for the sequence timing are introduced as input into the former CPU, while the signals required for the display and entry controls are introduced as input into the latter CPU. Both CPU's are usually operated mutually independently, but, they are sometimes connected mutually with several lines so as to effect run controls, whereby undesirable flickering in display during the controls for the reproduction operations which tends to occur when the entire controls are done by a single program CPU can be reduced, and any entry error by the keys can be prevented, hence erroneous operations in the reproduction control can be prevented regardless of the amount of loads and inputs.

In the drawings, $Q_1$ designates the CPU for performing the abovementioned real time control (this CPU will hereinafter be called "management computer"), and $Q_2$ denotes the CPU for performing the abovementioned sequential control (this CPU will hereinafter be called "sequence control computer"). DKY denotes various indicating devices and input keys provided on the operating panel for reproduction as shown in FIG. 1. In order to increase the functions of a plurality of ROM's, checking of the process load is mainly performed by $Q_2$, and checking of the sensor per se is done by $Q_1$. The discontinuance signal such as paper exhaustion, etc. is introduced as an input into $Q_2$, and the signal relative to completion of the operations such as copy stop, etc. is introduced as an input into $Q_1$. Also, the sensor signal which operates during the waiting time is introduced as an input into $Q_2$, while the sensor signal, which is usually inoperative during the standby, but operative during the sequence control, is introduced as an input into $Q_1$.

Further, according to this embodiment, a third computer $Q_3$ is provided in ADF per se for operation controls of the ADF. This computer $Q_3$ is connected with the management computer $Q_1$ to perform the paper feeding control by ADF as well as the copy control of the reproduction apparatus. Further, a fourth computer $Q_4$ is provided in a sorter per se for operation control of the sorter which binds the image bearing paper as discharged into volumes. This computer $Q_4$ is connected with the sequence control $Q_2$ to perform the distribution control of paper as well as the copy control of the reproduction apparatus. In so doing, it becomes feasible to make various attachments to the reproduction apparatus such that abovementioned terminal computers including the reproduction apparatus computer as the center are connected with ADF, sorter, an enlarging reproduction system of microfilm, print system (facsimile), data print-out system in a large-scale computer, and so on.

(Control Circuit)

Figure 4:
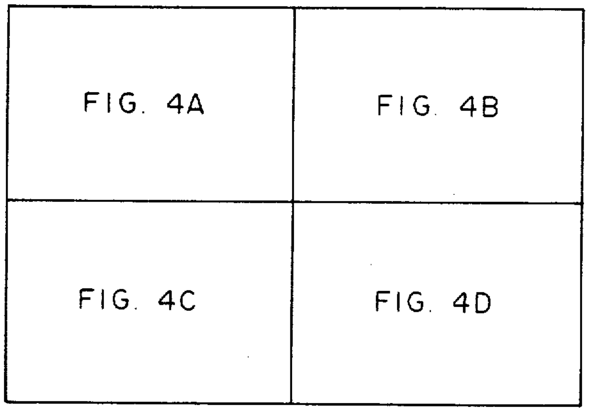
FIG. 4 is an operational control circuit diagram for the reproduction apparatus shown in FIG. 1-1.
Figure 4A:
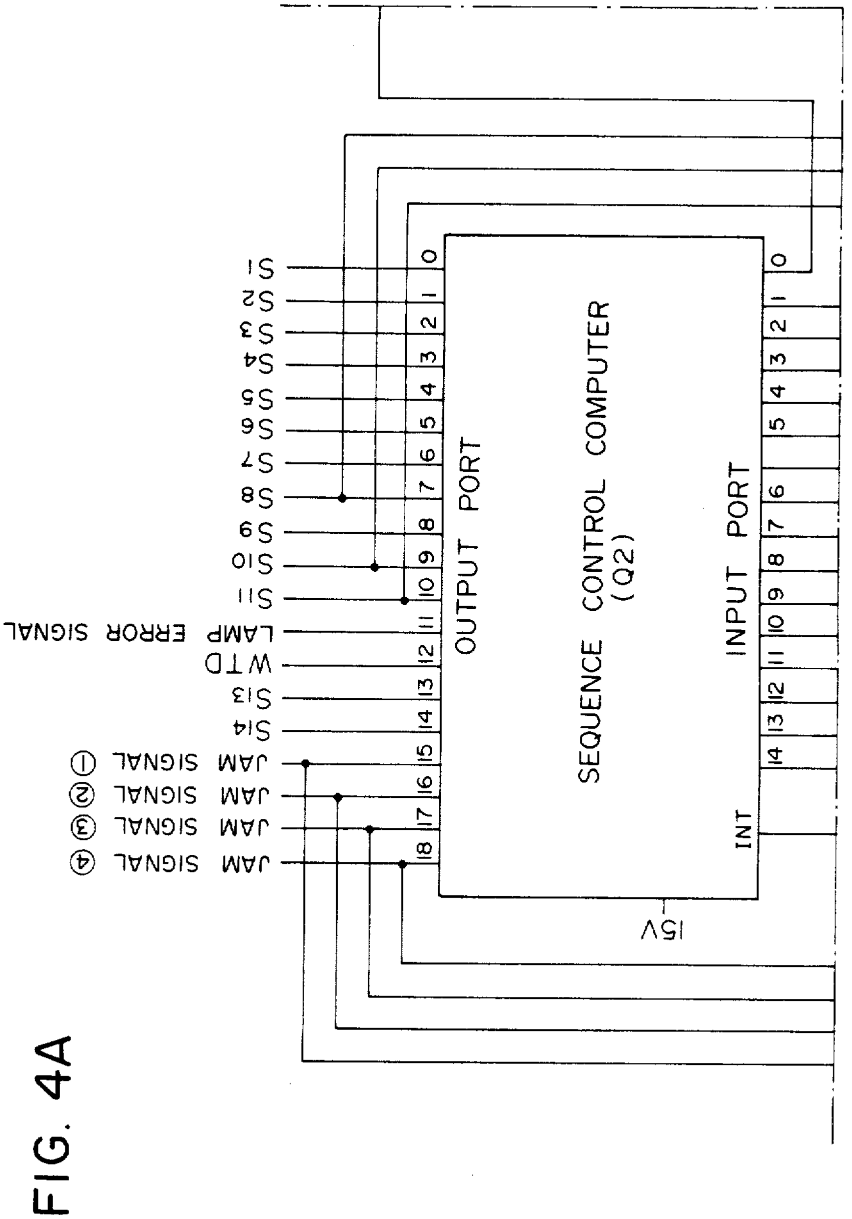
Figure 4B:
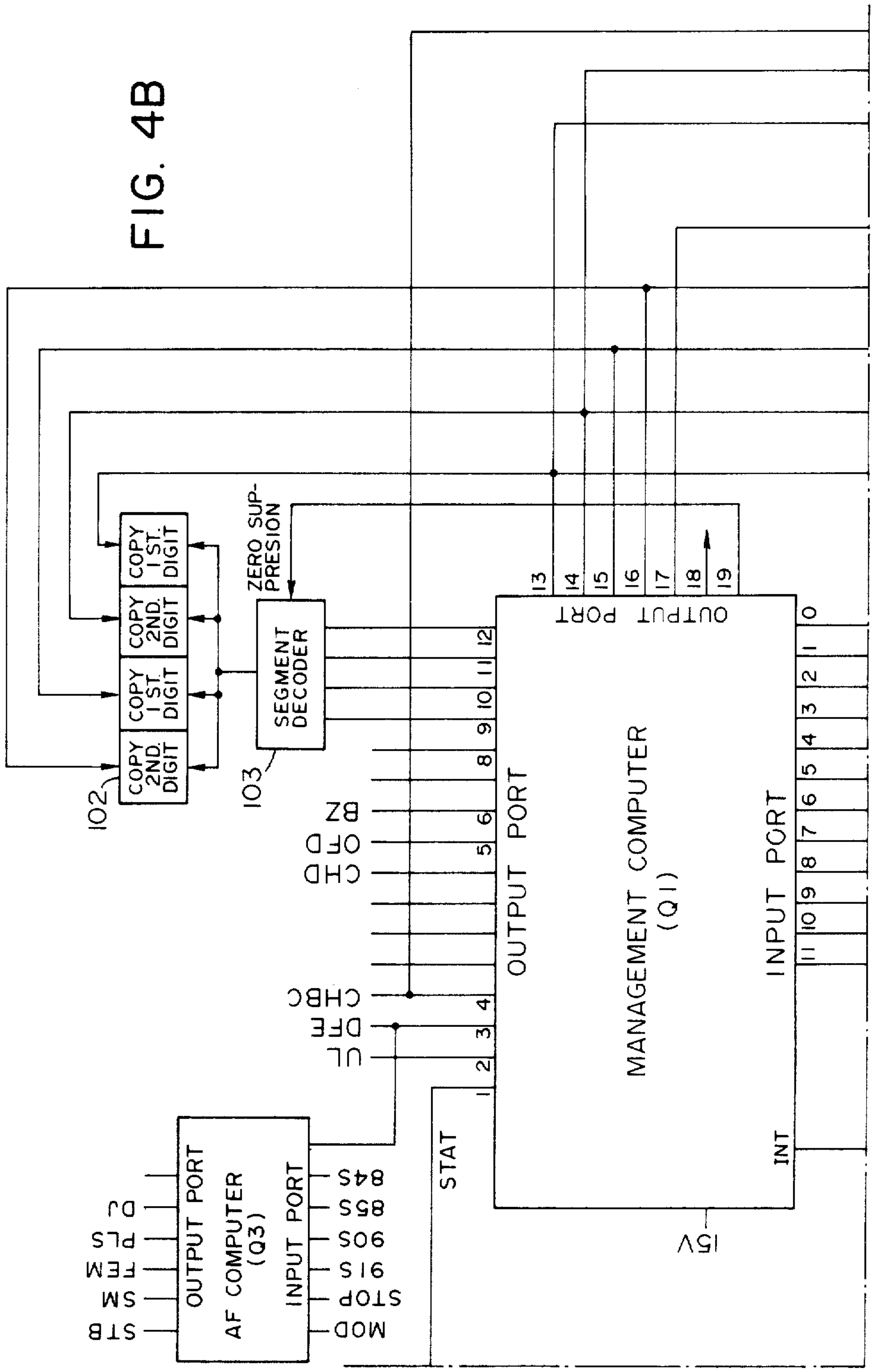
Figure 4C:
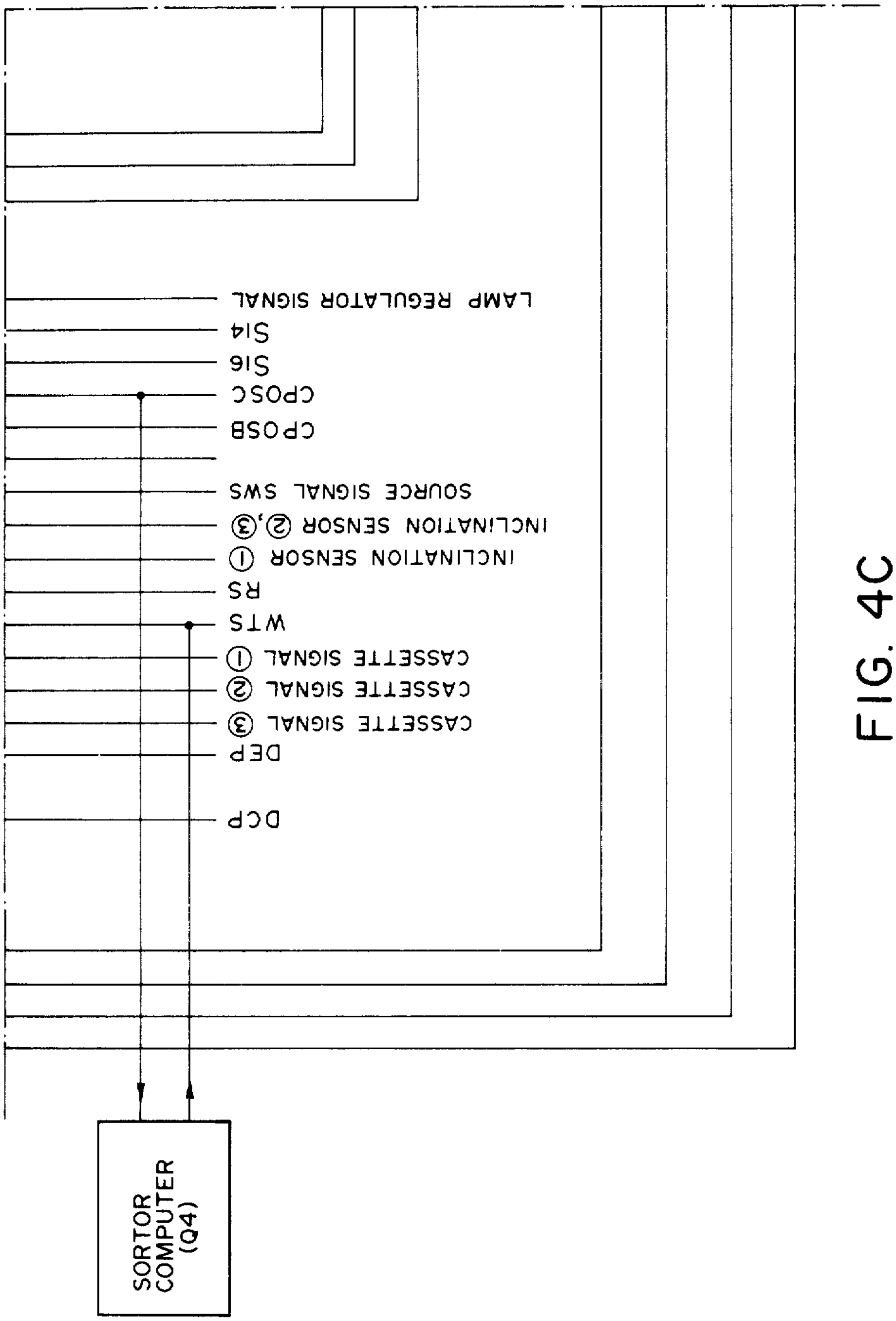
Figure 4D:
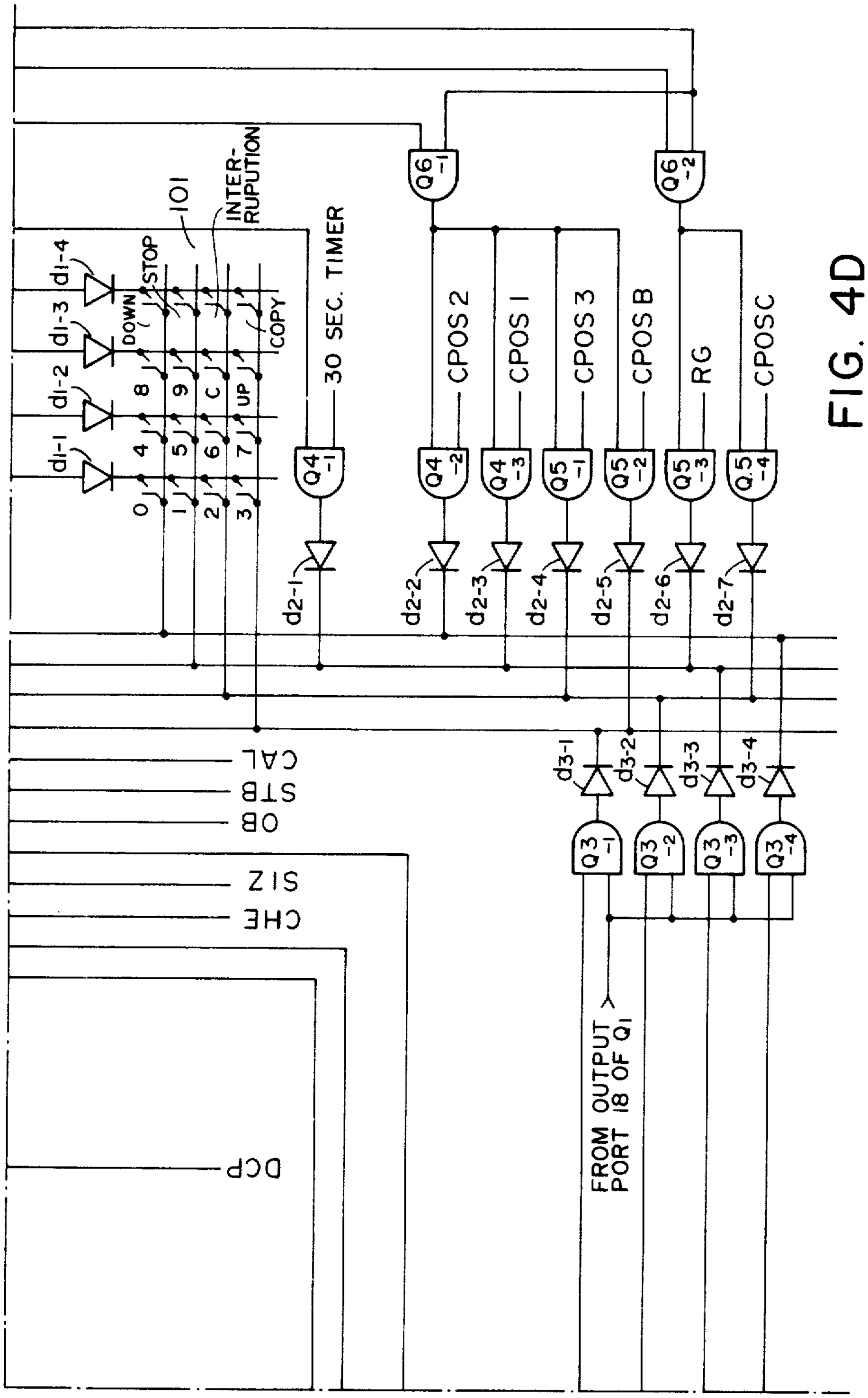
Figures 1, 15:
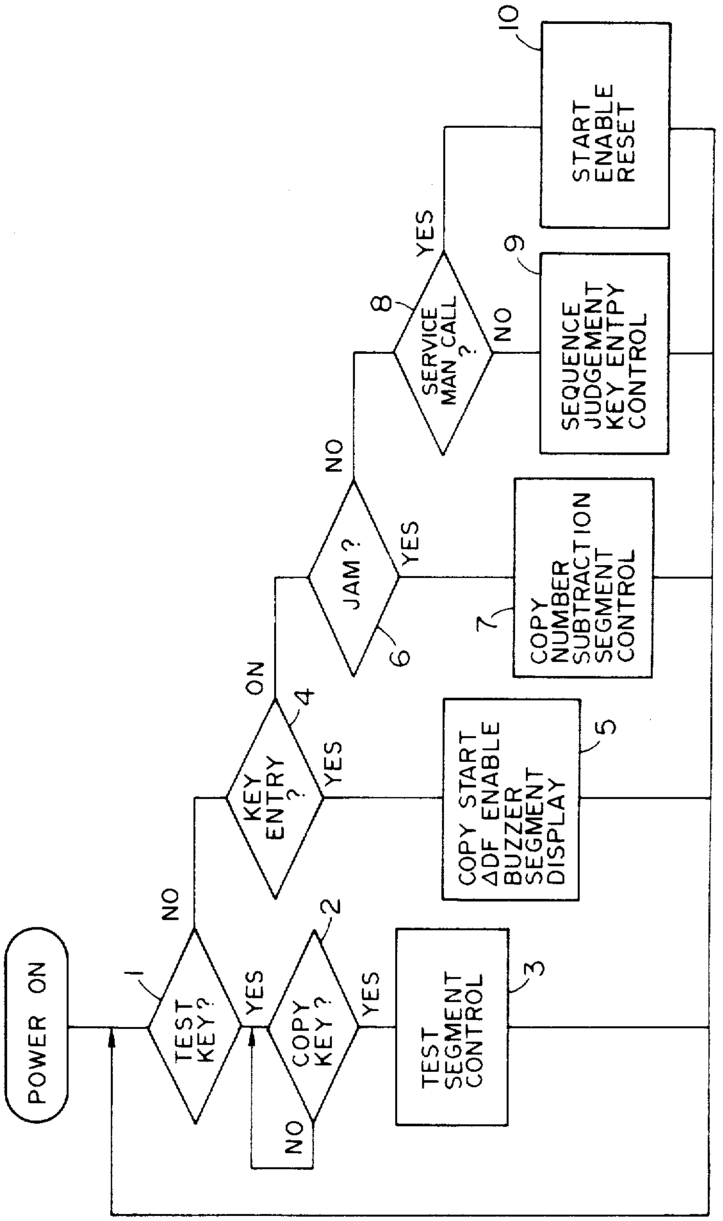
Figures 2, 15:
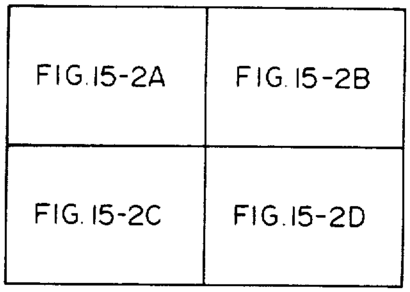
Figures 3, 15:
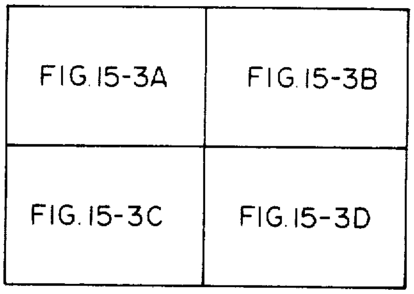
Figures 4, 15:
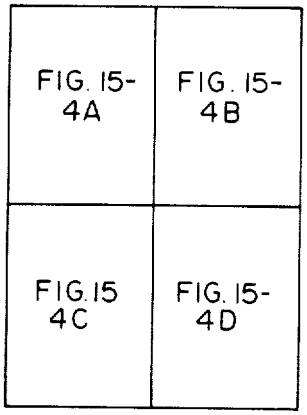

FIG. 4 is a preferred embodiment of a control circuit for the image forming device according to the present invention, in which $Q_1$, $Q_2$, $Q_3$ and $Q_4$ are respectively controllers constructed with those well known one-chip micro-computers, each corresponding to the computers in FIG. 3. Each of these computers has a memory (ROM), in which the control programs are stored, a memory (RAM) which temporarily stores control data such as flags, etc., input data such as copy set numbers, etc., output data for sequence operation, display, and so forth, a latch register (I/O) which introduces copy set numbers, etc. by keys into the CPU as input and produces load operating signal such as drum motor, etc. as output, and an operational processing section (ALU) which produces a predetermined output from an output port by reading the input data from the input port into CPU to store and discriminate them in RAM. These memories, latch register, and operational processing section are constructed in a single semiconductor element. The ROM in the management computer $Q_1$ is a mask ROM having un-convertible contents, in which those control procedures such as the key entry, dynamic display of the segments, examination, jam, conversion, sequence judgement, etc., as shown by the flow charts in FIGS. 15-1 to 15-3, are codified and stored. The ROM in the sequence control computer $Q_2$ is a mask ROM having unchangeable contents, in which the control procedures shown by a flow chart in FIG. 16 (such as drum clock count, detection of jam, oblique movement and other trouble in feeding paper, and so forth) and the timing data (such as on and off of the process loads, drum clock number to be the standard for discriminating the troubles in feeding paper, etc.) are codified and stored. Also, the ROM in the ADF computer $Q_3$ is the same mask ROM as mentioned above, in which the control procedures shown by a flow chart in FIG. 17 (such as paper feeding, paper discharging, etc.) are codified and stored.

In each computer, IN refers to an input port to introduce instruction data and detection data into CPU; OUT designates an output port to produce control data outputs; and INT denotes an input interruption port which discontinues the main program and executes the interruption program. In this embodiment, the INT is used for counting the drum clock number.

101 indicates a matrix circuit (multiplexer) to introduce input data of sixteen operating key into the input port of the management computer $Q_1$, for the entry of which a probing signal (numerical place change-over signal) is produced as an output from the output ports 13 to 16 of $Q_1$. 0–9 are contacts for the numerical keys; C and STOP are the contacts for interruption, copy, up/down clear keys, stop keys, interruption key, copy key, upper cassette designation key, and lower cassette designation key. These contacts are closed by turning on of the keys.

$Q_4$-1 to $Q_4$-3, $Q_5$-1 to $Q_5$-4, and $Q_6$-1 to $Q_6$-2 are AND gates for introducing each of the sensor signal inputs into the management computer $Q_1$ so as to perform the examination to be described later. $Q_3$-1 to $Q_3$-4 are AND gates for introducing jam detection signal input by the sequence controller $Q_2$ into the management computer $Q_1$ for correction of the display.

102 designates a well-known seven-segment display device constructed with segment LED, which has four numerical places corresponding to the display devices 72, 73.

103 refers to a segment decoder which performs code conversion for display. Probing signals 13–16 are repeatedly produced as pulse outputs without the output timing being mutually overlapped, thereby contributing to the dynamic input and display. For example, introduction of an input "1" into the input port "0" at the time of producing an output "1" from the output port 14 means that a numeral "4" is the ten-key is turned on. The probing signal for this key is introduced as an input into each numerical place of the segment display device 102 to display, for example, a numeral "7" in the second numerical place in the set number display device with a signal from the port 14 and signals 1, 1, 1, 0 from the respective ports 9, 10, 11 and 12 at the established probe pulse timing.

This display device performs changes in its display in response to the numerical keys, start key, stop key, interruption key, and process timing, and so forth. For instance, in case of copying 23 sheets, the power source switch SW2 is first turned on, whereupon the set number display device 72 and the copy number display device 73 respectively indicate "01" and "00". Subsequently, in accordance with sequential turning-on of the keys 2 and 3, these display devices indicate "03" and "00", and then "23" and "00". When the copy start key is turned on, the display devices continue to indicate "23" and "00". When the optical system moves for the first copy, the display devices indicate "23" and "01". Thereafter, at every reverse motion in n numbers, the display devices indicate the codes "23" and "n", and when the 23rd sheet is fed, they indicate "23" and "23". If the copy key is not turned on again before the copying operation terminates, the copying operation is stopped, and the display devices indicate "01" and "00". When the copy key is turned on, however, the display devices indicate "23" "00" upon turning-on of the key.

In the course of the copying operation as mentioned above, when the interruption key 55 is turned on as soon as the tenth sheet has been copied, the display devices change their indication from "23" and "10" to "01" and "00". Upon further depression of the numerical key "5", the display devices indicate "05" and "00", whereby the copying operation for five sheets is started by depression of the start key. By one reverse motion of the optical system, "05" and "01" are displayed. When the optical system moves five times, "05" and "05" are displayed, after which the previous display of "23" and "10" automatically appear again on the display devices. Thereafter, "23" and "11" . . . "23" and "23" are sequentially displayed by the start key.

While the interruption copying for five sheets is being done, if the stop key 56 is depressed, the interruption copying is discontinued, and the numbers "23" and "10" before the interruption appear on the display devices, and the copying operation of the remaining copy is performed by depression of the start key.

(Input Operation)

The power source switch 9 is closed. At this time, if the temperature of the image fixing heater is lower than the set temperature value, the wait lamp lights on. The image original cover 226 is lifted, and the image original is placed on the glass table with its front surface being down, and it is registered with a right size index on the table 14.

The paper feeding cassette (either upper or lower stage) to be used is selected by the cassette selection keys 52, 53. The power source switch MSW is turned off, and then turned on, whereupon the cassette at the lower stage is automatically selected. It would be convenient if the paper cassette of most frequent use is set in the lower stage. Even after 30-second lapse since termination of the copying, the lower cassette is not reset.

Depending on the condition of image on the original, the copy density lever 77 is manipulated ("5" signifies normal density, "9" denotes the heaviest density, and "1" denotes the thinnest density). Required number of copy sheet (1 to 99 sheets) is set by the ten-keys 52, which is confirmed by the cassette sheet number display device 72, and then the start key 54 is depressed. In case no sheet number can be set even by depression of the ten-key, or the set number is erroneously set, the clear key 51 is depressed and then the ten-key is set once again, whereupon "01" and "00" are indicated.

After start of the copying operation, no change can be effected by depression of the clear key, ten-key, and upper/lower cassette selection key, during a period from turning-on of the image original illuminating lamp upto the reverse motion of the optical system for the last copy.

When the indicating lamp warning exhaustion of paper in the paper cassette is lit during the copying operation, and the copying operation is stopped, the copy sheets are replenished in the cassette, and the cassette is again set in the apparatus main body, and the copy start key is depressed, whereupon the remaining numbers of sheets are automatically copied.

In case the copying operation is to be stopped during the continuous copying, the copy stop key is depressed, whereby the operation stops after completion of the copying operation at that time. The copy number indication in the display device remains to be that which has so far been copied.

Next, when the copy start key is depressed, the copy number indication starts from "00", and the set number of sheets can be automatically copied.

In the case of the interruption copying, the aforementioned operation and display are effected. By depression of the interruption key, the copy number, set number and designated cassette stage at that time are all stored in the memory RAM in the CPU. During this interruption, the image original cover is lifted to exchange the image original, the set number is established, and the cassette size (stage) is selected (the selected stage and the cassette size in this stage are displayed). As soon as the predetermined number of interruption copies are completed, the contents of the display in the display devices automatically return to those numerals which have been retreated into the memory. Also, the cassette size indicator indicates the original stage or paper size.

When it is desired that the copying operation be stopped during the continuous copying, the copy stop key is depressed, whereupon the copying operation stops after completion of the then copying operation. At the time of the reverse motion of the optical system or after reverse motion thereof, indications of the set copy number, paper size, and selected stage of the paper cassette instantaneously return to those prior to the interruption. Nothing happens when the interruption key is depressed during the interruption copying.

The following are possible after the set copy number returns to the original:

(1) when the interruption key is depressed, the interruption copying becomes again possible;

(2) when the clear key is depressed, the display devices are cleared to "01" and "00"; and (3) when the copy stop key is depressed, no change occurs in the indication of the copy sheet number, although, when the copy start key is depressed, the indication of the copy sheet number starts from "00".

(Flag of Management Controller $Q_1$)

Explanations will be made as to the flag which is set in the established address in the RAM of the management controller $Q_1$ (code "1" is established). The flag is to determine the proceeding of the control steps in executing the flow charts in FIG. 15, and will hereinafter be abbreviated as "F/".

Flags $H_0$ to $H_5$ are the numerical place signal changeover flags, and are set and reset in accordance with the outputs from the output ports 13 to 19. F/JAM is a jam flag which is set when the paper jam is detected, and F/FULL is set when the cassette contains full-size paper. In the reset stage, this signifies the half size. F/STOP is a stop flag which is set when the sequence operation is in the stop mode (i.e., paper exhaustion, paper jamming). F/COPY is a copy flag which is set until the optical system starts its reverse motion at some set number of sheets after commencement of the copying operation. F/DF is a flag which is set during a period from start of the copying operation upto its termination by the ADF, F/A, F/B and F/C are respectively flags to be set in the respective sectors (d), (c) and (a) in FIG. 15-3. F/D is set at the termination of the copying operation and reset after 30 seconds since its termination. F/E is set during the post-rotation. F/F is set during the post-rotation after completion of copying operation for the set number of sheets. F/G is set in the sector (b) in FIG. 15-3. F/H is a flag which is set when the copy start signal input is introduced. F/INT is set when the interruption key input is introduced in the sector (d) in FIG. 15-3. F/INT' is a flag which is set when the interruption key input is introduced during the copying operation. F/OVF (F/OVF' is for after the interruption) is set when the key entry is done twice. F/INTL (F/INTL' is for after the interruption) is set when an input "1" is introduced. F/UP.DOWN is set when the upper cassette is designated. F/KEY1 to F/KEY4 are set when the key inputs are introduced. The reset timing for each flag is apparent from the flow charts in FIG. 15. The RAM contains a portion to memorize the copy set numbers in 8-bit (which is called "counter SET"); a portion to count and memorize the number of sheets copied in 8-bit (which is called counter COPY"); a portion to count and memorize the drum clock pulse CL in 8-bit (which is called "counter CNT"), a buzzer counter L, and others.

(Time Chart by Sequence Controller $Q_2$)

Figures 2, 5:
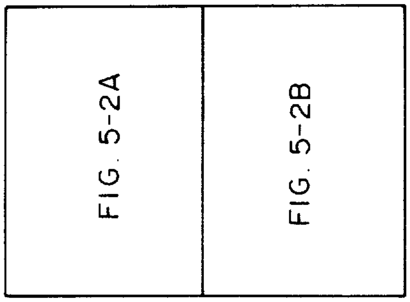
Figures 1, 5:
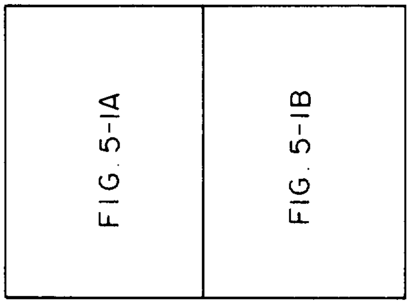
Figures 1A, 5:
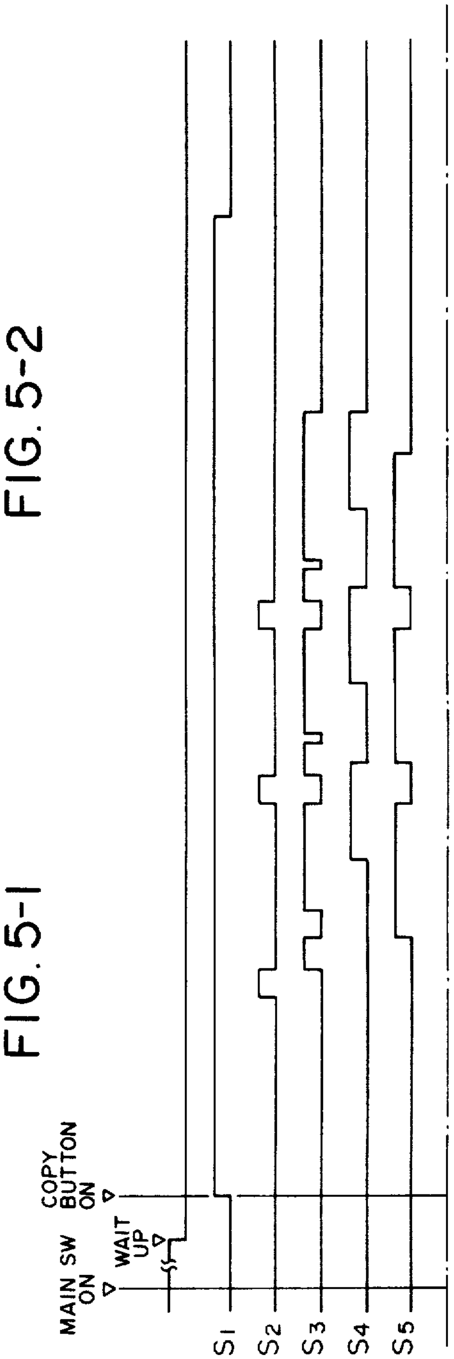
Figures 1B, 5:
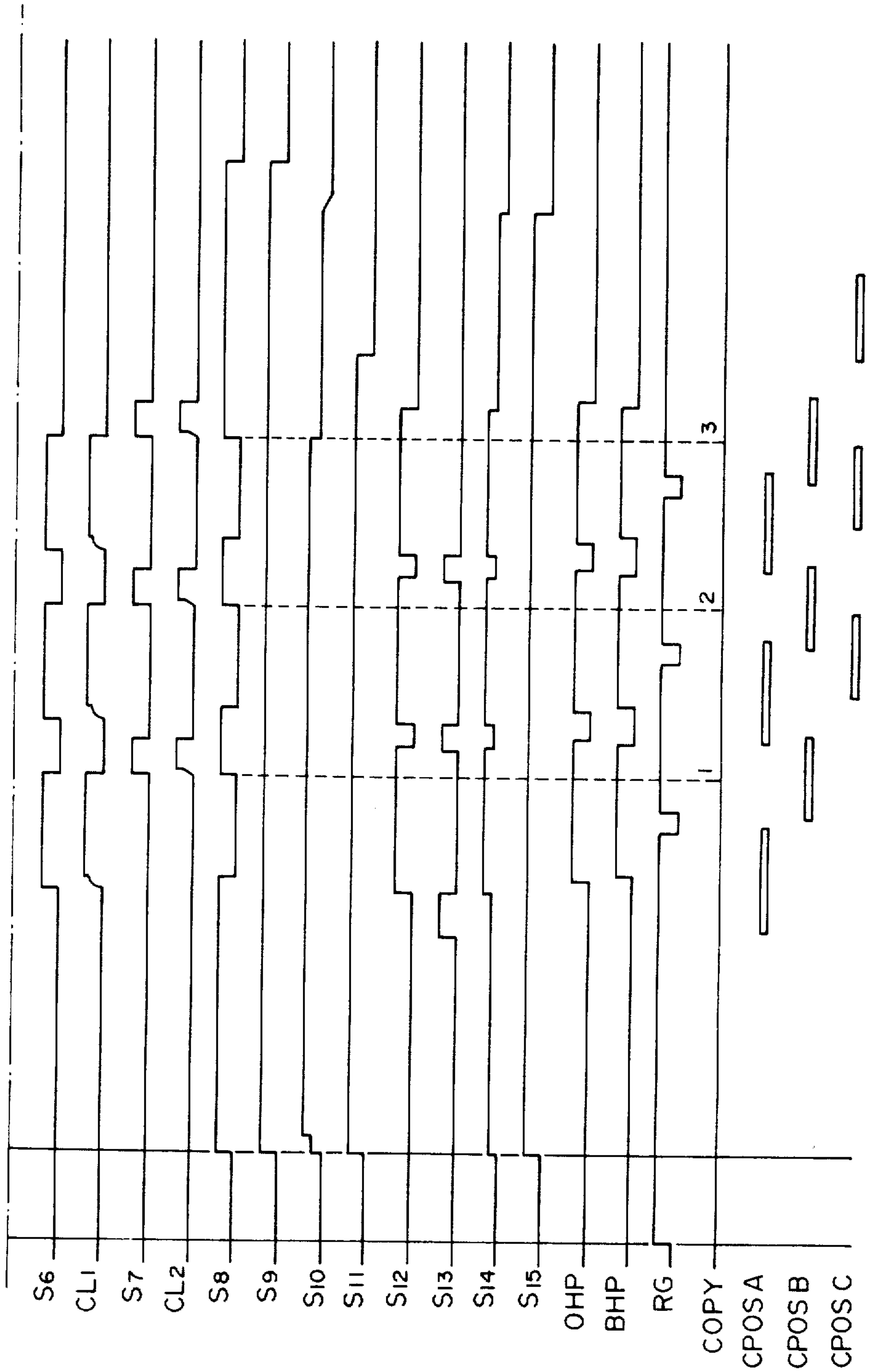
Figures 2A, 5:
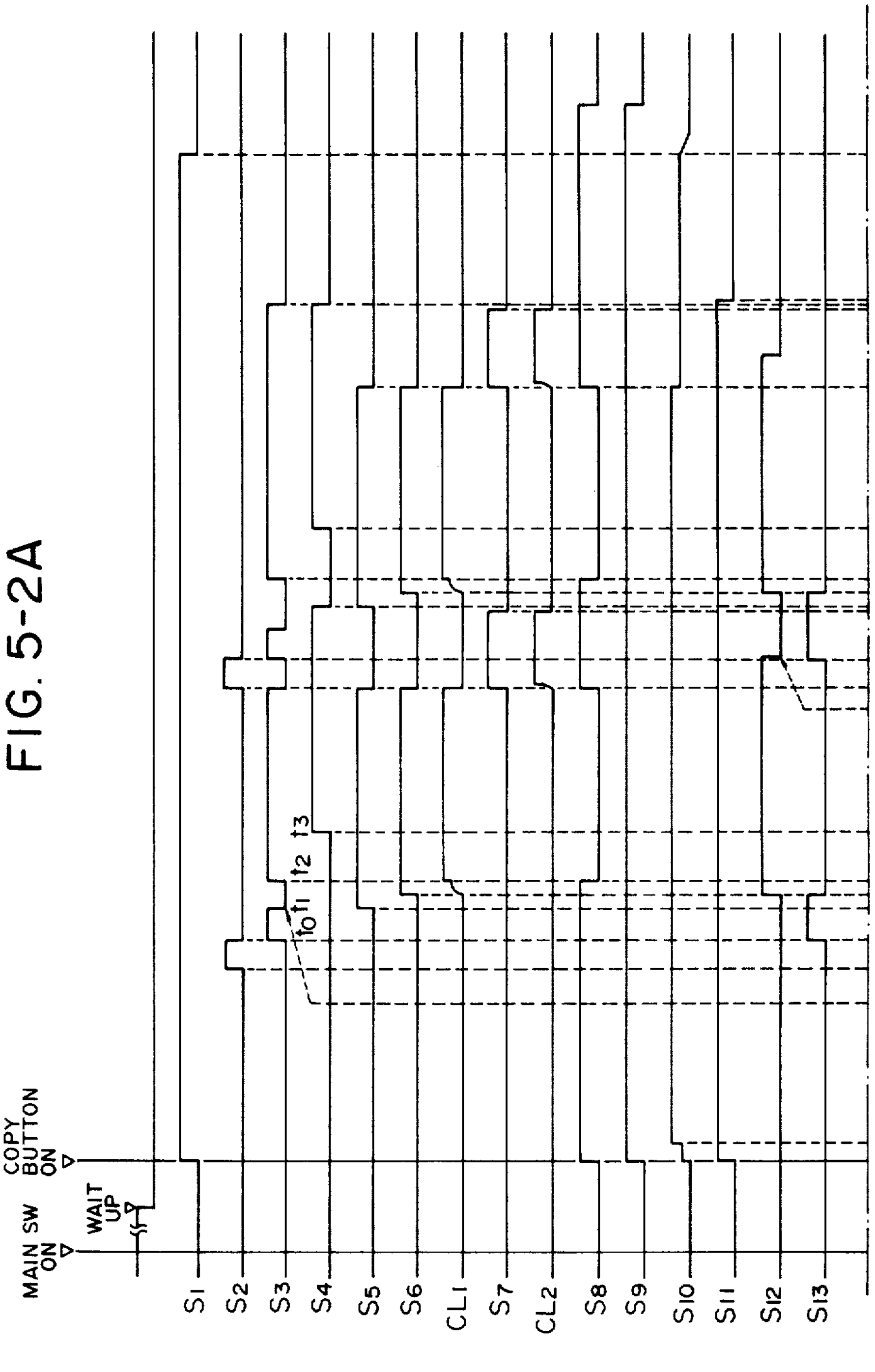
Figures 2B, 5:
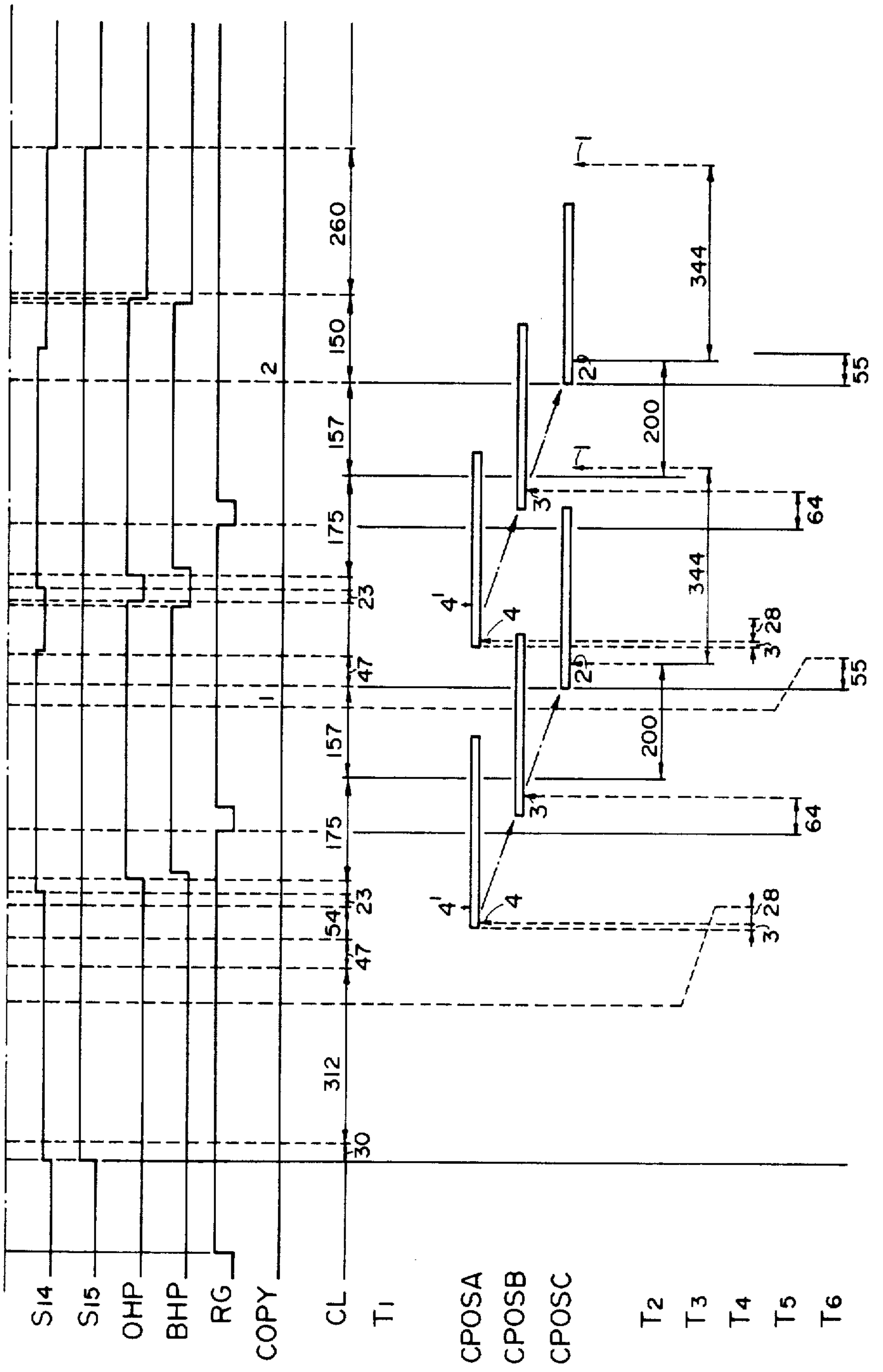
Figures 3, 5:
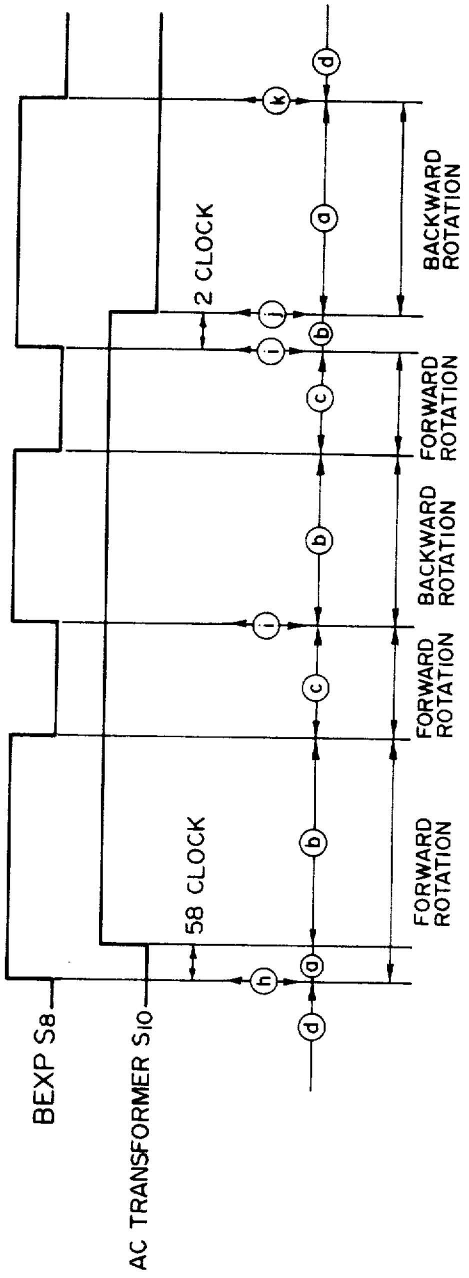
Figures 4, 5:
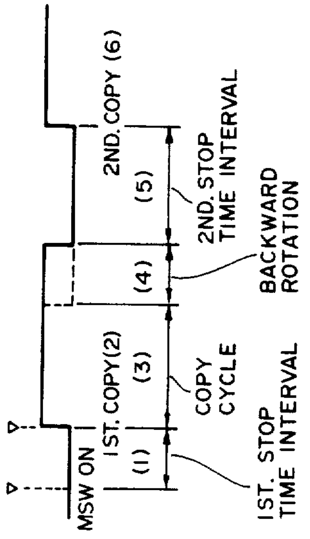

FIGS. 5-1 and 5-2 are the time charts for the control signals and detection signals, etc. in FIG. 4. These time charts indicate the operating state of an object to be controlled and detectors at the time of the high level, and they relate to the sequence controller $Q_2$. The time chart in FIG. 5-1 shows a case of three continuous copying in half size, while the time chart in FIG. 5-2 shows a case of two continuous copying in full size.

$S_1$-$S_{15}$, OHP and RG correspond to the output and input signals of the sequence controller $Q_2$ in FIG. 4, while Cl, CPOS-A, B, C correspond to the inputs of the management controller. $CL_1$ and $CL_2$ indicate the operating states of the forward and backward clutches. COPY-CNT designates a counter memory for the copy number in RAM, and the numerals in the drawing indicate the copy numbers at that time. This copy numbers are displayed in the display device 73. Timers $T_2$-$T_6$ are for determining the paper detection timing to discriminate the paper jamming at every location in the paper feeding path. $T_1$ is timer counter for checking the delayed jam upto the discharge sensor 40 with a timing "2" in the drawing. $T_3$ is a timer counter for checking the staying jam on the sensor 40 with the timing "1". $T_4$ is a timer counter for checking the oblique movement by the paper feed sensors 36, 37. $T_5$ is a timer counter for checking the delayed jam upto the image transfer sensor 35 with the timing "3". These timer counters use a part of the memory RAM in the sequence controller $Q_2$. The numerical figures in FIG. 5-2 are the count numbers of the drum clock CL, which are obtained by the sequence counter CNT in RAM and the abovementioned timer counters $T_2$ to $T_5$. Such pulse counting operations are effected by the program process in accordance with the flow charts to be described later.

In FIG. 4, the output signal $S_1$ of the sequence controller $Q_2$ is for turning on and off a main motor (not shown) which rotationally controls the photosensitive drum 11. This signal $S_1$ is introduced as an input into a well known motor circuit $M_1$ to drive the motor through a driver circuit 400. A signal $S_2$ is for turning on a solenoid to cause the constantly rotating paper feeding roller 28-1 or 28-2 to come down onto the cassette. This signal $S_2$ is introduced as an input into the solenoid SL through a driver circuit 401 in FIG. 14-1. Signals $S_3$, $S_4$ are for turning the clutch on to rotate the first register rollers 29-1, 29-2 and the second register roller 30. These signals are introduced as inputs into the clutches $C_1$, $C_2$ through a driver circuit 402 in FIG. 14-1. The signal $S_5$ is for controlling lighting of the halogen lamp 16, and is introduced as an input into a TRIAC in FIG. 14-5 through a driver 403. Signals $S_6$, $S_7$ are for turning the clutch on to cause the optical system 15, 16 and 17 to reciprocally move by the main motor. These signals are introduced as input into the clutches $CL_1$, $CL_2$ through the drivers 404, 405 in FIG. 14-1. A signal $S_{12}$ is for rotating an agitating motor to agitate the toner in the developer 25, and is introduced as an input into the motor circuit $M_2$ through a driver 406. Signals $S_8$, $S_9$ are for lighting on the blank lamp 224 and overall exposure lamp 24, and are introduced as input into a well known lighting circuit (not shown). A signal $S_{10}$ is for changing the discharge state of the AC corona charger 23, and is introduced as an input into a well known switch circuit to turn on and off a voltage to be applied to the grid of the charger. By turning on of the copy switch, discharge takes place sequentially in stepwise from a weak voltage to a predetermined voltage. By termination of the copying operation, the reverse operation thereto is performed, and finally it is attenuated to zero. $S_{11}$ is a signal to render on-and-off a high tension transformer to control the pre-AC corona charger 222, the primary corona charger 22, and the image transfer charger 31. The signal is introduced as an input into a well known switch circuit to turn on and off the primary side of the transformer. $S_{13}$ is a signal to control the detecting operations of the surface potentiometer 41, and is introduced as an input into the detection circuit of the potentiometer in FIG. 14-4. $S_{14}$ is a development bias signal for controlling the bias voltage to be applied to the developer. This signal is synchronized with the agitation signal $S_{12}$ and is introduced as an input into a switch for changing over the bias voltage. The main motor signal $S_1$ also serves as an operating signal for the pre-exposure lamp 223, an operating signal for all fan motors, an operating signal for the primary side of the high tension AC transformer, and a development bias operating signal. WT at the output port 12 is a signal for lighting up the wait lamp 75. HLM at the photosensitive drum 11 is a signal for inhibiting the halogen lamp when it lights up abnormally. This signal is introduced as an input into a well known lighting circuit to light up the call lamp 59 and, at the same time, LED-F in the housing. The output ports 15-18 are respectively signals for lighting on and off the indication marks 69, 68, 67 and 66 when the paper jam at the paper discharging section, the image fixing section, the image transfer section, and the paper feeding section has been detected. This signal is introduced as an input into a well known indicator lighting on-and-off circuit, and into the gates $Q_{3-1}$ to $Q_{3-4}$ connected to the input ports 0-3 of the management controller $Q_1$ so as to correctively indicate the sheet number by the indicator device 102 (73) after operationally processing the number of the jammed paper.

The input signals OHP and RG of the sequence controller $Q_2$ are the signals for detecting the stoppage and register positions from the abovementioned hole elements 38, 39 obtained by the reciprocating motion of the optical system. On the other hand, CPOSB and CPOSC are the paper detecting signals from the paper sensor 35 at the image transfer section and the paper sensor 40 at the paper discharging section. SWS is a switch signal which has detected the on-and-off state of the door switch and the main switch, and is obtained from the transistor $Tr_3$ in FIG. 9. CPOS ① is a proper detecting signal from the sensor 36-1 or 37-1 to be a reference for detecting the slant movement of the paper within the paper feeding sensor. CPOS ② and CPOS ③ are respectively the paper detection signals which are sequentially introduced as input from the other sensors 36-2, 36-3, or 37-2, 37-3. RS is a signal generated by the jam reset switch 47 to release a state of prohibited reproduction operation caused by the paper jam, and other troubles. This signal is obtained from the circuit shown in FIG. 7. WTS is a signal for prohibiting the reproduction until the image fixing heater reaches a predetermined temperature, and is obtained from the temperature detecting circuit in FIG. 6. This circuit produces an output signal WTD to light on the wait lamp. Cassette signals ① to ③ are the signals to be obtained by the switch 42 or 43 at the time of loading of the cassette to judge the loading and unloading of the cassette and the size thereof. These signals are introduced as input into the circuit in FIG. 12. PEP is a detection signal which has detected absence of paper in the cassette, and is introduced into the light receiving device 44-2 or 45-2. DCP is a drum clock detection signal due to repetition pulses from the light receiving element 11*b*. These detection signals are obtained from the circuit as shown in FIG. 8. The input signal CPOS-C (paper discharge signal) of the sequence controller is also introduced as an input into the sorter controller $Q_4$ to be used for controlling the distribution bins (shelves of the sorter). Also, a preparatory signal from the sorter controller $Q_4$ is introduced as a wait signal input WTS at the time of connection of the sorter so that the reproduction operation can be commenced with the sorter for the image bearing paper being ready for their receipt.

The output signal BZ of the management controller $Q_1$ is a buzzer sound signal to produce oscillating sounds at every input by the key circuit 101. This signal is introduced as an input into a well known buzzer oscillation circuit. IRD is a signal for lighting up the indicator device when the copy interruption key 55 has been received; OFD is a signal for lighting up the indicator device when the image original has been mounted on the platen 14; and CHD is a signal for lighting up the examination key 49 when it is received. These signals are introduced as input into a well known LED lighting circuit. CHFC is a signal for checking each of the abovementioned sensors, and is introduced as an input into the gates $Q_{6-1}$ and $Q_{6-2}$. DFE is an enable signal showing operability of the ADF, and is introduced into the ADF controller as an input. UL is a signal for changing over the cassette stage for the paper feeding, and is introduced as an input into the cassette control circuit in FIG. 12. STAT is a copy starting signal by the copy keys, etc., and is introduced as an input into the input port O of the sequence controller $Q_2$.

CAL is an input signal into the management controller $Q_1$, and introduced thereinto when various loads and abnormal states in the circuits have been detected. This signal is used for the key entry and discontinuation of copying, and obtained from the circuit shown in FIG. 14-1. STB is a stand-by signal indicating that preparation in the ADF has been completed. This stand-by signal is obtained from the ADF controller $Q_3$. OF is a zero input signal when the image original cover is lifted for checking the image original set on the platen; and SIZ is a signal which detects size of the cassette for use in the reproduction (i.e., full size or half size). These signals are obtained from the circuit shown in FIG. 12, and are used for correcting the indication. CHE is a zero input signal when the examination key 49 is turned on to check the sensors at an established time. In addition, the output signal $S_8$ (blank lamp control), $S_{10}$ (AC transformer output control), and $S_{11}$ (primary transformer control) of the sequence controller $Q_2$ are introduced as input into the management controller $Q_1$ for processing of the sequence mode control, key entry control display control, and jam subtraction, and so forth. (ADF ROM)

Figure 12:
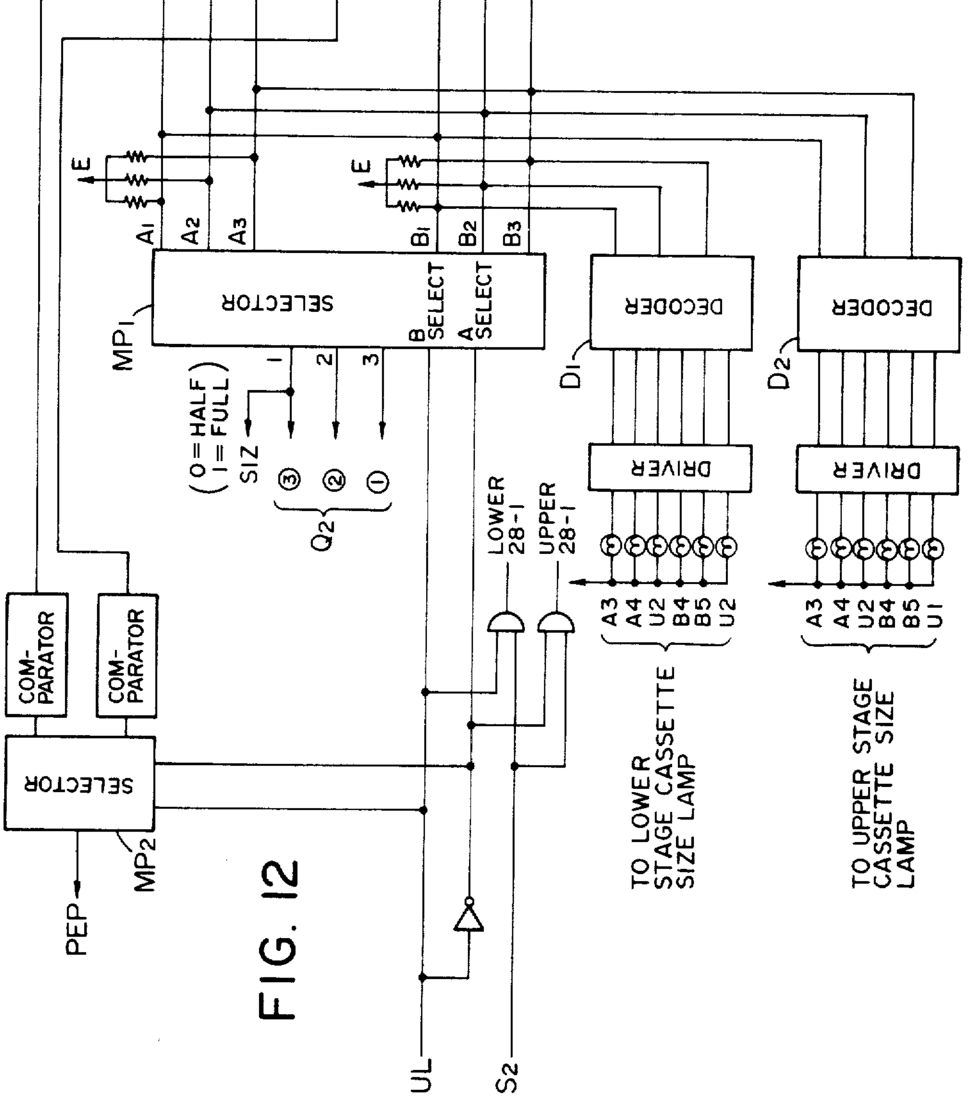
FIG. 12 shows a cassette circuit.

MOD and STOP in the ADF controller $Q_3$ are signals from the mode switch and stop key, respectively, while 84S, 85S, 90S and 91S are signals from the original sensor in FIG. 12. These signals are introduced as input into the ADF controller $Q_3$ together with the enable signal DFE from the management controller $Q_1$. STB is an ADF stand-by signal; SM, FEM and PLS are respectively control signals for a setter motor to control the belt 89, a feed motor to control the rollers 87, 88, and a plunger to move the pawl up and down; and DFJ is a jam indication signal. The sensors, motors, and indication circuit concerned with every input and output are sufficient with those as mentioned in the foregoing.

(Related Circuits)

Figure 6:
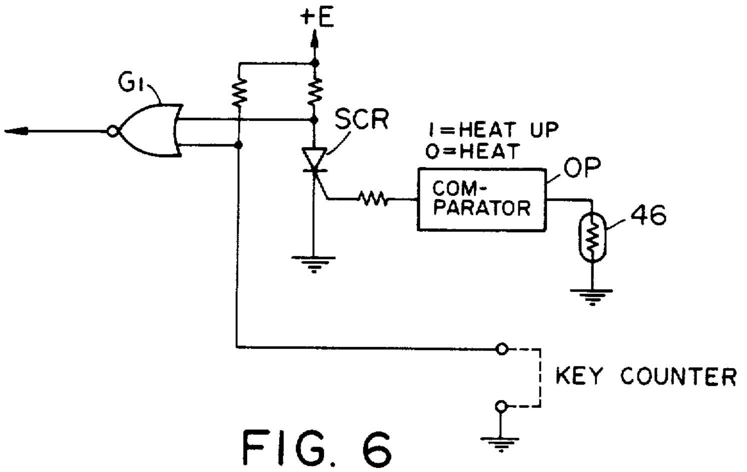
FIG. 6 shows a "wait" signal generating circuit.

The wait signal generating circuit in FIG. 6 turns the main switch on to commence heating of the roller heater. While the temperature sensor 46 is detecting the roller surface temperature to be lower than a predetermined level, the comparator OP produces an output O. On account of this, the thyrister SCR remains in an off-state, and every input of the gate $G_1$ assumes 1, 0, whereby the gate output generates the wait signal WT. When the sensor detects that the temperature of the image fixing roller heater has reached the predetermined level, SCR is turned on by an output from the comparator, whereby the output from the gate $G_1$ assumes a level "1". Thereafter, when the key counter is off, the gate $G_1$ produces an output of the level "0" to render the reproduction apparatus in its waiting condition.

Figure 7:
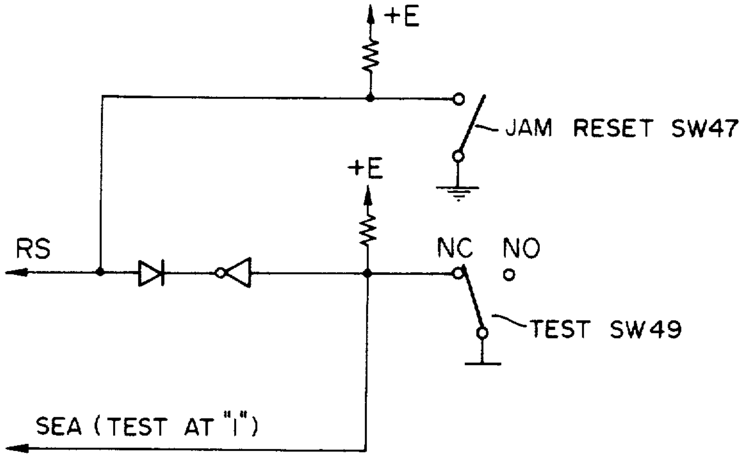
FIG. 7 shows a jam reset examination signal generating circuit.
Figure 8:
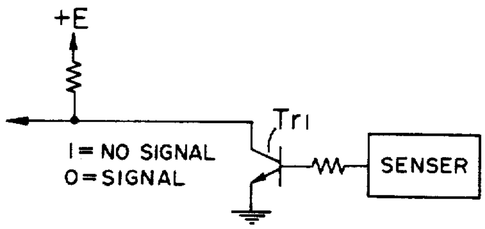
FIG. 8 shows a sensor signal generating circuit.

FIG. 7 shows the jam reset circuit and the examination switch circuit. In the illustration, when the reset switch 47 is turned on, the signal RS assumes "0" to generate the reset signal. When the examination switch 49 is turned on (NO side), the examination signal CHE (1) is generated, and the signal RS is rendered "0". In other words, the examination process is performed with the jam reset being on, i.e., with the jam detection being prohibited.

FIG. 8 is a circuit for generating various detection signals due to the paper sensor, register sensor, and so forth. The circuit causes the outputs from the light receiving device (35, 36, 37, 40, 44-2, 45-2, etc.) and the hole element (38, 39, 48, etc.) to be reversed by a transistor $Tr_1$, and renders the signal "0" to be the detection signal.

FIG. 9 shows the power source detection circuit, in which DSW denotes a switch which is brought to its illustrated position by the opening of the main body door; MSW is a switch which is brought to its illustrated position by the opening of the main switch; $ST_1$, $ST_2$ designate stabilizing circuits of a well known type, which rectify, smooth, and stabilize the outputs from the voltage lowering transformers $T_1$, $T_2$; and $FS_1$, $FS_2$ refer to fuses. When connector is connected with the AC power source, the transistor $Tr_3$ produces an output signal SWS (0) to show the power source on-state, with the MSW, DWS being on-state. When the door switch DSW or the main switch MSW are turned off, the SWS assumes the level "1" at the time of occurrence of the paper jam, the power source to the stabilizing circuit $ST_2$ is changed over by actuation of the relay $K_1$ to maintain the circuit $ST_2$ in its state of continuous turning-on irrespective of the off-state of $ST_1$. In this way, the power source for the computers $Q_1$ and $Q_2$ is not turned off, thereby storing and holding the data for the copy numbers, number of the jammed paper, and number of interruption copy. Incidentally, the output from $ST_1$ is connected to the 24 V power source of various circuits, and the output from $ST_2$ is connected to the power source line 15 V of the controllers $Q_1$, $Q_2$. When no paper jamming has occurred, the abovementioned data storing and holding operations are not done, even if the signal SWS assumes the level "1" by turn-off of MSW and DSW. When the AC load and the stabilizing circuit $ST_1$ are used for both the copier and the ADF, and the stabilizing circuit $ST_2$ is used as the power source for $CPU_{1-4}$, the AC power connector can be reduced in number.

FIG. 10 illustrates the signal generating circuit indicating the light-on state of the halogen lamp. When the lamp stabilizer $ST_3$ is normal and the lamp 16 operates regularly, i.e., at the time of the lamp being on, the photo-coupler PHC produces an output "0", and, at the time of the lamp being off, the photo-coupler produces an output "1". These outputs are introduced as input into the input port 1 of the sequence controller $Q_2$.

FIG. 11 shows a timer circuit which is set after lapse of 30 seconds from stoppage of the main motor to automatically vary the copy display devices 72, 73 to the levels "1", "0". The timer $T_{10}$ starts its time-limiting operation for 30 seconds with rising of the main motor signal $S_1$, and produces an output "1" to the gate $Q_{4-1}$ upto its time-up. During this signal "1", the management controller $Q_1$ maintains the segment indication of the display devices 72, 73.

Figure 13:
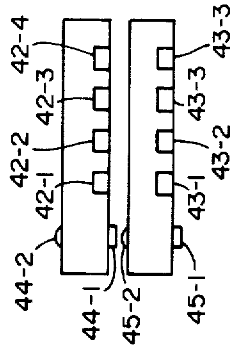
FIG. 13 is a cross-sectional view of a cassette inserting section.

FIG. 12 shows a cassette control circuit, and FIG. 13 shows a lay-out diagram of the micro-switches as viewed from the entrance side of the cassette stages. In order to judge various sizes of paper such as full size, half size, $A_3$, $A_4$, $B_4$, $B_5$, $U_1$ and $U_2$ by on-and-off combination of the upper cassette switch group 42 (consisting of 42-1, 42-2, 42-3 and 42-4) and the lower cassette switch group 43 (consisting of 43-1, 43-2, 43-3 and 43-4), these switch signals are introduced as input cassette signals ①, ② and ③ into the controller $Q_2$. They determine the return timing of reciprocating member and the up-timing of the jam timer $T_3$. The selector $MP_1$ operates to select the lower cassette switch signal outputs with the level "1" of the cassette stage signal UL from the management controller $Q_1$. Incidentally, since the cassette signal ③ is so made that is assumes the level "1" at the time of the full size in A-3, B-4 and U-1 category of the paper size (the switches corresponding to $A_1$ and $B_1$ are turned off), it is used as a full-or-half discrimination signal SIZ. Also, the selector $MP_2$ produces as an output PEP no-paper detection signal by the sensors 44-2 and 45-2, and introduces it to the controller $Q_2$ in accordance with the cassette stage designation. Also, the lamp 62 is lighted on with the no-cassette signal due to the PEP signal or the cassette signals ①, ② and ③ entirely assuming the level "1". Also, the signals by the micro-switches are decoded into the size signals by the decoders $D_1$, $D_2$, whereby the size lamps are each cassette stage are constantly lit.

Figures 1, 2, 14:
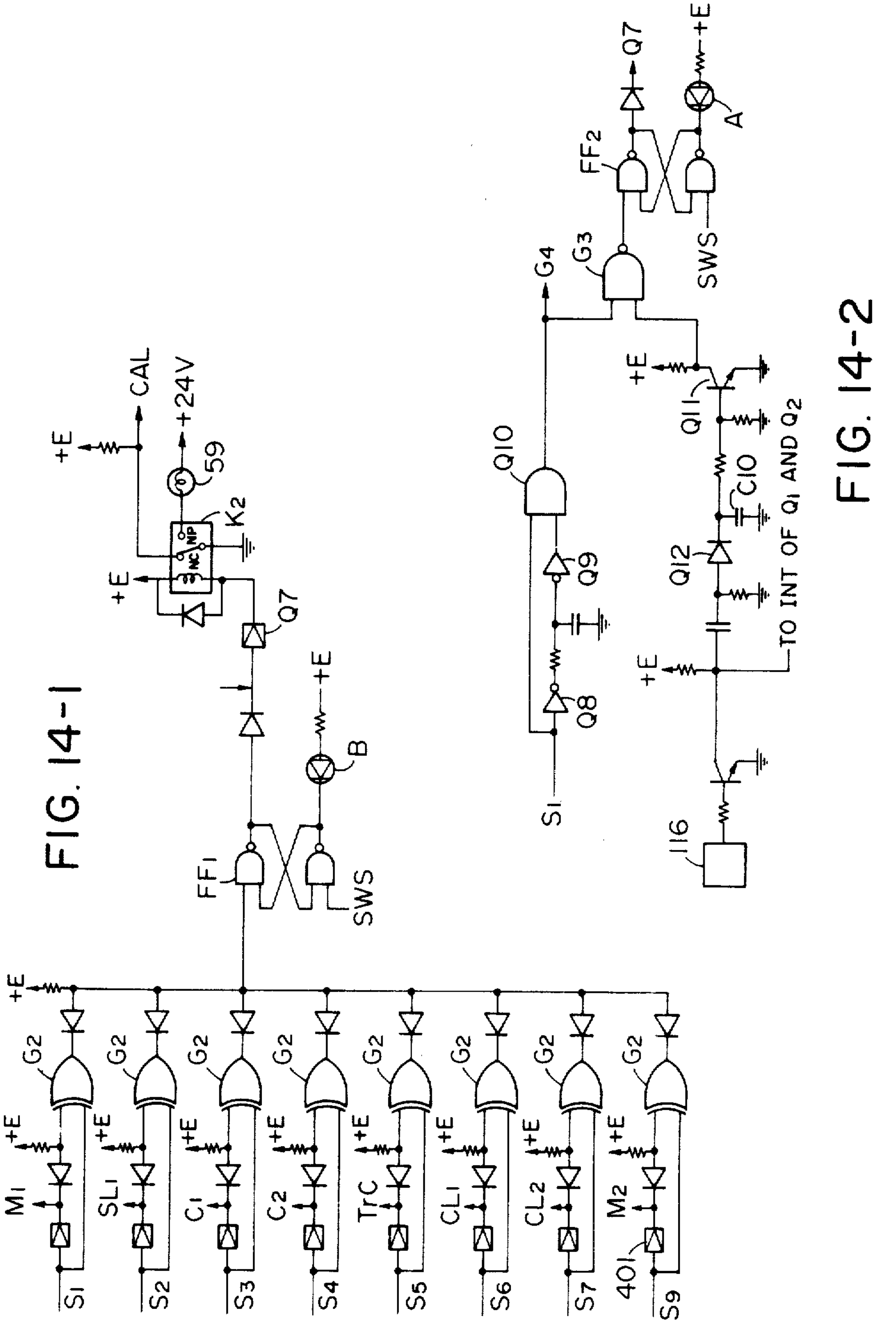
Figures 5, 14:
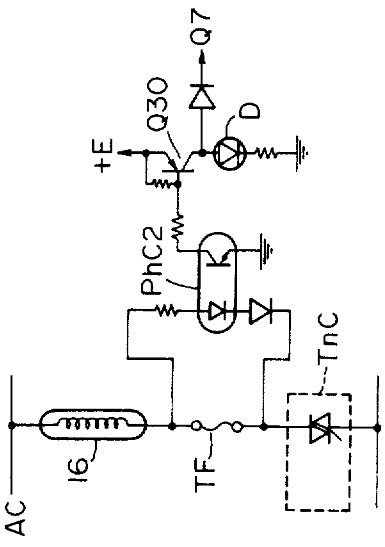
Figures 3, 14:
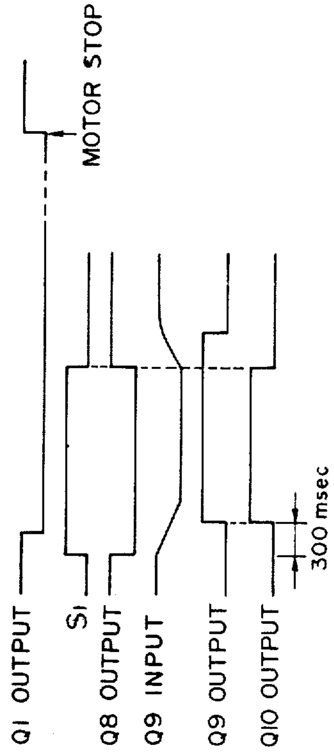
Figures 4, 14:
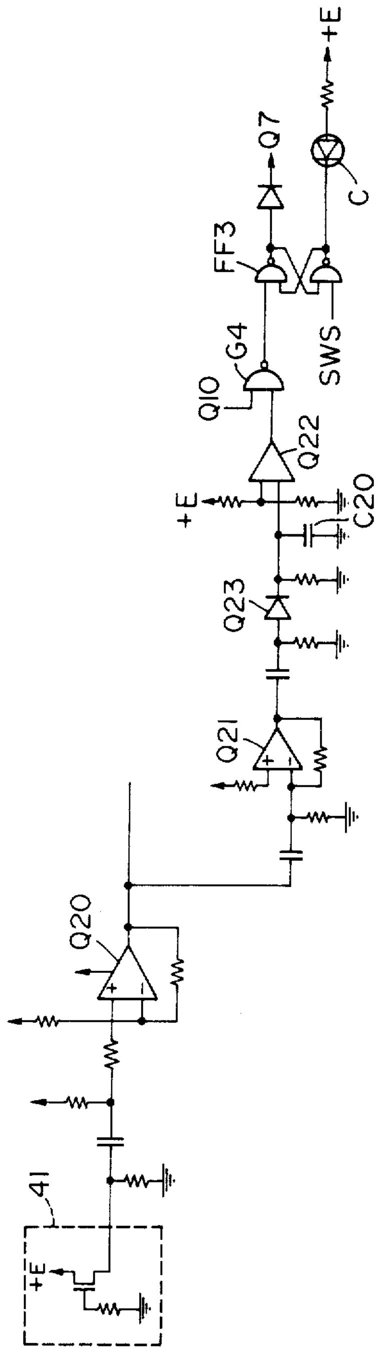

FIGS. 14-1 to 14-5 show the examination circuits to constantly monitor the electrical load control circuit, etc.

FIG. 14-1 shows a circuit for checking troubles in the driver 400 to 407 which drives (or amplify signals of) the sequence load such as the main motor, etc. In the following, explanations of this circuit will be given with the main motor as an example. In the drawing, $G_2$ designates an exclusive OR gate to judge the trouble occurred, into one of the inputs of which the main motor drive signal $S_1(A)$ is introduced as an input, and into the other of which the output (B) of the driver 400 is introduced. This exclusive OR gate $G_2$ produces an output with the logic of $\bar{A}\cdot B + A\cdot\bar{B}$. When its output assumes the level "1", it sets the flip-flop $FF_1$ to actuate the amplifier $Q_7$ for turning the relay on. With this relay K2, the call mark lamp 59 to produce the call signal output CAL at the level "1". Similarly, when the other driver becomes out of order, the flip-flop $FF_1$ is set by variation in its output to produce the call mark call signal output, thereby lighting the driver trouble mark LED-B. This flip-flop $FF_1$ remains in its set condition until it is reset by the rising of the power source switch signal SWS, and the reproduction operation is discontinued.

FIG. 14-2 illustrates a circuit for checking troubles in the main motor, and the drum clock generator. FIG. 14-3 shows an operating time chart for each part of the circuit. When no pulse CL is produced from the photo-interruptor 11*b* into the operating signal (the output from the gate $Q_{10}$ assumes the level "1") of the main motor, i.e., the output from the gate $Q_{11}$ assumes the level "1", an output is produced from the gate $G_3$. Usually, the gate $Q_{11}$ is turned on with a DC level of a pulse which has been rectified and smoothed by $Q_{12}$ and $C_{10}$. The gate $G_3$ sets the flip-flop $FF_2$ to actuate the amplifier $Q_7$ in FIG. 14-1, produce the call signal output, and light on LED-A. The flip-flop $FF_2$ is reset by the power source switch signal SWS. By the way, the output from the gate $Q_{10}$ is delayed by 300 m sec. from rising of the motor drive signal $S_1$. This time delay is for preventing any erroneous operation from taking place, since generation of the initial pulse delays from the start of rotation of the motor, and its period of generation is not constant.

FIG. 14-4 is a circuit for checking the troubles in the surface potentiometer 41, wherein the off-state is detected with an a.c. output to light on the LED-C. The a.c. signal from FET due to rotation of the rotor of the potentiometer 41 is amplified by the amplifiers $Q_{20}$, $Q_{21}$, rectified by $Q_{23}$, smoothed by $C_{20}$, and compared by a comparator $Q_{22}$ with a predetermined value, whereby an output "0" is produced from $Q_{22}$ under the normal condition. When the a.c. signal tends to be interrupted, the charge-up state in $C_{20}$ cannot be maintained, whereby an output "1" is produced from $Q_{22}$. At this time, since the main motor signal from $Q_{10}$ (FIG. 14-2) is at the level "1", the output from the NOR gate $G_4$ change to "0", whereby the flip-flop $FF_3$ is set to light on LED-C and produce the call signal output to $Q_7$. The flip-flop $FF_3$ is reset by the power source switch signal SWS.

FIG. 14-5 shows a circuit which detects disruption of the temperature fuse in the lamp 17 (the fuse is provided in the vicinity of the platen 14, i.e., in contiguity to, or in contact with, a position on the rear surface of the platen glass where no effect is given to the image reproduction), and produces the call signal output. The circuit detects overheating of the platen. When the fuse TF is disrupted, the photo-coupler PHC 2 is turned on to produce an output, thereby turning the transistor $Q_{30}$ on, lighting the LED-D on, and producing the call signal output to the amplifier $Q_7$.

Although not shown in the drawing, there is further provided a temperature adjusting circuit for the roller heater by the thermister 46. For this circuit, a temperature fuse $TF_2$ is provided apart from the roller in series with the thermister 46. Fusing of this temperature fuse $TF_2$ is detected by a circuit similar to the abovementioned fuse ($TF_1$) disruption detecting circuit, and the call signal output is introduced into the amplifier $Q_7$ to light on the LED-F. The call signal CAL is introduced as an input into $Q_1$ to control running of the key entry and $Q_2$.

In this way, the operator is constantly notified of any checked results on the print base plate and various locations which are important from the standpoint of safety in the operation of the reproduction apparatus. With such checked result, the operator is in a position to promptly discontinue the copying operation whenever troubles occur in the machine.

(Control ROM)

FIG. 15-1 is the system flow chart of the programs stored in ROM of the management controller $Q_1$.

When the power source 15 V of the management controller $Q_1$ is turned on (Step 0), the controller $Q_1$ first produces a probing signal for the key entry to discriminate whether the examination key 49 has been turned on, or not. Upon detection of the on-state of the examination key, it further discriminates the turning-on of the subsequent copy key to sequentially send out paper from the upper or lower cassette to perform the ordinary copying process, while performing checking of troubles in the paper sensor, register sensor, etc. If there is any sensor which is out of order, the number of the print base plate is displayed on the segment display device 73 which indicates the copy number (Steps 1, 2 and 3).

Also, the on-state of the numerical keys and copy key is discriminated to produce oscillating sound as the output to introduce the signal STAT for commencing the copying operation into the sequence controller $Q_2$, to indicate the copy number on the display devices 72, 73, and to introduce an output ADF operable signal DFE into the controller $Q_3$ (Steps 4 and 5).

Also, discrimination is performed as to whether the output jam signals ①, ② and ③ have been produced from the sequence controller $Q_2$, or not, on the basis of which subtraction of the copy number is done, and change in indication of the copy number is done (Steps 6, 7).

Further, discrimination is performed as to whether the service-man-call signal CAL has been introduced as an input into $Q_1$, or not, thereby releasing the start signal STAT and the enable signal DFE, i.e., turning off the main motor, etc. to stop the apparatus (Steps 8 and 10).

Furthermore, the sequence mode in the course of the process sequence, particularly, the termination mode (post-rotational mode) is discriminated to perform control of the entry and display of the numerical keys, copy key, and interruption key.

FIGS. 15-2 and 15-3 are the detailed flow charts showing the operations of the management controller $Q_1$. After the power source 15 V is turned on, the memory, the overflow flag, and the stop flag are cleared, "1" and "0" are introduced into the set counter to set the flag INTL which shows that it is set with "1", after which the process proceeds into the step 4. In the steps 4 to 6, the buzzer counter L is rendered +1 at every passage therethrough after detection of the key operation, and, after the sixteenth passage, the counter is rendered "0" to turn off the buzzer sound. In other words, the steps are for producing oscillating sound for a short period of time at every key entry. Since the flags $H_0$ to $H_5$ sequentially repeat their set and reset at every production of the probing signal output in the steps 10 to 14, they are in no way set simultaneously. Accordingly, at a certain timing, a single data corresponds to the input ports 0 to 3 with respect to turning-on of a single key, or to a single jam signal. Therefore, any of 0, 1, 2 and 3 is read by the flag $H_0$, any of 4, 5, 6 and 7 by the flag $H_1$, any of 8, 9 and C by the flag $H_2$, and any of the lower cassette, STOP, interruption and copy by the flag $H_3$. Also, the service-man-call and the sequence discrimination (of a signal from $Q_2$) are performed by the flag $H_4$. In other words, the sub-flows of the abovementioned process to be done by the discrimination through the abovementioned numerical place flags $H_0$ to $H_4$ correspond to C, D, E and F, respectively. By these sub-flows, the entry and display controls and the key discrimination, etc. are performed. Further, the steps 15 et seq. designate the sub-flow H, in which the number of paper jammed is subtracted from the copy number and displayed.

In the following, explanations will be given as to the numerical entry and display. When the on-state of the numerical key is discriminated in each sub-flow, the key flag F/KEY is set. For example, the steps 161 to 164 are executed in the sub-flow C to set F/KEY 1, thereby showing input of any of 0, 1, 2 and 3. At the step 165, the value is stored in the temporary memory TM in $Q_1$, and then flag discrimination is performed as to whether it is the overflow flag or the set flag 1 already (steps 166, 167). If the flag is "set 1", the numbers of the memory TM are stored in the set memory SET 1 (first numerical place) except for the "0" key, which is displayed on the first numerical place of the display device 72 to turn on the buzzer signal BZ. Further, when the numerical key is turned on, the steps 163 to 172 are again executed by the key flag F/KEY 1 which has been reset at the step 175 through the step 161. The numerical values which have been stored in the temporary memory TM are stored in SET 1 which became vacant by shifting the numerical values in SET 1 to SET 2 at the step 168 (steps 171, 172). Accordingly, the number of SET 1 is indicated on the first numerical place of the display device 72, and the number of SET 2 on the second numerical place thereof. Since the overflow flag F/$\overline{O}$VF is set at the step 168, no third numeral setting is received. Even by the key detection in the sub-flows D and E, the steps 165 et seq. can be executed, and the storage, display and buzzer sound production can be effected same as mentioned above. Since the numerical place pulses are constantly generated at a cycle of a few $\mu$ seconds, the sub-flows C to H can be performed in the scanning system, and the inputs such as keys, etc. can be sensed in time for the operations such as key-on, etc.

In the step 160, when the turning on of the examination key 49 has been detected, the sensor examination flow in FIG. 15-4 is executed, and the poor sensor base plate is displayed on the segment display device 72 as mentioned above.

Also, the interruption key is detected at the step 106 in the sub-flow F to thereby withdraw the data such as numerals, etc. which have so far been obtained, at the step 105. Thereafter, these data are re-called into the initial memory SET, COPY, etc. in the discrimination step 65 of the termination mode in the sub-flow G after termination of the interruption copying (Step 69). Since the interruption data are stored in the locations of RAM which have become vacant by withdrawl (SET1, SET2, etc.), such interruption data are displayed on the segment display device as mentioned above. The cassette data by the upper/lower key are produced as a UL signal output at the step 97, which contributes to the display (when UL is "1", the lower cassette stage is indicated).

Further, at the step 35 in the sub-flow H, the off-state of the switch near the platen is sensed, and the display device which was lit at the step 55 is turned off (Step 36).

When the service-man-call signal is detected at the step 40 in the sub-flow G, the copy start signal STAT and the enable signal DFE of the ADF are turned off, whereby the segment display in the display devices 72, 73 is repeated (Steps 42, 43) to render the key entry impossible. Of these steps, the timer sub-routine 43 compares the duty ratio of on-and-off with the display sub-routine alone so as to bring the display by the display devices 72, 73 to be the same brightness as that other than the call. Accordingly, it is possible to make the display brighter than usual so as to make the warning noticeable.

Figures 1, 18:
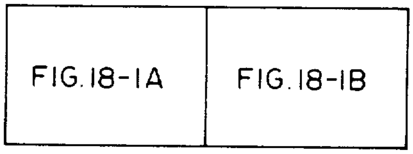
Figures 2, 18:
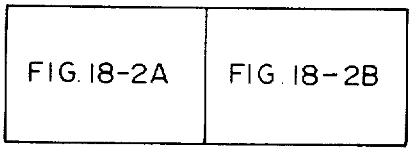
Figures 3, 18:
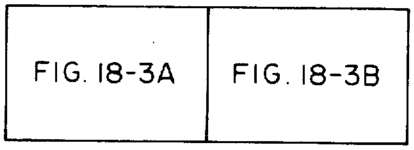
Figures 2A, 15:
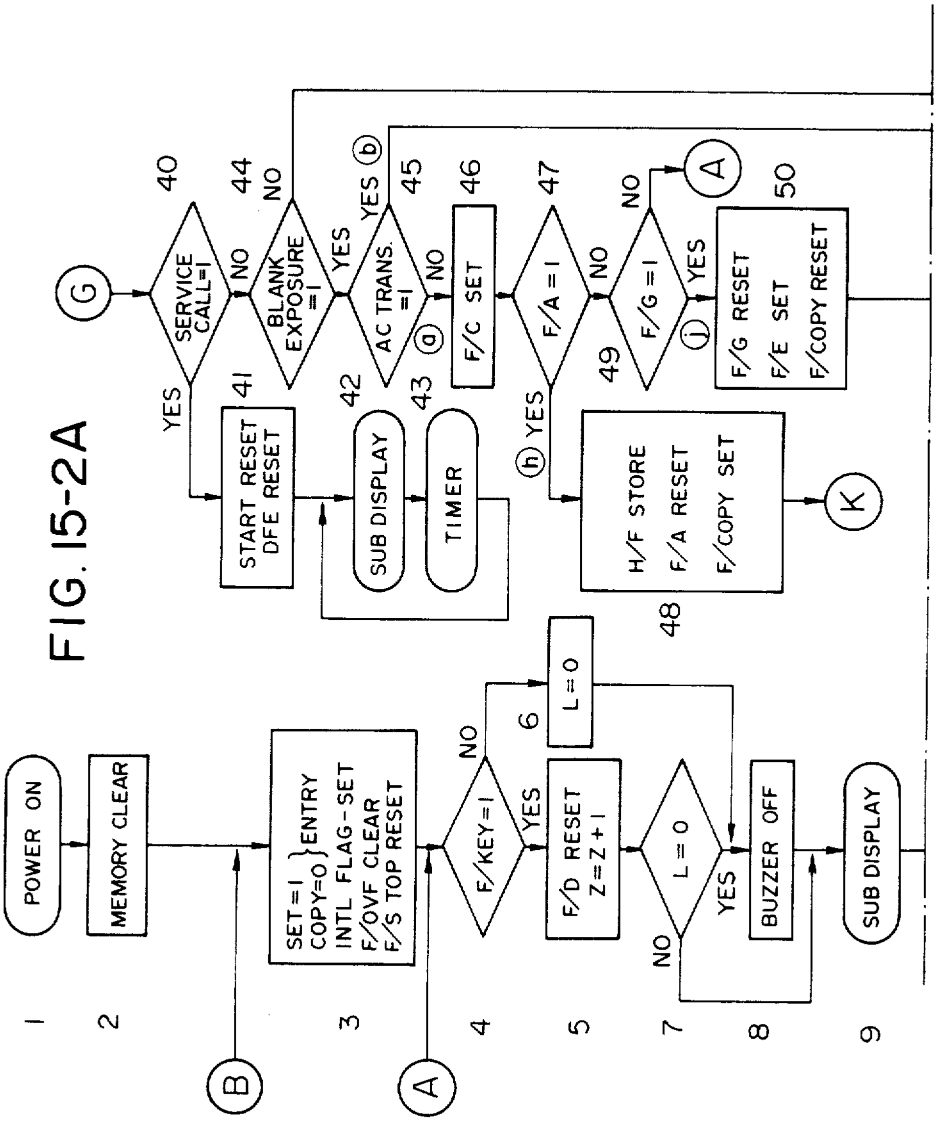
Figures 2B, 15:
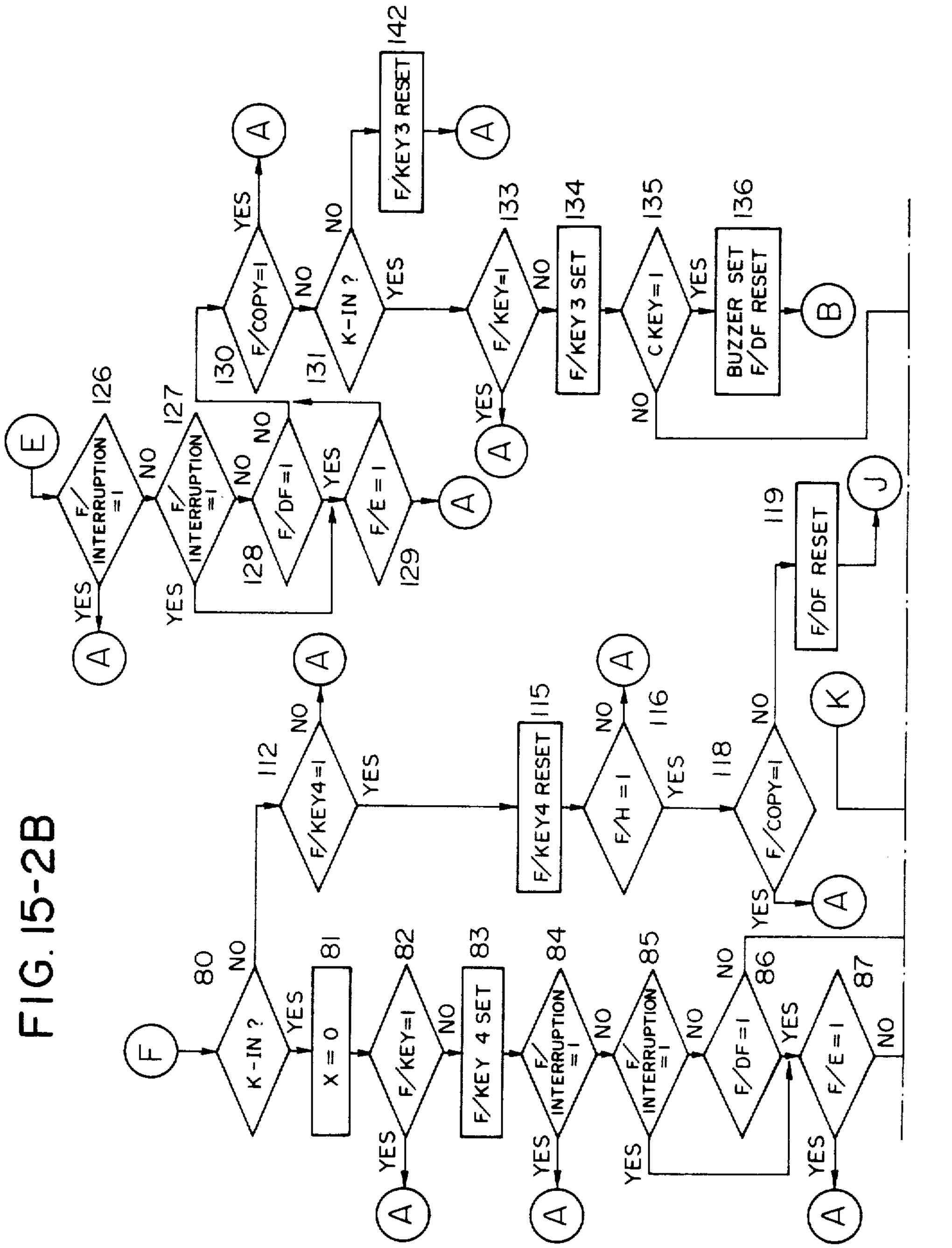
Figures 2C, 15:
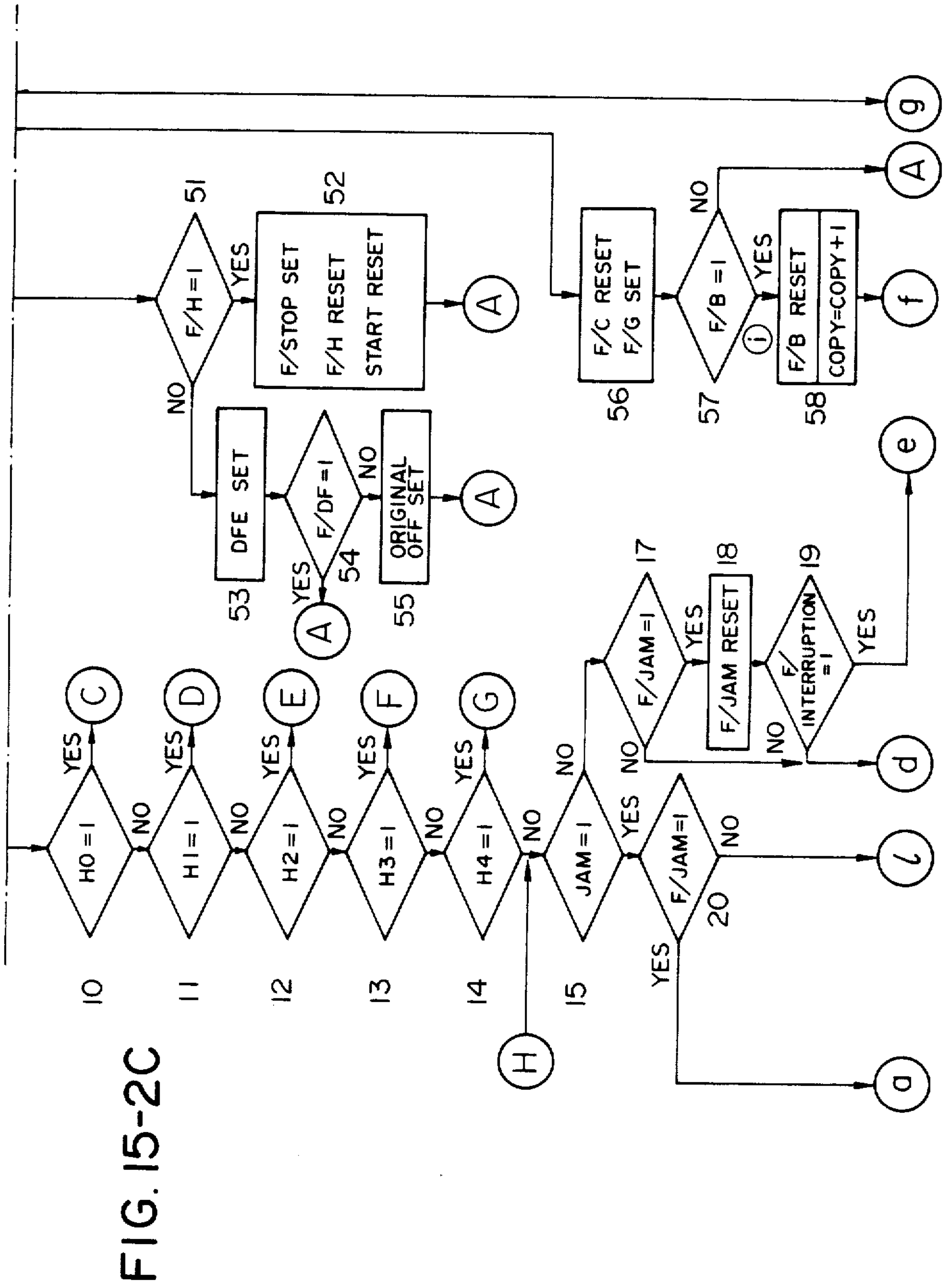
Figures 2D, 15:
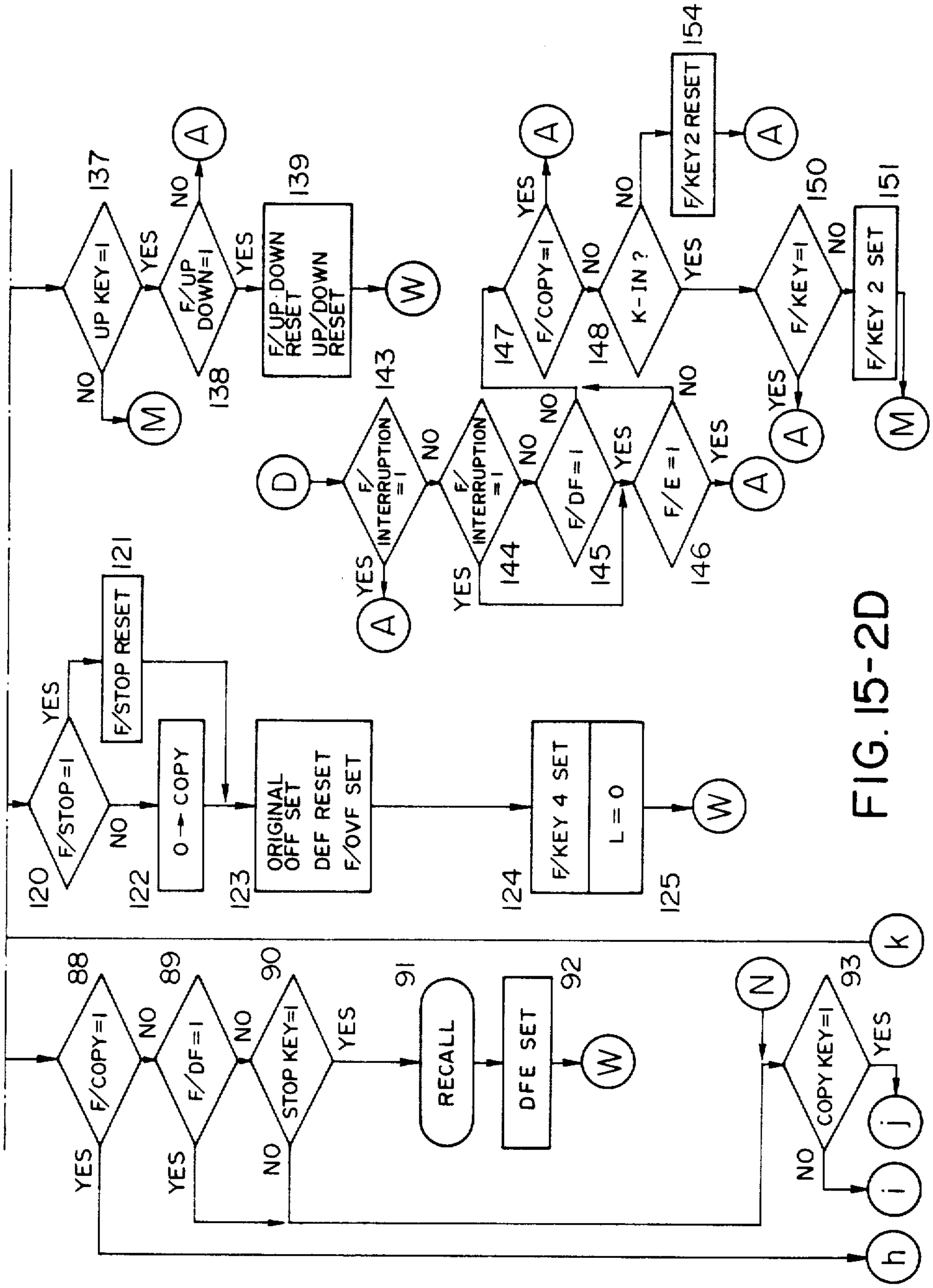
Figures 3A, 15:
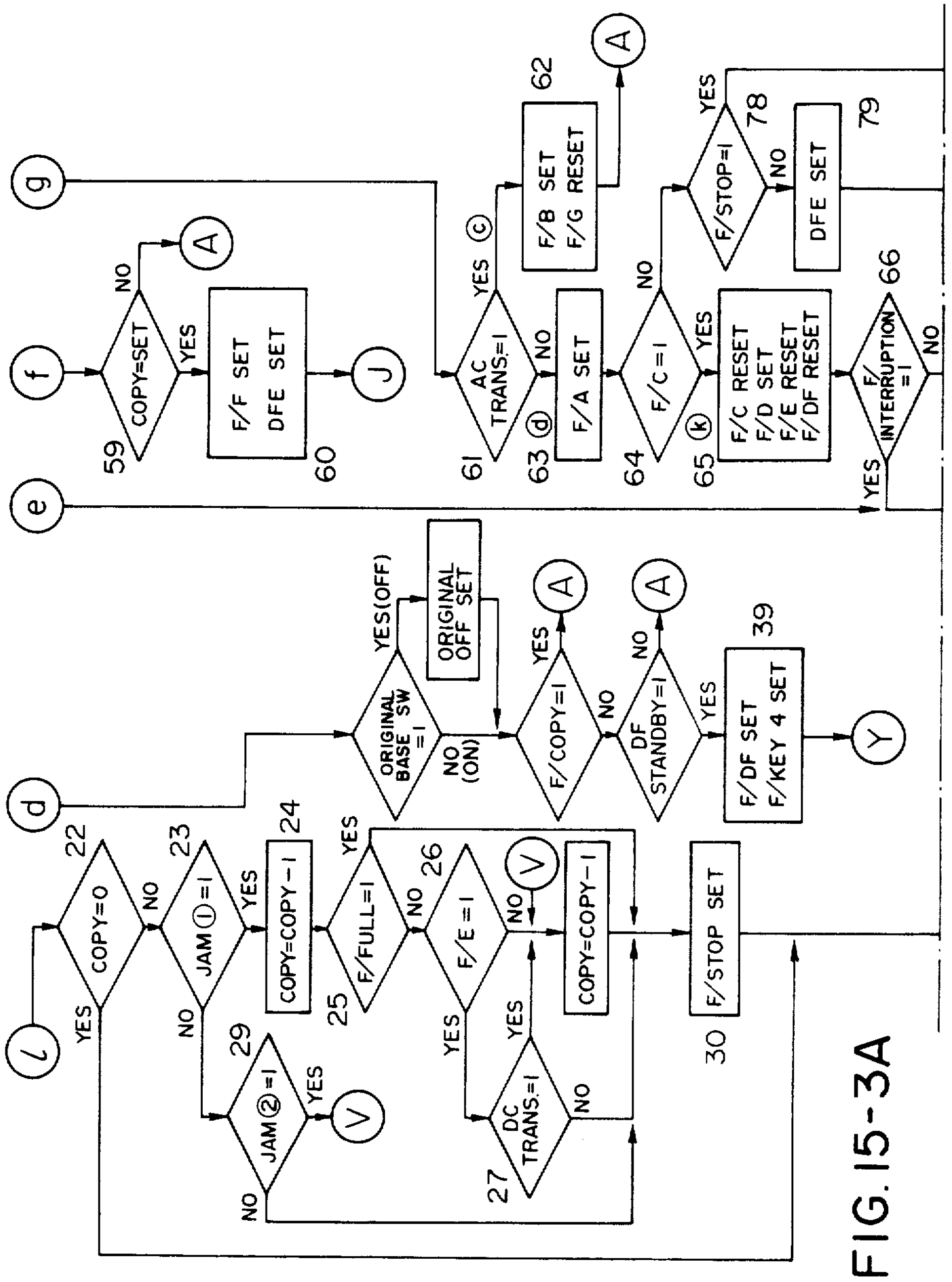
Figures 3B, 15:
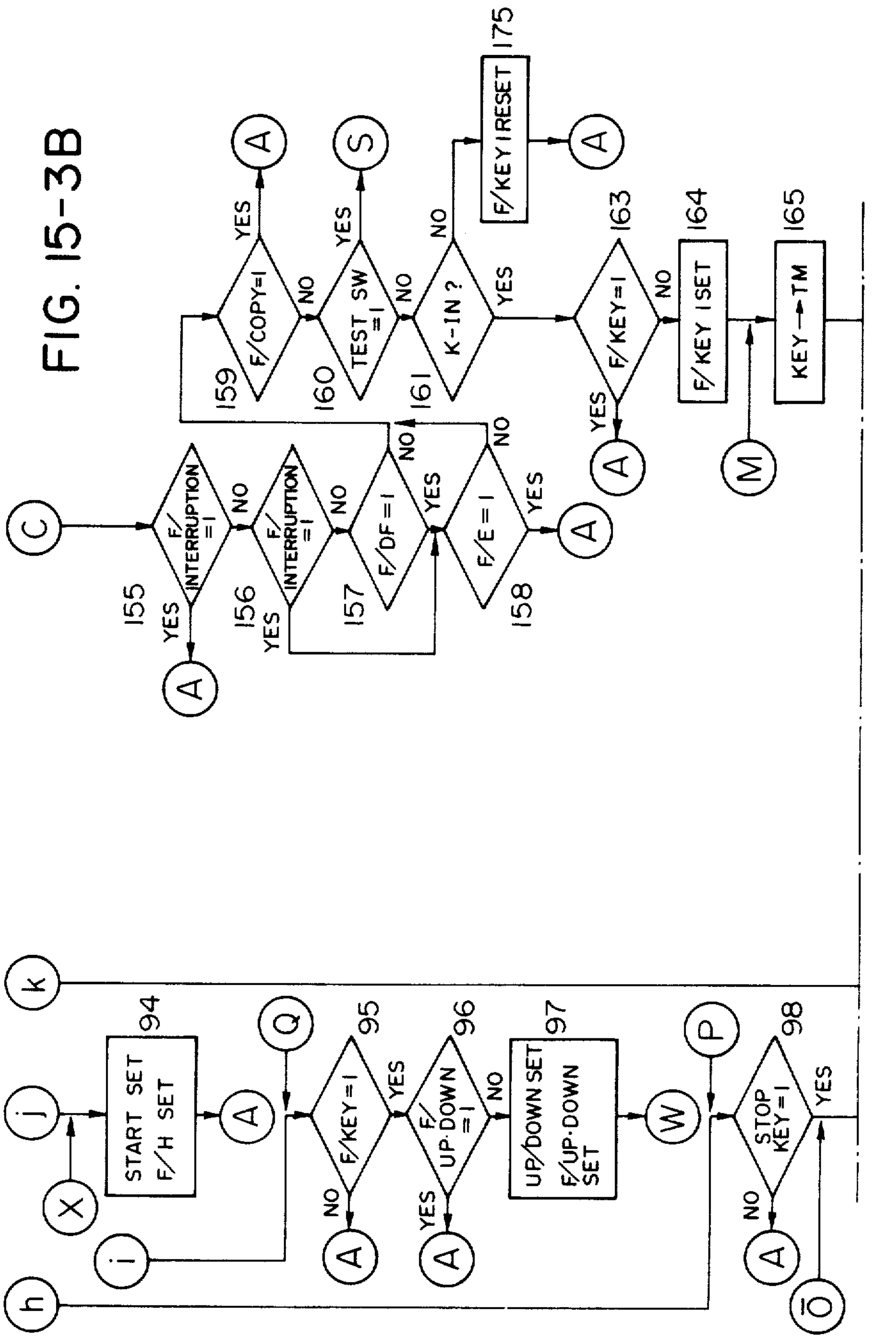
Figures 3C, 15:
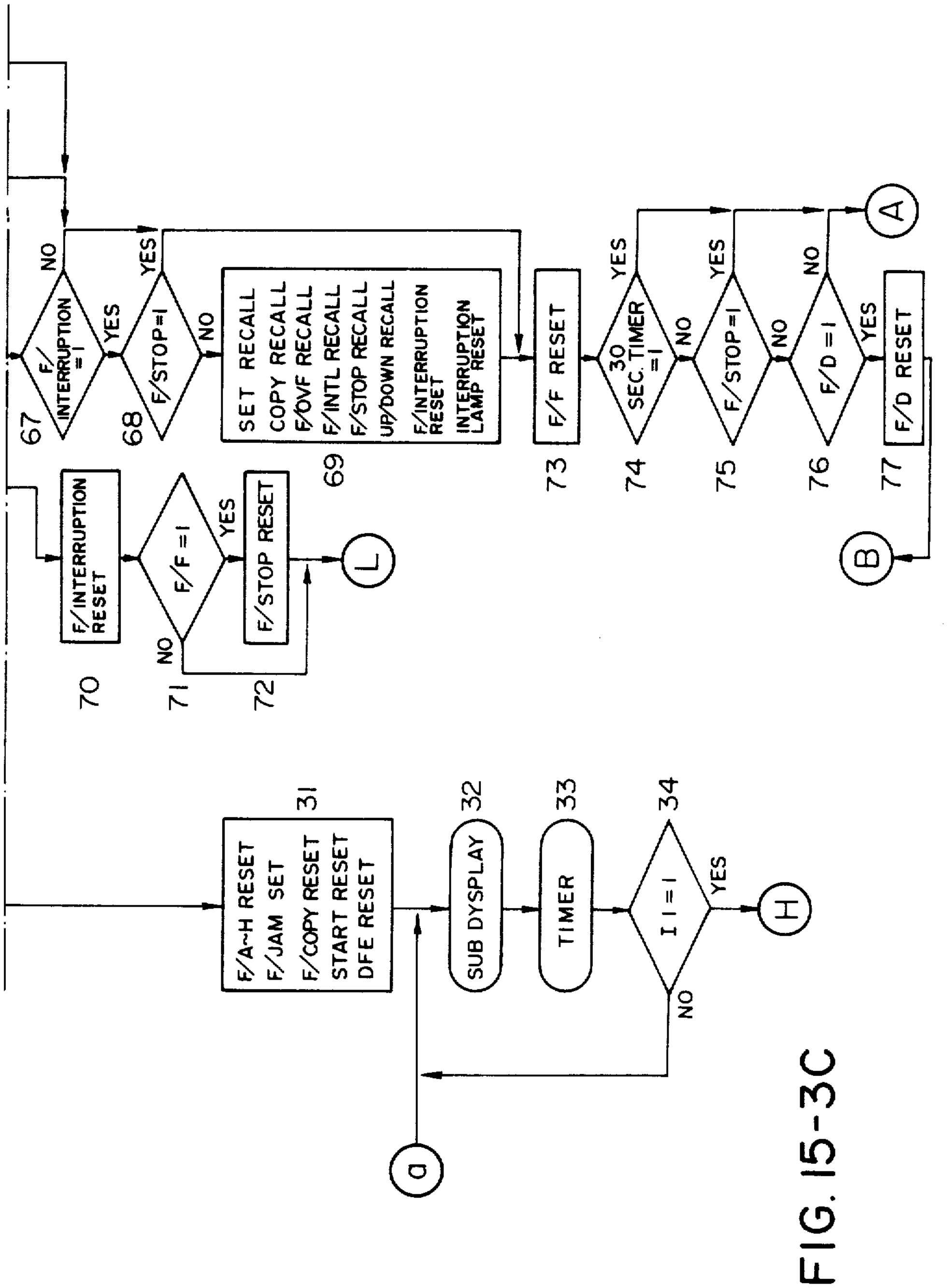
Figures 3D, 15:
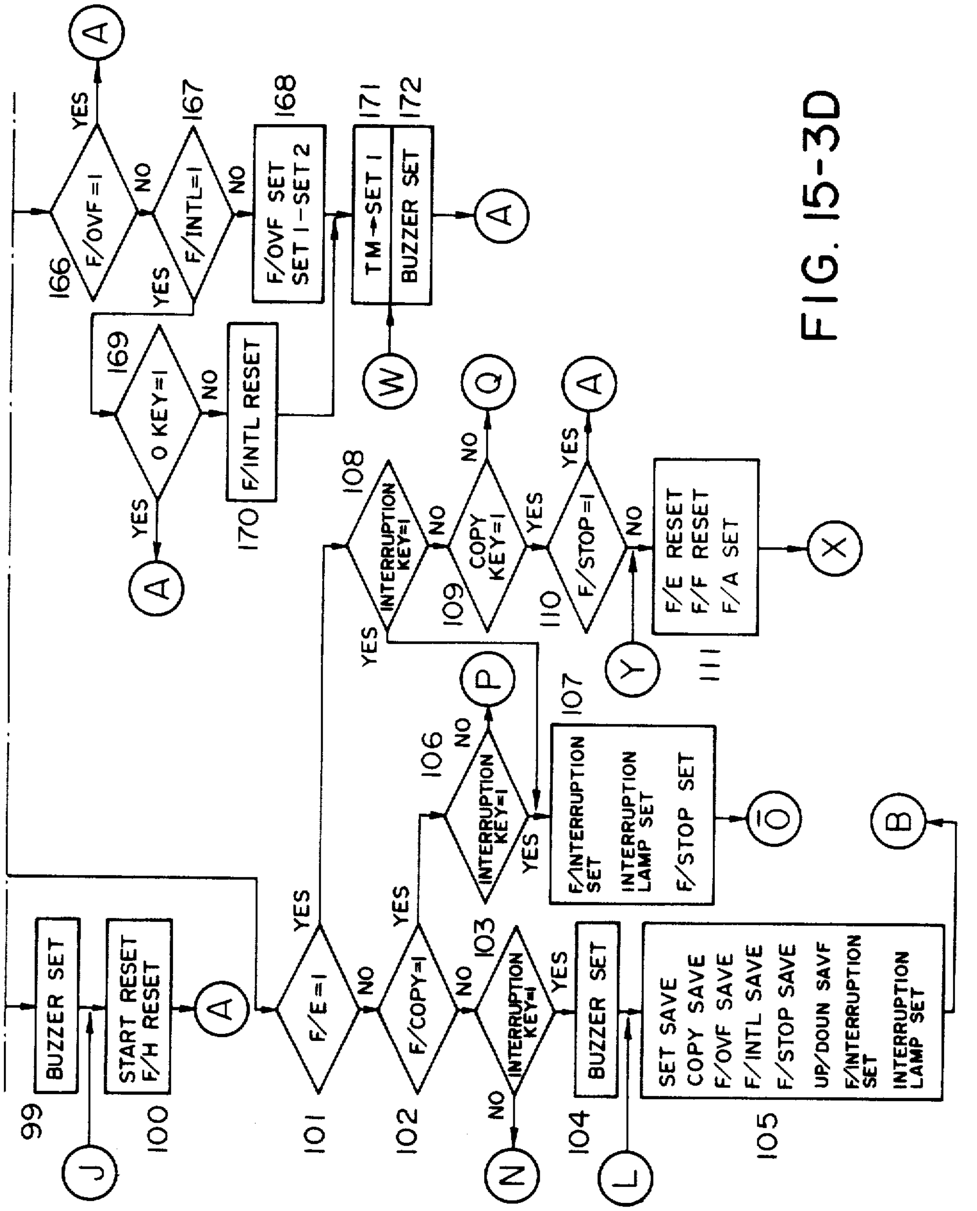
Figures 4A, 15:
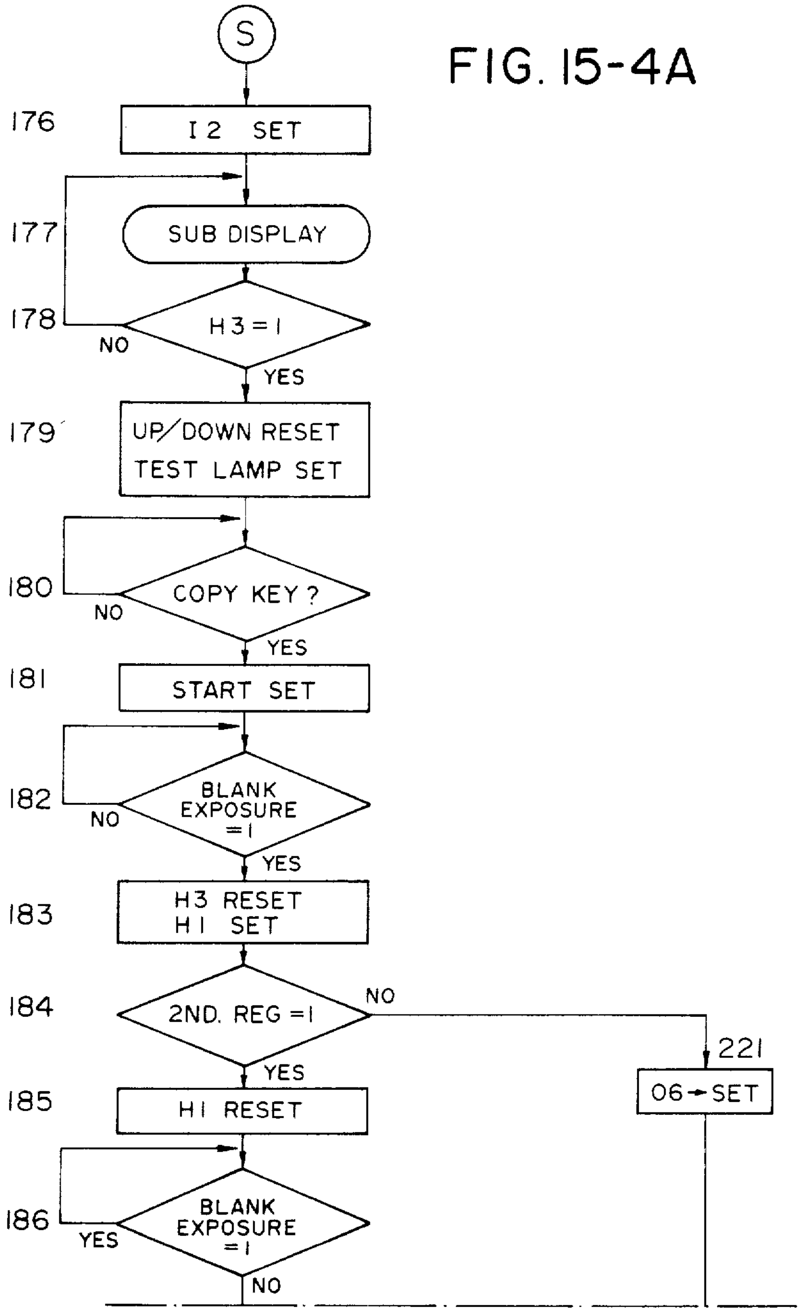
Figures 4B, 15:
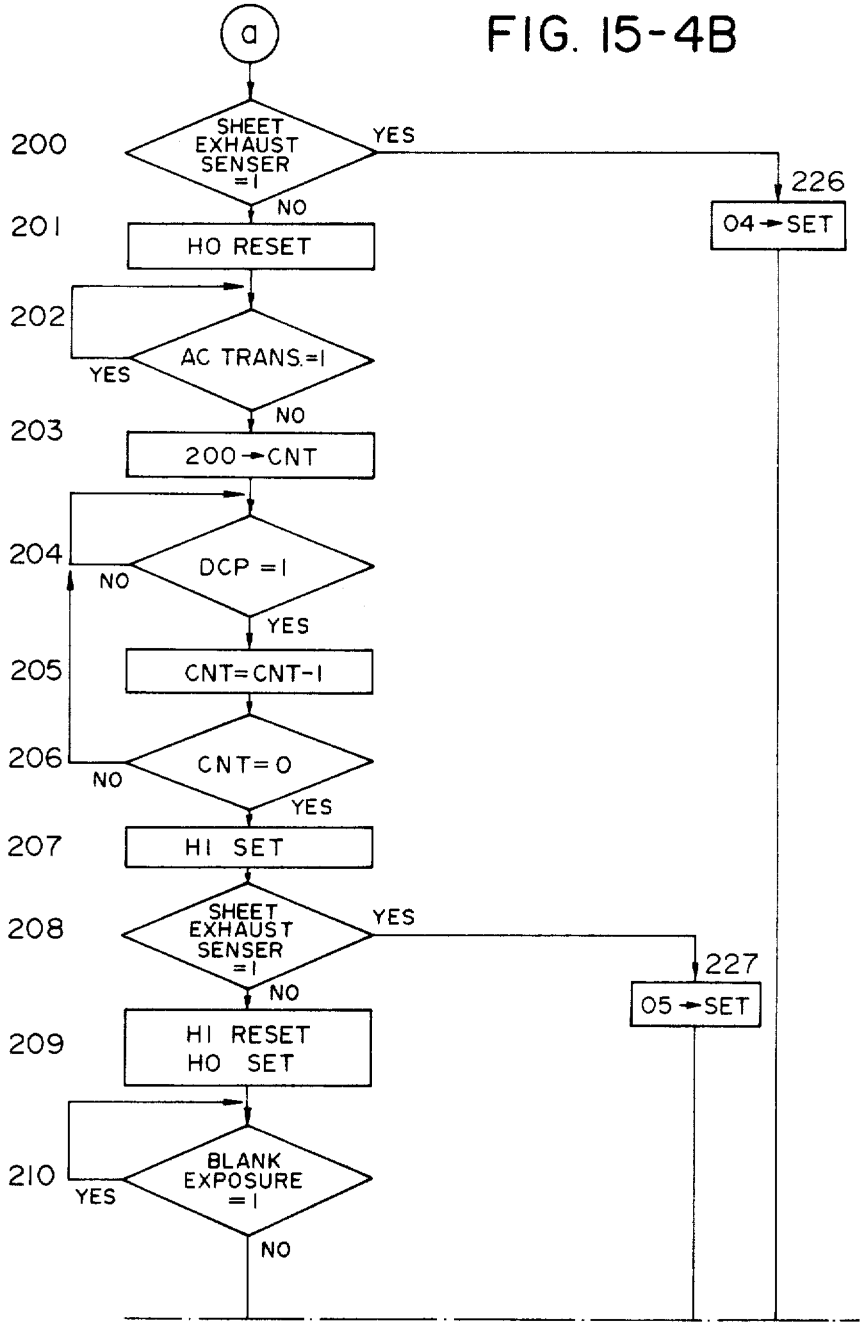
Figures 4C, 15:
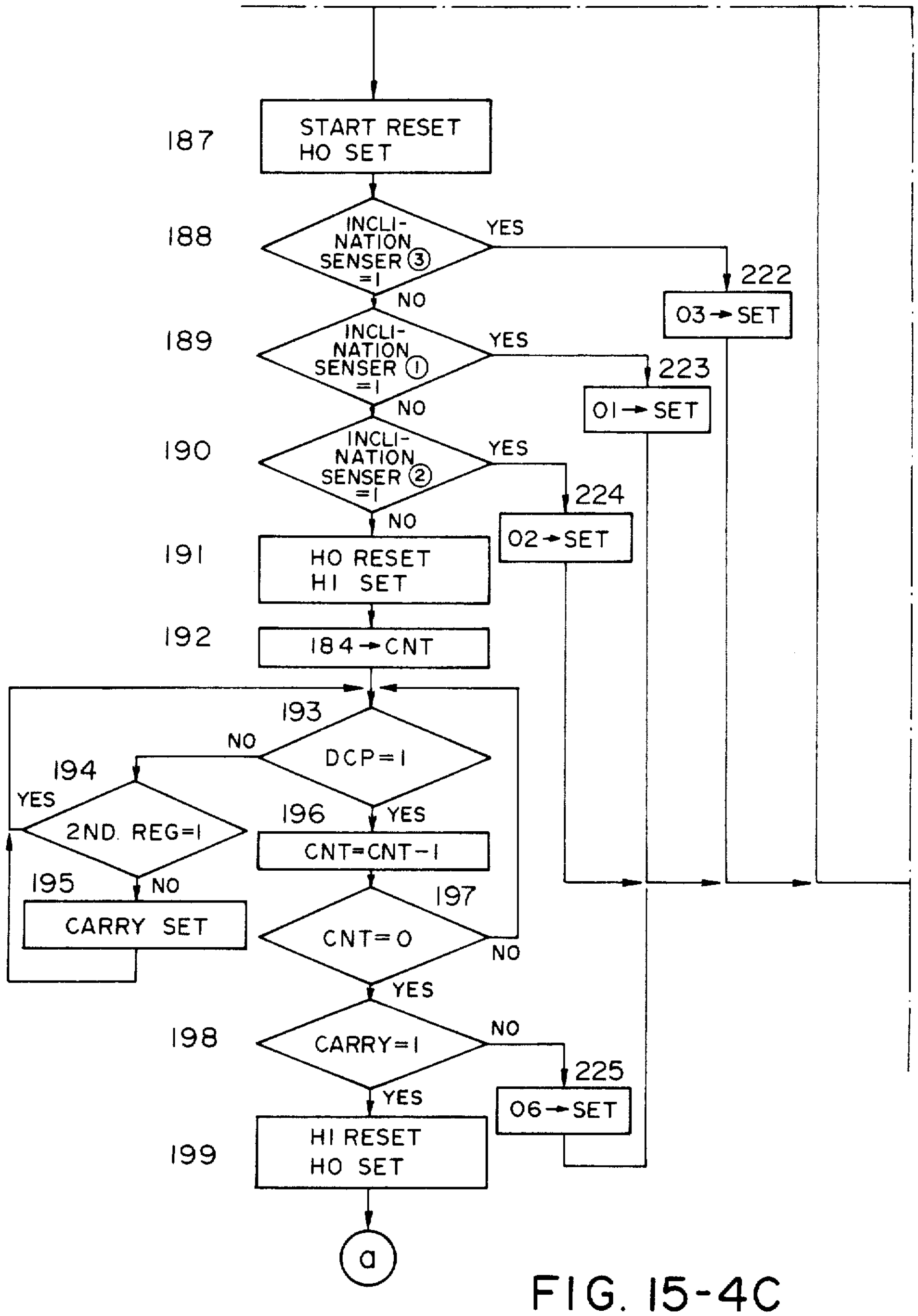
Figures 4D, 15:
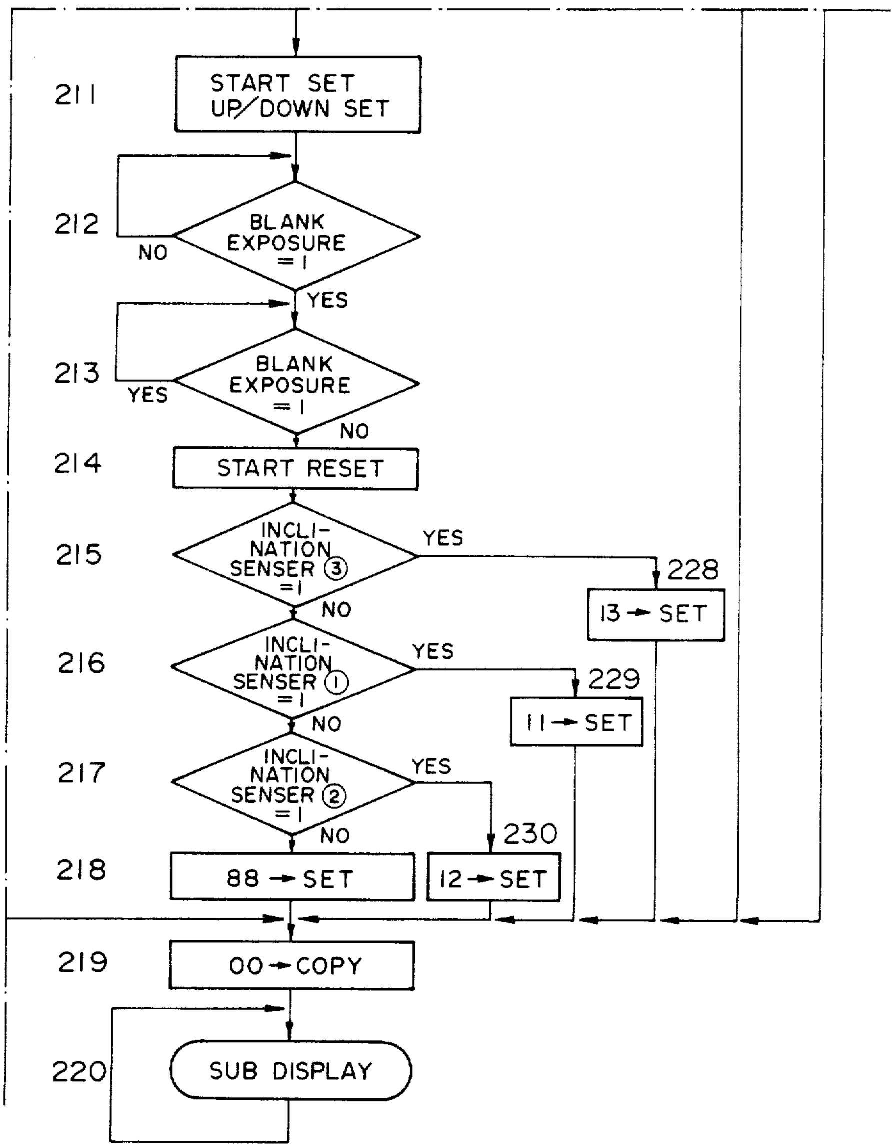
Figure 16A:
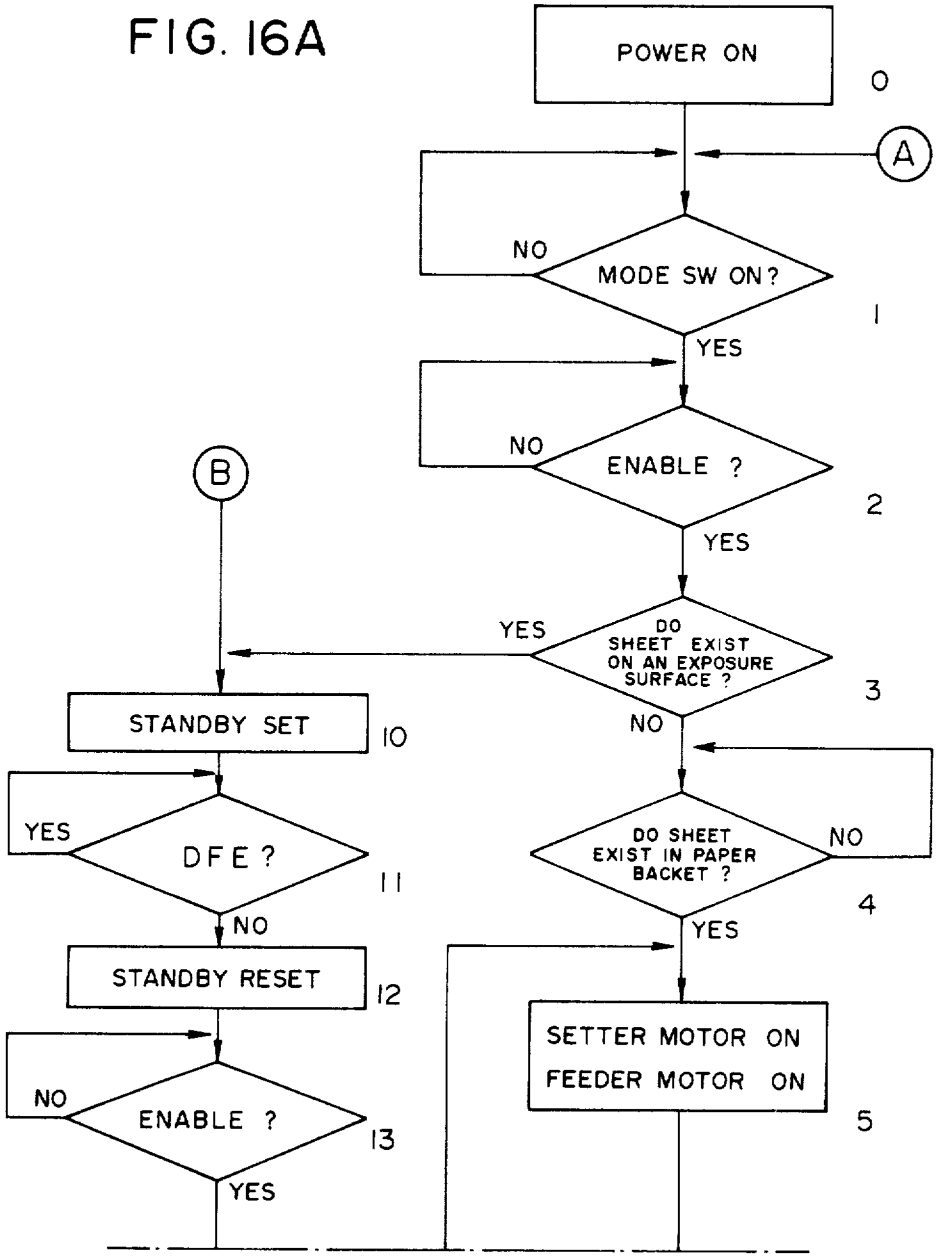
Figure 16B:
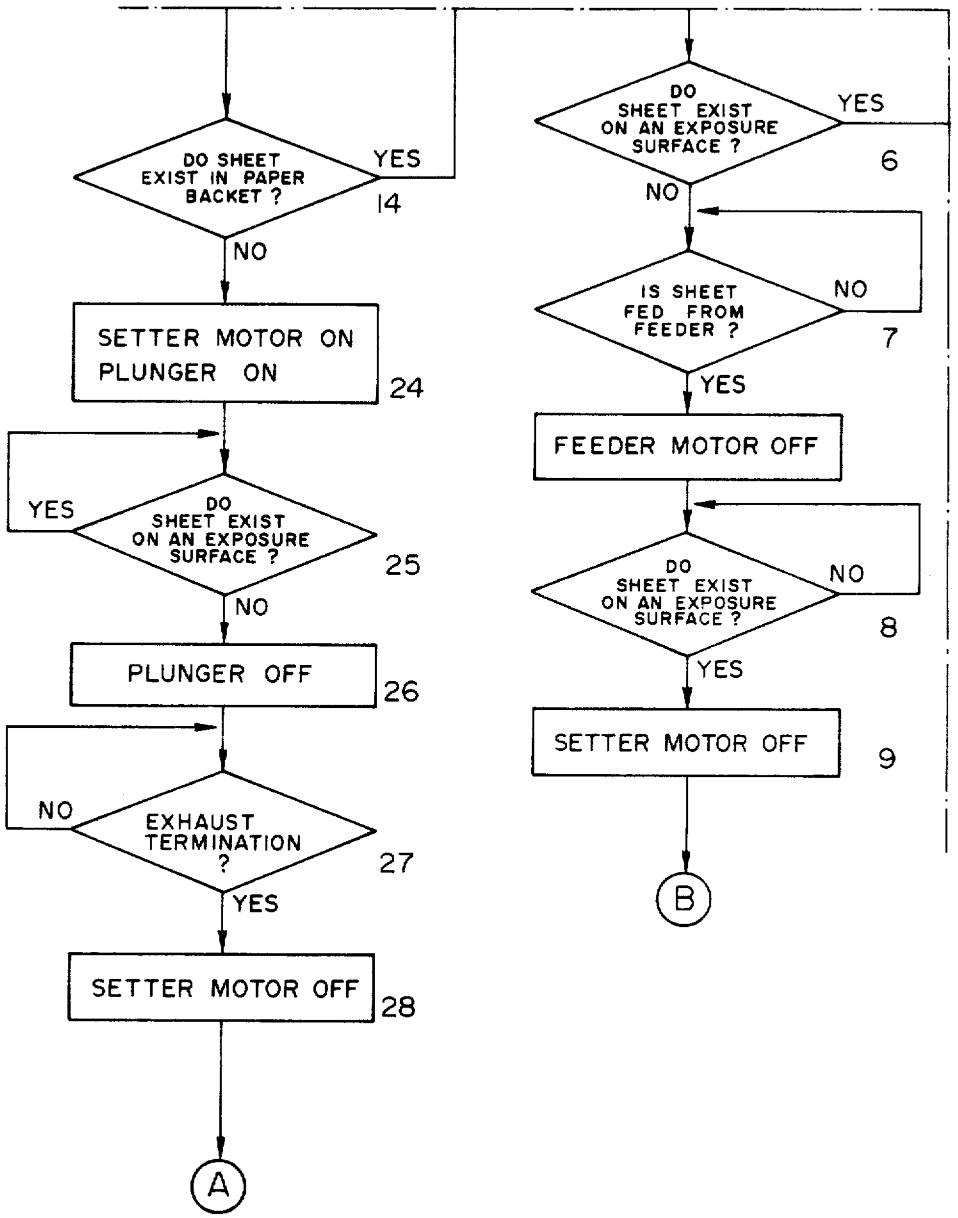
Figure 16C:
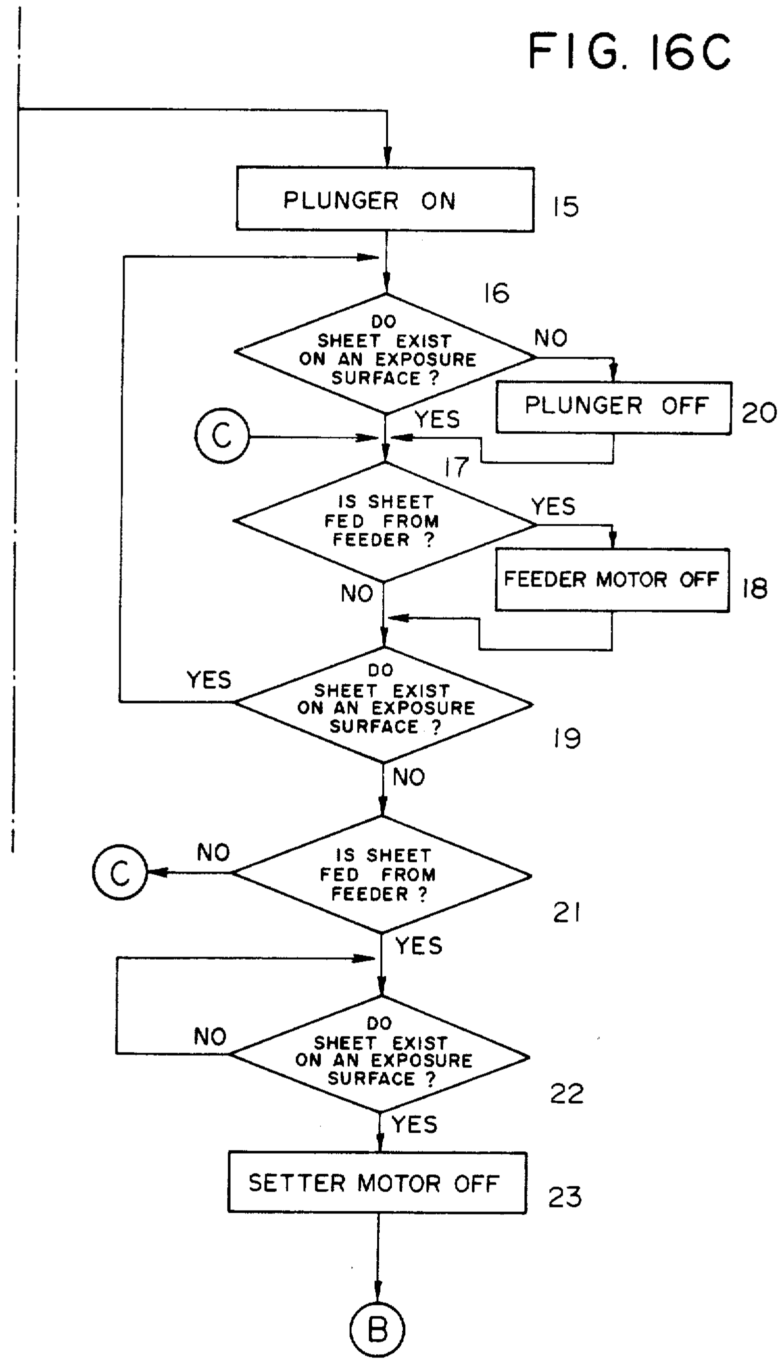
Figure 17A:
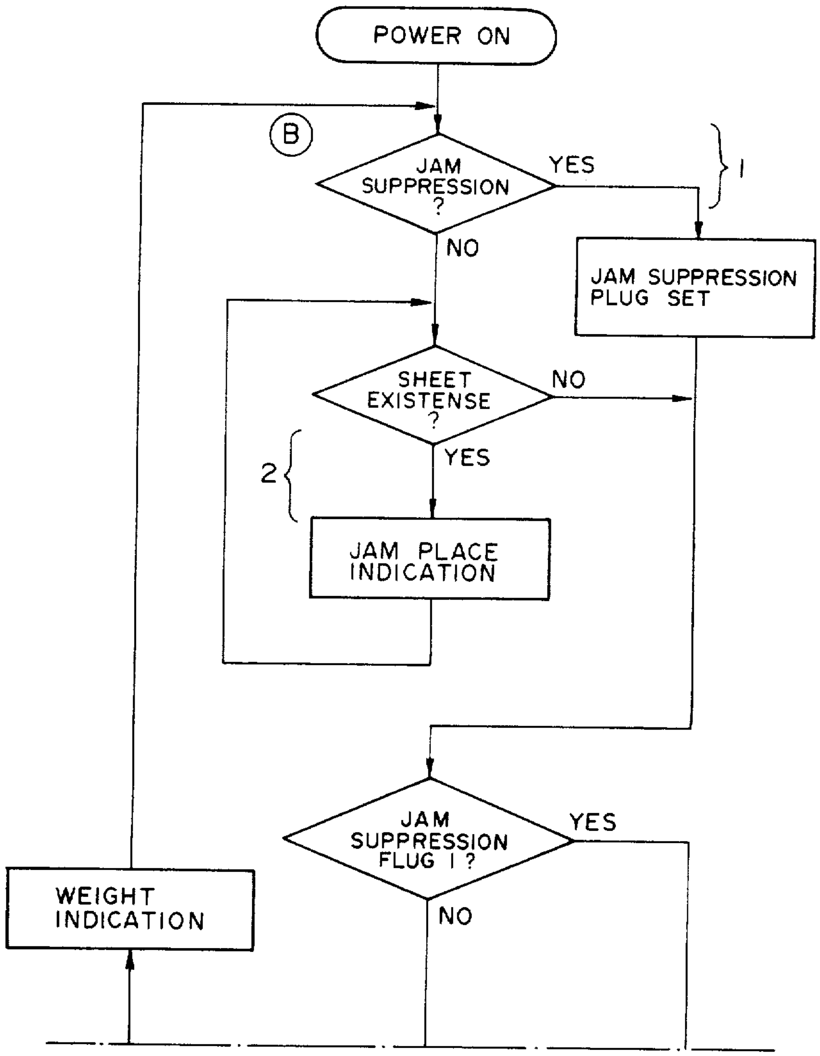
Figure 17B:
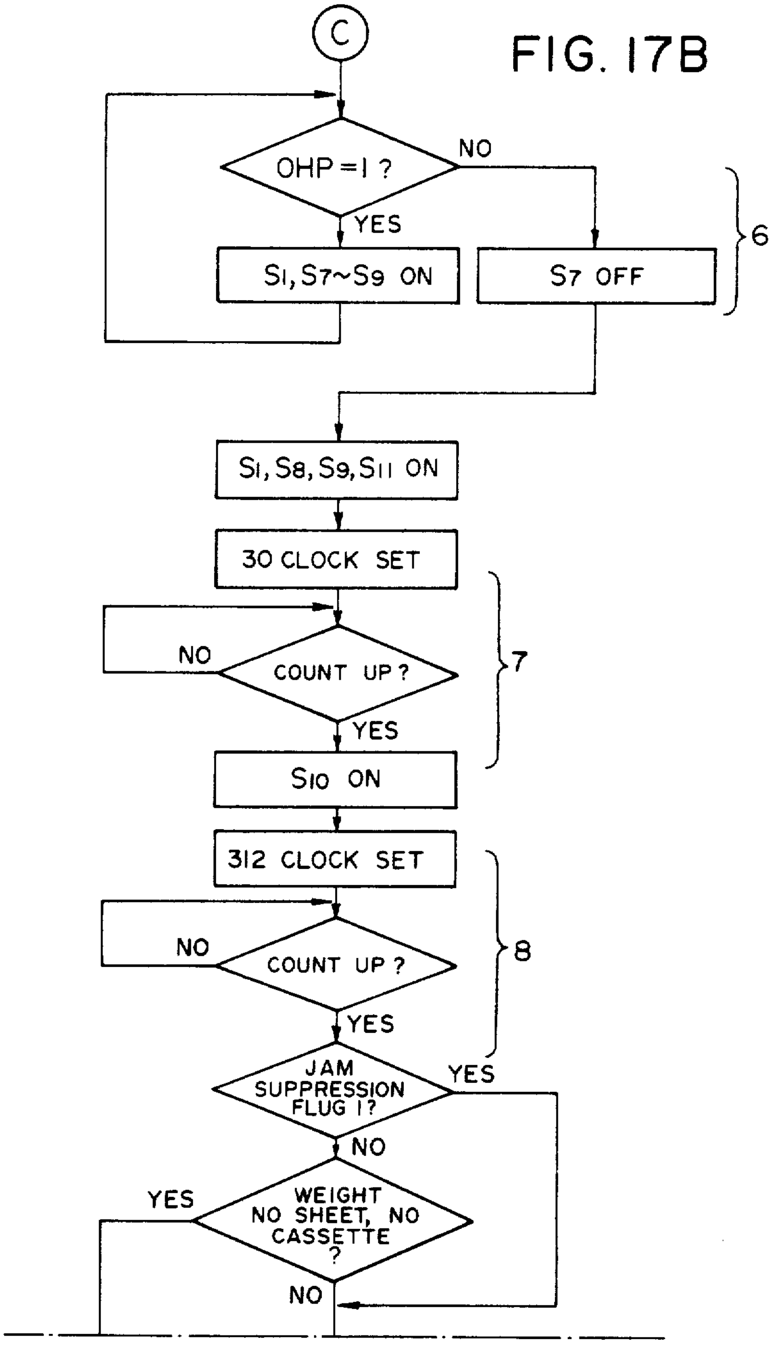
Figure 17C:
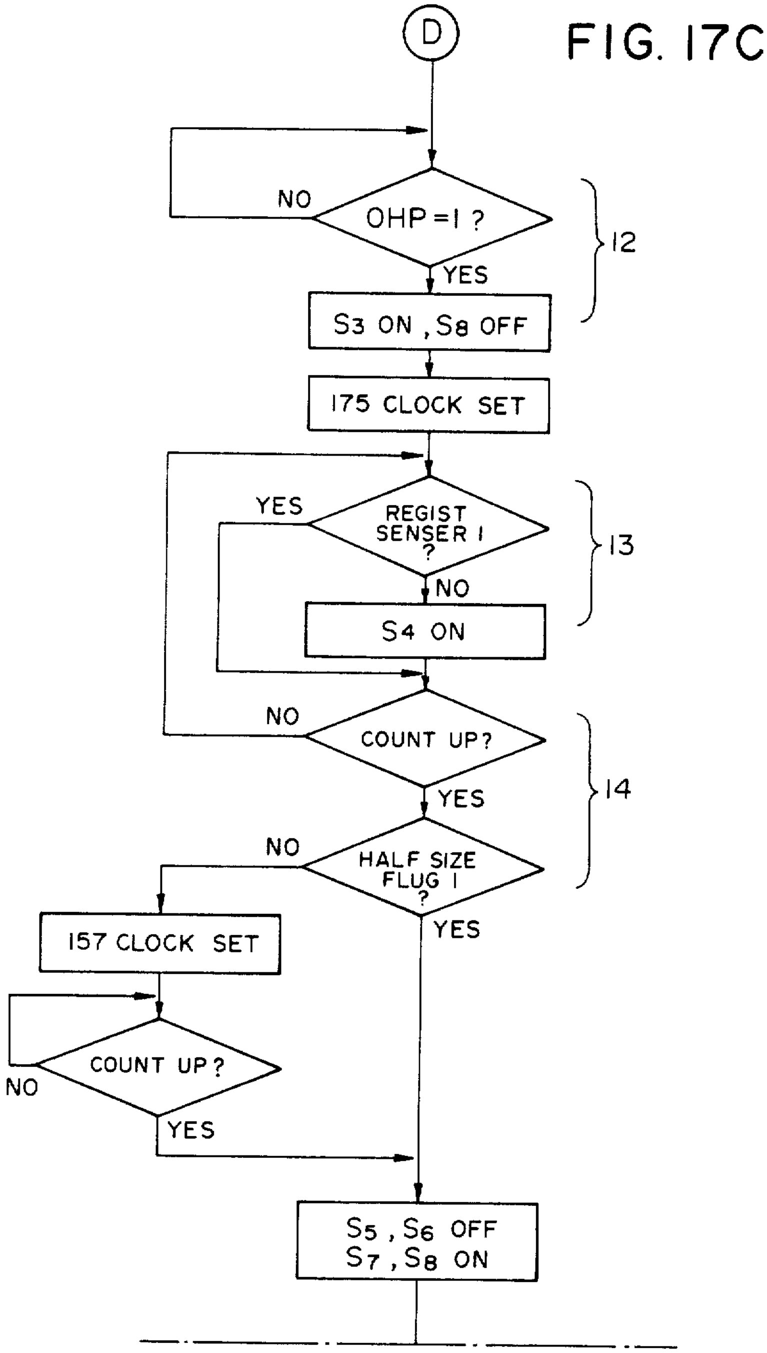
Figure 17D:
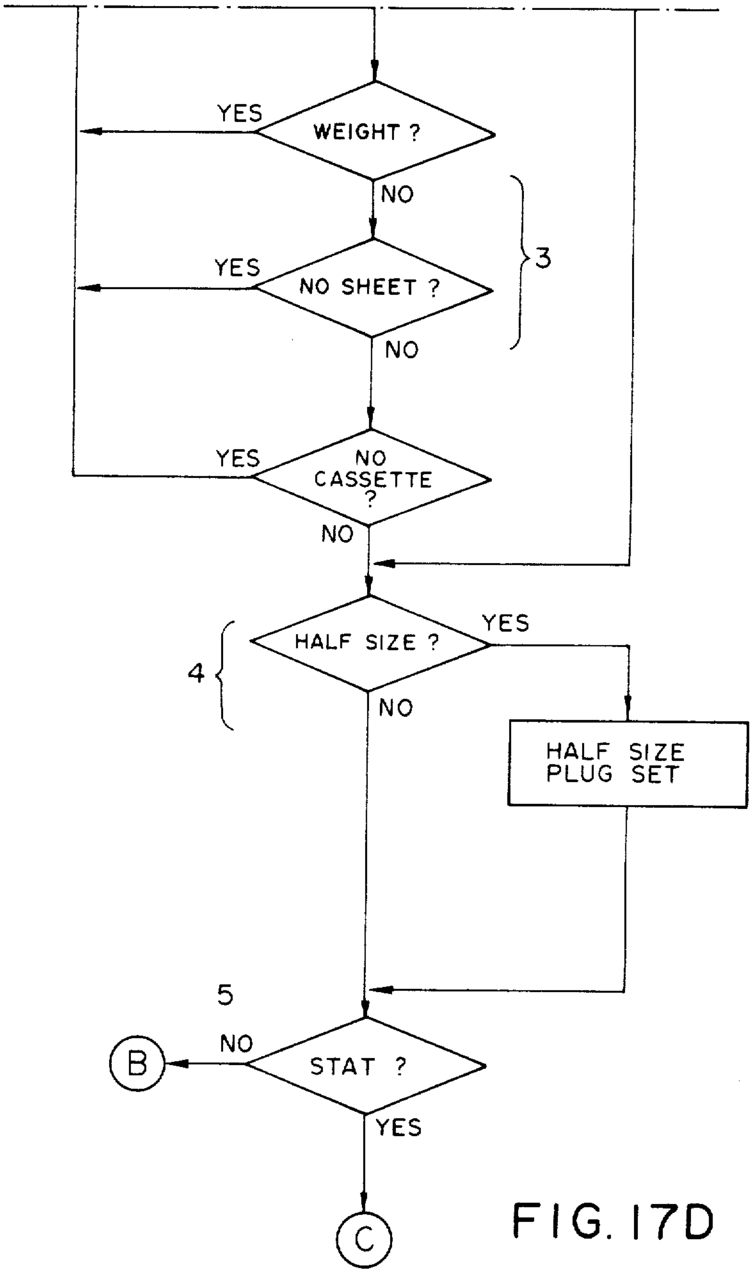
Figure 17E:
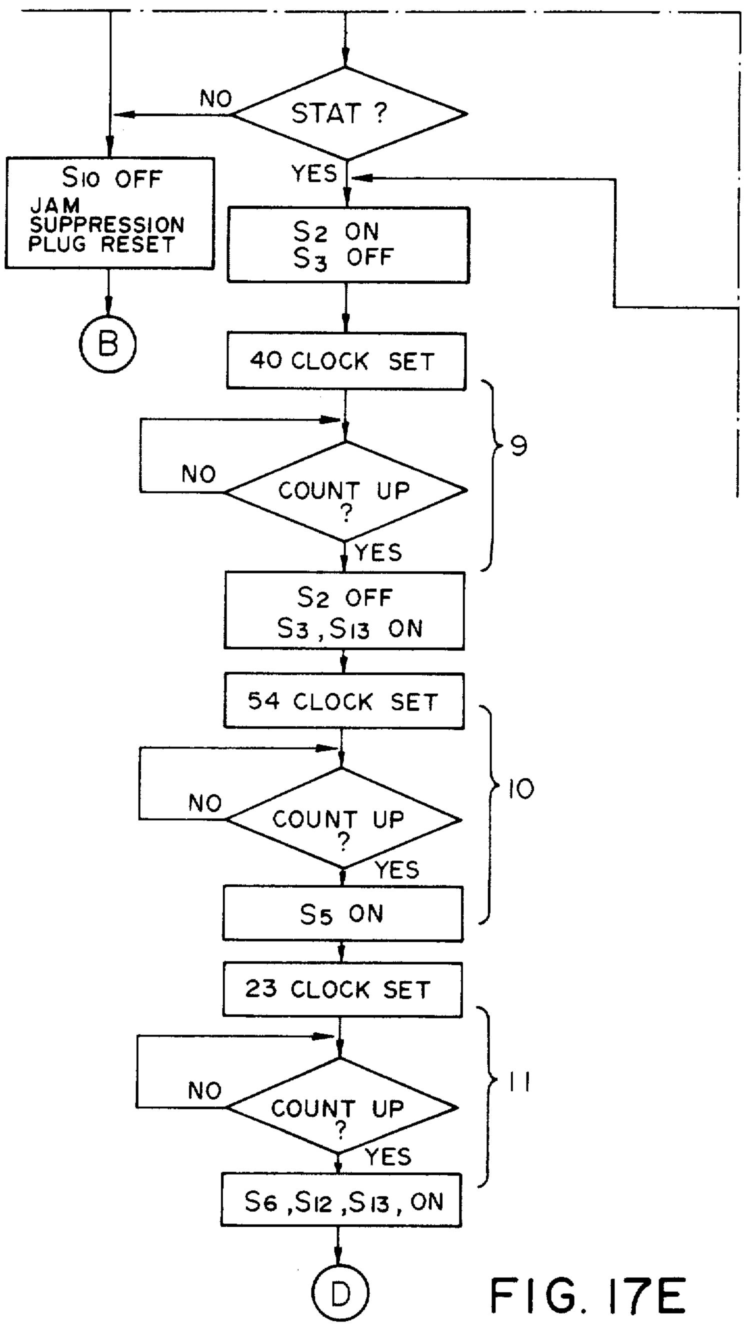
Figure 17F:
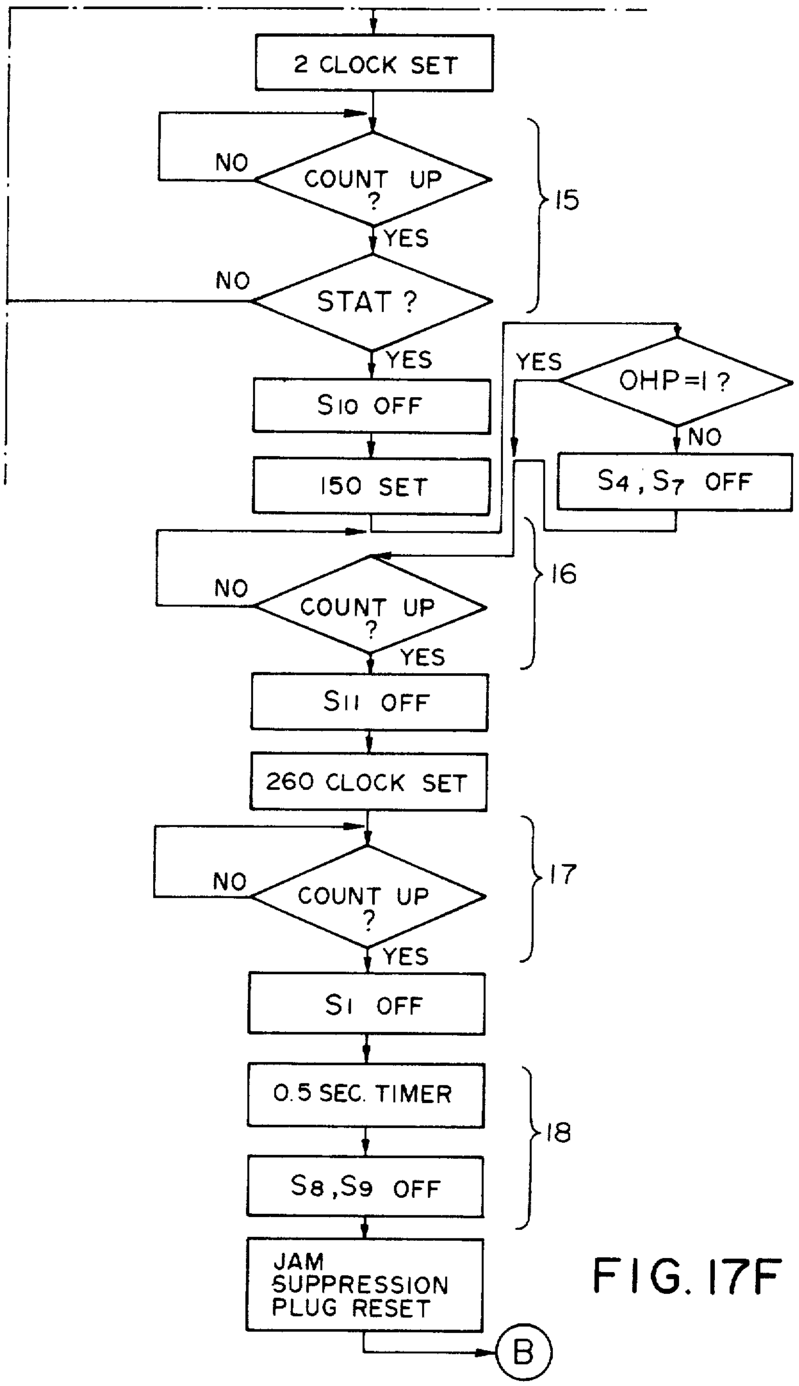
Figures 2A, 18:
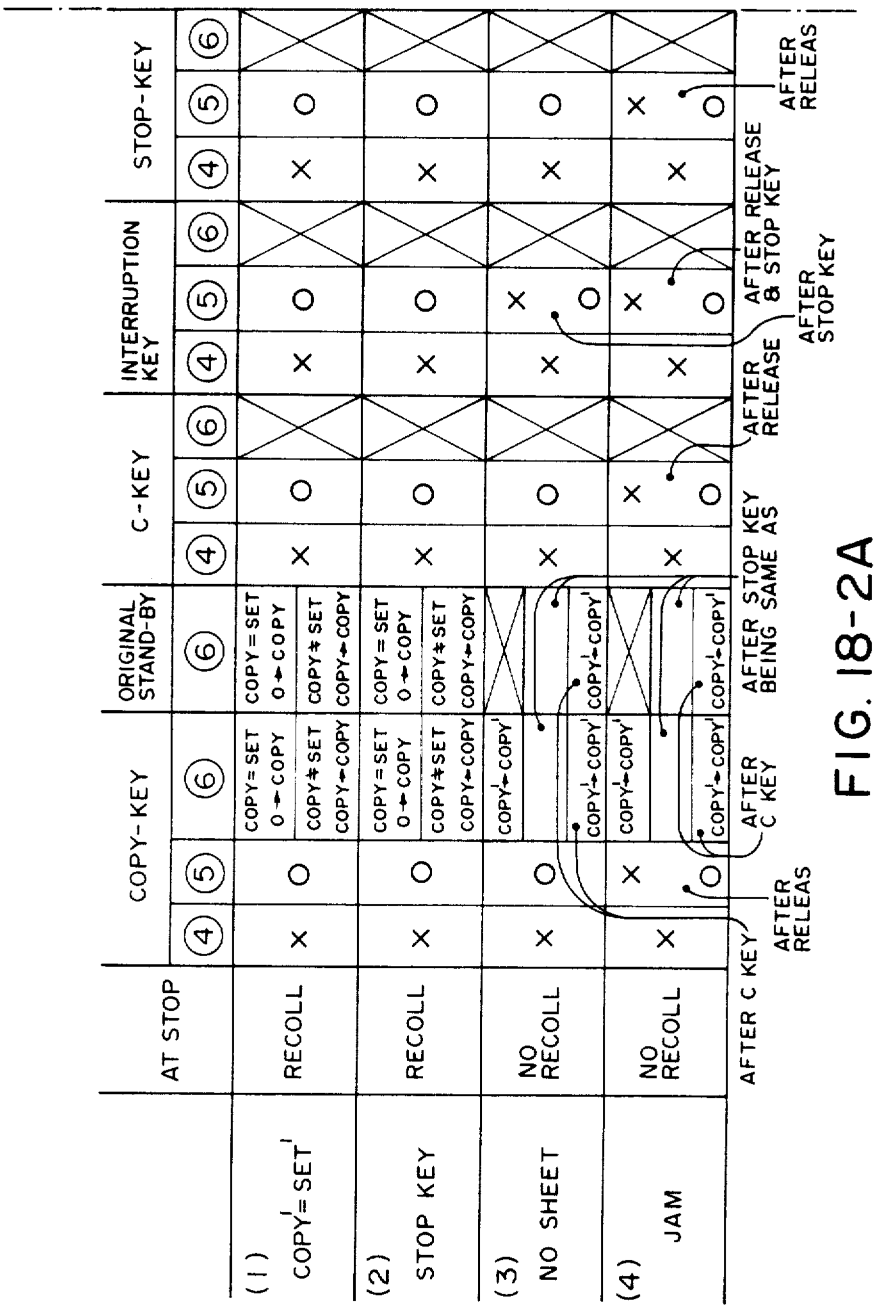

The procedures, wherein the copying state is deciphered from the relationship between the blank exposure signal $S_8$ and the AC transformer control signal $S_{10}$, the process sequence mode is discriminated with the timing signal, and the entry control is performed, will be explained hereinbelow in reference to FIGS. 5-3 and 15. The state of these two signals changes in the sequence of ⓓ→ⓐ→ⓑ→ⓒ→ⓑ→ⓒ→ⓑ→ⓐ→ⓓ, as shown in the drawing. This sequential flow is stored beforehand in ROM of the sequence controller $Q_2$ as the sequence program, and is produced as an output from the controller $Q_2$ by the start signal. By monitoring this flow with the management controller $Q_1$, the copying state is grasped, and the key entry as well as the ADF enable conditions are determined. In particular, the management controller is so designed that it may grasp the time instant ⓑ as the one when the copying operation starts; the time instant ⓒ showing change-over of the optical system from forward motion to the backward motion, as the one when the copy cycle has been terminated, so as to check the count-up in the copy counter; the time instant ⓙ showing entrance into the post-rotational cycle; and the time instant ⓚ showing termination of the entire copying operations. The proceeding of this normal copying state can be indicated as follows. As the result, various controls such as the keyentry, display, etc. are performed by discriminating the first stoppage zone (1) in the process sequence, the first copy cycle zone (2), (3), the post-rotation zone (4), the second stoppage zone (5), and the second copy cycle zone (6), as shown in FIG. 5-4. FIGS. 18-1 to 18-3 show possibility for the entry under various conditions at these time zones.

The flow chart in FIG. 15 explains how the abovementioned deciphering is performed physically in the management computer $Q_1$. The steps 40 to 79 show the operations. The flow in the time zone ⓓ showing the first stoppage mode passes through the route 40→44→61→63→64→78→79→73. In other words, the off-state of the blank signal $S_8$ from the sequence computer $Q_2$ is discriminated, then the off-state of the AC transformer signal $S_{10}$ is discriminated at the step 61, and the fact that it is in the time zone of ⓓ is stored in RAM as F/A. And, since F/C and F/STOP are not set, the D/F enable signal is produced as an output from the output port 3 in the step 79.

Next, the time instant ⓑ when the copying operation starts is detected by the flow passing through the route 40→44→45→46→47→48 in utilization of F/A. In other words, the on-state of the blank signal $S_8$ and the off-state of the AC transformer signal $S_{10}$ are discreminated (Steps 44, 48) to set F/C, and the copy display device 73 is rendered "0" in the step 122.

The instant ⓐ is a flow passing through the route of 40→44→45→46→47→49→4.

The flow of the time zone for the pre-rotational mode ⓑ passes through 40→44→45→56→57→4. In other words, the on-state of the AC transformer signal is further discriminated at the step 45, and then F/G is stored at the step 56.

The time zone for the forward mode ⓒ passes through the route of 40→44→61→62→4. This time zone is stored at the step 62 as F/B.

At the time instant when the change-over takes place from ⓒ to ⓑ (reverse motion of the optical system), ⓘ is detected by the route 40→44→45→56→57→58→59 in utilization of F/B set in the abovementioned ⓒ because the blank signal and the AC signal are both in their on-state, whereby discrimination is performed as to whether the copy counter +1 coincides with the set counter, or not (Steps 58, 59). In case the copying operations are repeated when no coincidence exists, the time zone of ⓑ→ⓒ→ⓑ→ⓒ is repeated, and the operation of rendering the copy counter to be added with +1 is maintained.

In this instance, when the copy cycle is terminated by completion of the set copying number, the stop key-on, etc., to enter into the post-rotational stage, the time zone ⓑ is produced for 2 clock pulses from the time instant ⓘ so that it may be the time instant ⓙ thereafter. The time instant ⓙ is detected by the route passing through 40→44→46→47→49→50 in utilization of the F/G step 49 which memorizes that the instant is within the sector ⓑ. If not in the start mode, DF enable signal (Step 53) is produced as an output.

The subsequent time zone ⓐ passes through the same route as that of ⓐ. And, the instant ⓚ which is the instant when the copying operation stops is detected by the route passing through 40→44→61→63→64→65 in utilization of F/C which memorizes that the instant ⓚ is after the time zone ⓐ.

(Descrimination Delay in Termination Mode)

In the following, the reason for delaying the off-state of the AC transformer control signal $S_{10}$ (change-over of voltage) for some time after the instant ⓑ will be explained.

Continuation of the copy process by the sequence controller is performed by the copy instruction signal STAT from the management controller $Q_1$. At the fine instant ⓑ, the sequence controller discriminates whether the copy instruction signal STAT from the management controller is "1" or "0". If "0", the process enters the abovementioned post-rotational mode. On the part of the management controller, however, detection of the instant ⓑ, counting of the copy number at the step 58, and discrimination of the step 57 are indispensable, hence there inevitably arises a time delay to some extent until the copy instruction signal STAT is produced in the sequence controller after these three operations are completed. In other words, the delay is caused by discrimination of the coincidence between the copy counter and the set counter, and release of the copy instruction signal. Accordingly, if the sequence controller views the copy instruction signal which the management controller has maintained prior to its release at the instant ⓑ, it continues to discriminate the instant as "1" and the copy cycle is continued in that mode, which is inconvenient. In order to avoid this, the sequence controller is so designed that it may discriminate the copy instruction signal at a time instant delayed by 2 clocks (approx. 11 m sec.) from the instant ⓑ. At this instant, if the copy instruction signal STAT from $Q_1$ is "1", the forward clutch $CL_1$ is again fully turned on to perform the copy cycle, and if the signal is "0", the AC transformer control signal $S_{10}$ is reset to lower the voltage for the negative component of the AC charger so as to perform the post-rotational cycle.

In the following, explanations will be given as to the point, wherein the management controller $Q_1$ discriminates whether the post-rotational cycle has taken place from the copy discontinuing mode (due to paper exhaustion, no cassette present, no key counter, etc.), or from the copy termination mode (due to the count-up in the copy counter, stop key-on, etc.).

As is apparent from FIG. 4, there is no input information in the management controller $Q_1$ to judge whether the copying operation should be discontinued, or not. All of such informations are in the sequence controller $Q_2$. In other words, no cassette and no paper signal PEP, cassette signals ①, ② and ③, wait signal WT, and so on are introduced as input into the ports 14 to 10. On the other hand, those informations to judge whether the copy termination mode has entered, or not, are all introduced as input into the management controller $Q_1$. This is apparent from the fact that the STOP key is received in the input port 1, and that the count-up signal of the copy counter COPY is discriminated by $Q_1$.

In the case of the copy discontinuance mode, therefore, the sequence controller $Q_2$ cancel the AC transformer control signal $S_{10}$ one-sidedly, in spite of the fact that the copy instruction signal STAT in the management controller $Q_1$ assumes "1" at the time instant when the scan-return is started and the instant Ⓙ after 2 clocks has been reached. Therefore, by detecting this fact, it can be judged that the post-rotational operation has entered with the copy discontinuance mode. That is, the instant Ⓙ in the flow chart is detected at the steps 49 and 50 as mentioned in the foregoing. Since the copy instruction signal flag of F/H is not reset, the copy instruction signal still remains "1" even at the time instant Ⓙ in the copy discontinuance mode. Accordingly, the steps 51→52→4 are performed. Of these steps, F/STOP in the step 52 is for memorizing the copy discontinuance mode. Therefore, in this step 52, this copy discontinuance mode is set, and the copy instruction signal STAT and F/H are released.

On the other hand, when the STOP key is depressed during the copying operation, the copy instruction signal (STAT) and F/H are released at that time instant. That is, this release operation is done through the route of 98→99→100 in the entry flow F. Also when the copy counter and the set counter become equal at the time instant Ⓘ, the copy instruction signal and F/H are released at that time instant in the same manner. This release operation is done through the route of 56→57→58→59→60→100 in the flow chart G, F. Incidentally, at the step 60, the ADF enable signal is produced as an output. From the foregoing, therefore, since the copy instruction signal and F/H are released before reaching the time instant Ⓙ in the case of the copy termination mode, the time instant Ⓙ is judged and the operation is performed through the route 49→50→51→53. Therefore, the copy termination mode is judged with the subsequent sequence without setting F/STOP.

(Control of ADF and Copier)

Description will be made of the control of ADF enable signal DFE and the ordinary copying operation and ADF operation effected by ADF stand-by signal STB.

ADF basically starts its operation upon termination of a copy cycle (the point of time whereat the forward movement of the optical system for scanning is terminated) and the original reaches the original carriage during backward rotation and the remainder of the backward rotation is omitted, whereafter the forward rotation for the next copy is immediately entered, thereby enhancing the copying speed. Accordingly, the ADF enable signal DFE from the supervision controller meaning that ADF may be operated must be generated at the aforementioned point of time j with various conditions taken into account. This ADF enable signal is cancelled at the start of the next copying. The relations between these various conditions and entry of various keys will be shown below.

(1) First Repose Time Zone (1)-1 After the usual closing of MSW, all the keys are received and DFF signal is set.

(1)-2 After the closing of MSW with jam left unchanged, all the keys are not entered. After the jam has been released, the same operation as (1)-1 occurs.

(1)-3 After the closing of MSW with the serviceman call left effective, all the keys are not entered.

(2) First Copying Time (2)-1 When the operation is effected by the use of the copy button, the copy counter is reset to 0 and DFE signal is cancelled.

(2)-2 Also when the operation is effected by ON of the original stand-by signal STB, the same operation as (2)-1 occurs.

(3) Copy Cycle (3)-1 During the ordinary copy cycle (or after the release of jam, after the entry of the STOP key, after the absence of paper, after the COPY count up), only the interruption key and the STOP key are received. However, when the interruption key is received, all the keys are rejected until the main motor is stopped.

(3)-2 During the cut-in copy cycle, only the STOP key is received.

(3)-3 During the ADF copy cycle, only the STOP key is received.

In addition to these, there are (4) backward rotation cycle, (5) second repose time zone, and (6) second copying time zone, but these key entry receptions and the enable output are shown in FIGS. 18-1 to 18-3. Only the necessary points will be described hereinafter and the other points will be omitted because they are clear from the Figures. FIG. 18-1 shows the entry mode after termination of the ordinary copying, FIG. 18-2 shows the entry mode after termination of the cut-in copying, and FIG. 18-3 shows the entry mode after termination of ADF copying.

The foregoing operations will be described by reference to the flow chart.

The operation (1)-1 is effected at flow G in the route passing through 40-44-61-63-64-78-79 and when it is passing through this loop (first repose time), the enable output is always set.

The operation (1)-2 is carried out at flow H in the route leading to 15-20-21-34 and the DFE output is always cancelled (hereinafter referred to as reset) at the step 31.

The operation (1)-3 is executed at flow G in the route of 40-41-42-43 and the DFE output is always reset.

The operation (2)-1 is executed at flows G and K in the route passing through 40-44-45-46-47-48-120-122-123-124 and the DFE output is reset at the step 123.

The operation (2)-2 is executed in the route passing through 15-16-17-35-37-38-39-111-94 and copy instruction signal STAT is put out (step 94). The stand-by signal STB from ADF is detected at 38.

(3) Copy flag F/COPY is 1 at each flow in the copy cycle and therefore, no entry other than the entry of the cut-in stop is set.

(4) With regard to the key entry and ADF enable during the backward rotation cycle:

It is seen from FIGS. 18-1 to 18-3 that the ADF enable is set only during the count-up of the copy counter COPY, the backward rotation zone (4) by the STOP key and the second repose zone (5), and this is effected by judging that F/H or copy start signal has already been released at the point of time j. Accordingly, the steps 50-51-52 are passed through and F/H is discriminated at the step 51 and the enable signal DFE is set at the step 53.

During the copy cycles such as cut-in copying and ADF copying, the interruption key 55 is not received, but during the ordinary copy cycle, the interruption key 55 is received. At the point of time whereat the interruption key has been depressed, F/H is reset by the steps 106-100 and at the point of time j, F/H is already step=processed as O. Accordingly, the steps 50-51-53 are passed through and F/H is discriminated at the step 51 and DFE is set at the step 53.

As can be seen in FIGS. 18-1 to 18-3, during the while that the copying is stopped in the stop mode (no sheet, no key counter, jam, etc.) and when the clear key is depressed after this mode is released, the AFF enable output is set on the assumption that the copy for the original on the original carriage has been cancelled. This operation is effected when 40-44-61-63-64-78-79 of the flow chart G is executed after 135-136-3 of the entry flow chart E has been executed. That is, the F/STOP which memorizes the STOP mode is cancelled at the step 3, whereafter O of the F/STOP is discriminated at the step 78 and DFE is set at the step 79. Accordingly, the ADF lifts the pawl 86 and operates the belt motor (belt 89) to discharge the original.

With regard to the operations (3)-1 and (3)-2:

The F/COPY which indicates the copy cycle is set at the moment h of FIG. 5-4, namely, at the step 48. The fact that the keys 0-9, C and Up (cassette) are not entered during the while that F/COPY is 1 is apparent from the fact that the step jumps from the step 130 to the step 4, from the step 147 to the step 4 and from the step 159 to the step 4. As regards the F, STOP, interruption and copy keys, these pass through the route leading to the steps 80-81-82-83-84-85-86-101 in the flow chart and are detected between the step 101-111. Here, F/E is a flag indicating the backward rotation condition and is set at the point of time j (step 50). Accordingly, the route passing through the steps 101-108 refers to the backward rotation, the route passing through the steps 101-102-106 refers to the copy cycle, and the route passing through the steps 101-102-103 refers to the repose time. Consequently, the keys received during the copy cycle are the interruption key of the step 106 and the STOP key of the step 98. When the interruption key is received during the copy cycle, F/interruption is set at the step 107. Thereupon, three flags are discriminated at the setps 126, 143, 155 and 84 and threfore, no entry is received and all these steps jump to the step 4. Consequently, no key is received. After the backward rotation has been terminated and the main motor has been stopped, the step 65 to the step 15 are executed and the number of sets, the number of copies, the number of cassettes and each flag are retracted into another place in the RAM to turn on the interruption lamp 74. Accordingly, the display is rendered to 0 with the discharge of the paper confirmed and therefore, the jam discrimination and the number of copies become accurate.

With regard to (3)-3:

Detection of the original STAND-BY signal from ADF is effected at the step 38, and then comes the step 39 at which it is memorized as F/DF that the ensuring copy cycle is ADF mode. This F/DF is set during the copy cycle and the period of the backward rotation, and is reset at the point of time k, namely, at the step 65. 0-9, C and Up keys all jump to the step 4 in the route leading to the steps 128-129-4, the route leading to the steps 128-130-4, the route leading to the steps 145-146-4, the route leading to the steps 145-147-4, the route leading to the steps 157-158-4 and the route leading to the steps 157-159-4, and therefore the key flag is not set and not received. Likewise, F, STOP, interruption and copy keys are not received because the steps 86-87-4 are executed during the backward rotation. Also, during the copy cycle, the step jumps to the step 4 through the steps 86-87-88-98-99-100 or only the STOP key is received at the step 98. By this, the cumbersomeness of various operations and display during the ADF copying is reduced as much as possible. It is also possible to receive the interruption key as well at the step 98 and advance to the step 106 when the interruption key is depressed.

(Correction of the Display of the Number of Jamming Sheets)

In FIG. 4, the jam signals 1, 2, 3 and 4 of the sequence controller $Q_2$ turn on and off the display marks 69, 68, 67 and 66 in the operating portion shown in FIG. 2.

In FIG. 5, when a paper feed error or inclination has been detected by the paper feed port sensors 36, 37, namely, when jam has been detected by the timing check 4', 4, the jam signal 4 is set and putput; when image transfer station jam has been detected by the timing check 2, the jam signal 3 is set and put out; when fixing station jam (delay to the sensor 40) has been detected by the timing check 2, the jam signal 2 is set and put out; and when discharge station jam (stagnation on the sensor 40) has been detected by the timing check 1, the jam signal 1 is set and put out. Thereupon, +1 is imparted to the copy counter COPY during the reversal of the optical system and therefore, the number subtracted therefrom differs depending on whether the moment when jam occurs is before that or how much time it is later than that. That is, as seen from FIGS. 5-1 and 5-2, when half-size paper is stagnant at the outlet port, maximum 2 is subtracted for the output of each jam signal and no subtraction is effected when the paper feed station and the image transfer station jam occur, and the other conditions must also be taken into account. These will be shown in Table 1 below.

TABLE 1

| Conditions | Half-size | | Full size | |
|---|---|---|---|---|
| Names of jam signals | DC trans signal = 1 | DC trans signal = 0 | DC trans signal = 1 | DC trans signal = 0 |
| Jam signal 1 | A - 2 | B - 1 | C - 1 | D - 1 |
| Jam signal 2 | E - 1 | F - 1 | G - 1 | |
| Jam signal 3 | 0 | | 0 | |
| Jam signal 4 | 0 | | 0 | |

That is, the subtraction for the correction of the display of the number of copies by the jam is affected by three factors, namely, the place in which the jam has occurred (jam signals 1-4), paper size, and the timing during backward rotation (DC trans change-over time).

These subtractions are effected by the flow chart H. In FIG. 4, the jam signals 1-4 are applied as input to the ports 0-3 at the predetermined timing of set pulse $I_1$ and therefore, when any one of these jam signals is set, a routine in which it passes through 15-20-21-34 and returns to 15 is executed in FIG. 15. The step 22 is for inhibiting subtraction when the copy counter memory COPY is 0. The paper feed station jam (paper feed error and inclination) and image transfer station delay jam signals 4 and 3 do not effect subtraction in any case and therefore, the steps 15-20-21-22-23-29-30 are executed. In the case of the aforementioned A, −1 is effected at the steps 23-24 and further −1 is effected at the steps 23-24 and further −1 is effected at the steps 25-26-27-28-30, and thus −2 in total is effected. In the case of B, −1 is effected in the route of 23-24-25-26-27-30. In the cases of C and D, −1 is effected in the route of 23-24-25-30. In the cases of E, F and G, the route of 23-29-28-30 is executed to ffect −1. After subtraction, the content of the counter COPY is segment-displayed by the display step 32.

SUBDISP such as the step 9 and 32 is a well-known subroutine in which the contents of the counter SET of RAM and the counter COPY are dynamically displayed by segment displayers 72 and 73.

(Diagnosis of Trouble of the Machine in Special Time Zone)

One object of the present invention is to enable the machine to provide a warning clearly indicating whether paper jam has accurred due to the trouble of a mechanical part or an electrical part or what unit of electrical parts is defective and thereby to enable the user to instruct the serviceman to bring a spare part or parts necessary for the repair and also to facilitate the check-up trouble on the part of the user, thus greatly reducing the time during which the machine is left unusable. More specifically, the electrical parts to be checked up in the present embodiment, when something wrong occurs to them, are displayed as jam and there are nine such parts, namely, upper stage inclination sensors 37 (there are three such sensors 1, 2 and 3), lower stage inclination sensors (there are three such sensors 1, 2 and 3), a paper transfer sensor 35, a second resist sensor 39 and a paper discharge sensor 40.

Another object of the present invention is to enable a printed substrate having a damaged sensor to be numerically displayed by the segment displayer 72 in the set counter.

During the ordinary copying, the sensors 36 and 37 are used for the detection of paper feed error and inclination, and the sensors 35 and 40 are used for the detection of jam. Therefore, when it is desired to check up these sensors themselves, such check-up may be effected by entering command information into the machine itself during the other special time zone than the copy cycle. At that time, the jam detecting function is suppressed and to check up the operating conditions of these sensors, a sheet of paper is fed from the upper stage to complete a copying operation, whereafter a sheet of paper is automatically fed from the lower stage to execute a copying operation, whereby the operation of each sensor to be operated in that process is monitored by the supervision controller. The printed substrate whose trouble has been so detected by that monitor is displayed in the form of a predetermined number by the set number segment displayer 72. Such specific operation is carried out in such a manner that when a self-test key 49 provided at the corresponding location on the exterior of the machine shown in FIG. 1 is depressed, the lamp of the self-lighting key switch thereof is turned on while the display of the segment displayers 72 and 73 which have so far been turned on is extinguished.

In FIG. 4, when the test key 49 is depressed, the supervision controller $Q_1$ detects that the input port 9 thereof has become 0, and set the output to output ports 4 and 5 as the diagnosis mode. By this, as shown in FIG. 7, the lamp provided in the test key is turned on and the input port 9 of the sequence controller $Q_2$ (this is a jam reset terminal and with the housing door closed and the door switch remaining closed, the sequence controller $Q_2$ discriminates suppressed jam for 0 this port) is rendered to 0. This is, in FIG. 4, switch signal SWS is applied an input and jam reset signal RS is applied as input, thereby omitting the detection of paper trouble. Also, the zero suppressing output port 19 of FIG. 4 is also set to extinguish the segment displayers 72 and 73.

This will be described by reference to the flow chart of FIG. 15. First, when the test key 49 is depressed, the ON thereof is detected at the step 160 when the route of steps 155-156-157-158-159-160 is being executed in the entry flow chart C, and the step jumps to S of FIG. 15-4. The supervision controller immediately sets the output of the output port 19 to extinguish the segment displayers 72 and 73 (step 176), and the step advances to the steps 177-178-179 to designate the upper cassette and set the turn-on output (output port 5) of the test lamp. Thereafter, the depression of the copy key is waited for at the step 180 and if the depression has been entered, copy instruction signal STAT is set to the output port 1 at the step 181 and the sequence controller $Q_2$ reads the signal to start copying. At the step 182, the supervision controller detects the rising of blank exposure signal $S_8$ and thereby detects whether or not the copying has been started. When the start of the copying is detected, the output condition of the second regist. sensor 39 (FIG. 1) is first discriminated at the step 184. The output of this sensor should still be at 1 level at this point of time, but if it is 0 of the operative condition, the step passes through the route of 221-219-220 to segment-display that kind of trouble. On the other hand, if the condition is normal, the blank exposure signal $S_8$ becoming 0 is detected at the step 186. At this point of time, as is clear from the time chart of FIG. 5, the fed paper has already reached the upper stage inclination sensors 1, 2 and 3 and a first sheet copy cycle has been entered. Thereupon, copy instruction signal STAT is reset at the step 187 and the digit output flag of the output port 13 is set, and the operative conditions of the respective inclination sensors are checked up at the steps 188, 189 and 190. These sensors should originally be at 0 level when they are detecting paper, and they are regarded as being abnormal when they are at 1 level. That is, when the inclination sensor 3 is abnormal, "3,0" is displayed by the displayers 72, 73 in the route of 188-222-219-220; when the inclination sensor 1 is abnormal, "1,0" is displayed in the route of 189-223-220; and when the inclination sensor 2 is abnormal, "2,0" is displayed in the route of 190-224-219-220. If the upper stage inclination sensors 1, 2 and 3 are normal, the steps 188-192 are executed.

Thereafter, if these sensors are normal, the second regist. sensor should be operated to put out 0 level by the optical system within a time from the time point whereat the blank exposure signal has become 0 until 184 drum clocks have been counted. Accordingly, the number 184 is stored in the counted region CNT of RAM and its subtraction count and output detection are effected at the steps 193-197 to check up the sensors. If the regist. signal RG becomes 0 in the time until CNT becomes 0, carry flag Carry is set in the route of 194-195. It is discriminated as normal at the step 198 after the 184 clocks have been counted. If the output 0 level of the regist. sensor is not detected within this period of time, 225-219-220 is executed from the step 198 to display "6,0".

It is also seen from FIG. 5 that the time point whereat the 184 drum clocks have been counted is the time during which the first sheet of paper is operating the paper transfer sensor 35 and the sensor 35 should be putting out 0 level. Accordingly, if the operative condition of that sensor is discriminated at the step 200 to find that it is at 1 level, the step advances to 200-226-219-221 to display "4,0". If the sensor is at 0 level, the steps 201 and sc forth are executed.

The next step 202 is one for detecting that the sequence has reached the time point j of FIG. 5-3, by the AC signal of the sequence controller $Q_2$. Thereafter the time point whereat 200 drum clocks have been counted, as is apparent from FIG. 5, is the time when the copy paper has reached the paper discharge sensor 40. Accordingly, the counting thereof is executed at the steps 203-206 and the operative condition of the paper discharge sensor is checked up at the step 208. Originally, this sensor puts out 0 level at this time point, but if it puts out 1 level, it is regarded as being abnormal and the steps 208-227-219-220 are executed to display "5,0". If it puts out 0 level, it is regarded as normal and the step advances to 209-210.

Step 210 is one for detecting the termination of the last copying operation by the blank exposure signal becoming OFF. Step 211 is one for changing over the cassette to the lower stage and generating copy instruction signal STAT from the output port 1 and starting the copying operation by the sequence controller $Q_2$. Step 212, like the aforementioned step 186, is one for detecting the blank exposure signal becoming OFF as the time point whereat the copy paper reaches the lower stage inclination sensor group 37. Thereafter, the copy cycle has already been entered at the step 214 and therefore, the copy instruction signal STAT is released and the check-up of the lower stage inclination sensors is effected at the steps 215, 216 and 217. If what should originally have become 0 at this time point is 1, it is regarded as abnormal. When the lower stage inclination sensor 3 is abnormal, "13,0" is displayed in the route of 215-228-219-220; when the lower stage inclination sensor 1 is abnormal, "11,0" is displayed in the route of 216-229-219-220; and when the lower stage inclination sensor 2 is abnormal, "12,0" is displayed in the route of 217-230-219-220. If all the sensors are not abnormal in the process hitherto, "88,00" is displayed in the route of 218-219-220. The displayer 73 of the copy counter displays 00 (step 219).

(ADF Sequence Control)

Figure 16:
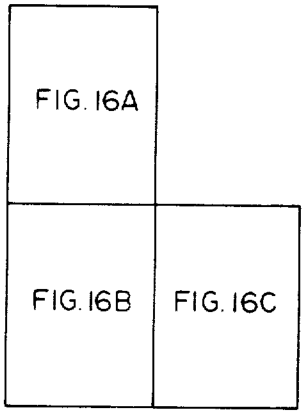
FIG. 16 is a control flow chart of the ADF.

FIG. 16 is a sequence control flow chart of ADF shown in FIGS. 1 and 2 and this flow program is stored in the ROM of the ADF controller $Q_3$ shown in FIG. 4. The main switch of ADF is closed to apply 15 V (step 0), the signal MODE produced by the closing of the mode switch is discriminated (step 1), the enable signal DFE from the copying machine is discriminated when the signal MODE is 1 (step 2), the original detection by the sensor 90 of the bucket portion is discriminated if the sensor 85 detects no original (steps 3 and 4) and when an original is placed, the feeder motor and the setter motor are energized to operate the rollers 87, 88 and the belt 89 to feed an original onto the platen 14 (step 5). If the original passes the sensor 84 without being inclined, the feeder motor is deenergized to stop the rollers 87, 88 and when the sensor 85 detects the original, the setter motor is deenergized to stop the belt 89 (steps 6-9) and stand-by signal STB is put out to the supervision controller $Q_1$. The supervision controller $Q_1$ detects it and puts out start signal STAT to the sequence controller $Q_2$ to start a copy process cycle (Step 10). When the copying is started, the enable signal DFE is cancelled, whereby the stand-by signal STB is also cancelled (steps 11 and 12). When a number of copies set by the key have been completed, the enable signal DFE is put out from the supervision controller $Q_1$ during backward rotation in the manner described above and therefore, the original on the platen is discharged therefrom upon detection of the presence of the original by the sensor 90 in the bucket portion and setter motor and feeder motor signals SM and FEM are produced to feed the next original, and plunger signal PLS is produced to lift the pawl 86 (steps 13-15). The feeding of the next original is checked up to deenergize the feeder motor (steps 17 and 18) and when the preceeding original has passed the sensor 85, the plunger signal PLS becomes OFF to lower the pawl 86 (steps 16 and 20). When the next original reaches the sensor 85, it is detected to deenergize the setter motor (steps 19, 21-23). Thus, the same copying operation as that described previously is repeated. Since the supervision controller Q, does not clear but holds the set number after termination of the copying, the same number of copies can be obtained for each original. When the originals become exhausted in the bucket portion, the setter motor and the plunger are energized to effect only the original discharging operation and after the original has passed the sensor 85, the plunger is lowered and completion of the discharge by the sensor 91 is checked up, whereupon the setter motor is stopped and the initial mode is restored.

Incidentally, if an original is already present on the platen 14 when the enable signal DFE is applied as input after the closing of the mode switch, that original is discharged and the next original is fed to effect copying (steps 3, 10-14, 6, 15).

Also, when the copying has been terminated by the stop key of the copying machine or when the copying has been interrupted due to absence of paper and thereafter the set number and the number of copies have been cleared by the clear key, the enable signal DFE is put out from the supervision controller $Q_1$ as already mentioned and therefore, the original during the interruption is discharged through the step 13. This is apparent from the column of ADF enable in FIGS. 18-1 to 18-3.

When ADF is opened and the original is manually set and then ADF is closed, it is possible to produce copies by the use of the copy button 54. When the set number of copies have been terminated, the original can be discharged by the use of the mode switch as already described.

After a manually set original has been copied with the signal resulting from the initial closing of the mode switch being maintained by a timer or the like, the original may also be discharged automatically.

ADF is provided with a stop key for interrupting the feeding of the original, and this becomes possible by providing the step 11 with a stop discriminating routine step to prevent the step from advancing. If the steps 7, 17, 21 and 27 are provided with a stop discriminating routine step, it also becomes possible to quickly stop the setter motor and the feed motor when ADF stop key is depressed during the feed setting or the discharging operation.

Also, when the sensor 84 does not detect an original at the steps 7 and 17 even if more than a specific time has elapsed from the step 5, jam display output may be generated to stop the feed motor and the setter motor.

(Copy Sequence Control)

Figure 17:
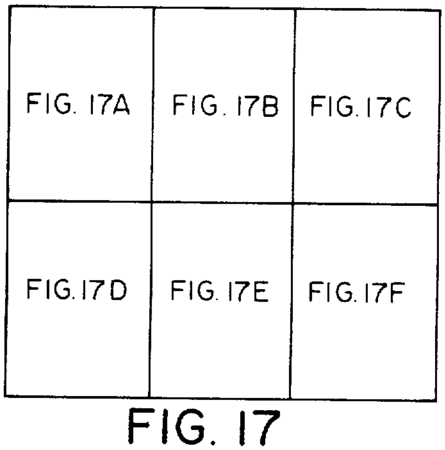
FIG. 17 is a sequence control flow chart.

FIG. 17 is a program flow chart for controlling the sequence by the sequence controller $Q_2$. Description will hereinafter be made by reference to the time chart of FIG. 5.

When CPU is connected to the power source by closing the main switch, RAM is cleared and the wait lamp is turned on (step 0). First, whether or not jam reset signal RS is applied as input with power source signal SWS is detected. Thereby, the jam suppression for omitting the jam check step or the like is discriminated and when it is so, the jam suppression flag is set (step 1). When there is no input of jam suppression, detection of the paper on the jam detecting sensors 36, 37, 35 and 40 and when there is paper thereon, the place of the sensor is displayed by turning on and off the marks 65-69 of the operating portion (FIG. 2) as already mentioned (step 2). When there is the jam suppression, this step is not executed. Next, the machine waits until it waits up by detecting wait signal WT and when signal PEP representing "no cassette" and "no paper in the cassette" has been detected, that loop is not passed through (step 3). When there is the jam suppression, this routine is not executed and wait lamp off signal WTL is put out from $Q_a$. Cassette signal 1-3 of the stage-designated cassette are detected to discriminate between the full size and the half-size and set each flag (step 4).

Next, whether or not start signal STAT is put out from the supervision controller $Q_1$ is detected and when the start signal is detected, main motor signal $S_1$, blank lamp signal $S_8$, whole surface lamp signal $S_9$ and backward movement signal $S_7$ for setting the optical system at a predetermined stop position thereof are put out. When the optical system is at the stop position, signal OHP becomes 0 and a primary high voltage signal $S_{11}$ is put out (step 6). Thereafter, when 30 clock pulses CL have been counted, AC trans signal $S_{10}$ is put out to emphasize the minus component of AC corona (step 7). When further 312 clock pulses have been counted, recheck of no-cassette and no-sheet is effected and whether or not the start signal STAT has become OFF is detected and, when the start signal has become OFF, AC trans signal $S_{10}$ becomes OFF and step 1 is restored (step 8). When no stop signal is detected, paper feed signal $S_2$ is put out to feed paper from the cassette and after 47 clock pulses have been counted and simultaneously with OFF of signal $S_2$, a first resist signal $S_3$ is produced to feed the paper toward the second resist roller with rough timing. At the same time, signal $S_{13}$ is produced to put out the output of the potential sensor to a potential control portion, not shown. It is also possible to design the potential sensor such that the rotation of the rotor therein is started by the signal $S_{13}$.

Next, 54 clock pulses are counted to put out signal $S_5$ and turn on the halogen lamp 16 (step 10).

In the meantime, the drum clock pulse number (3 clocks) required from the time when the paper has reached one of the paper feed port sensors 36 (signal CPOS1) until the paper reaches another one of such sensors (signal CPOS2) is counted (operation of the timer 4) to check oblique feeding (inclination) of the paper. That is, when the clock number exceeds a predetermined number, the paper is judged as being inclined and jam signal 4 is put out and the feeding of the next paper is stopped to interrupt the resumption of the process. When the paper is of the half-size, the number of the pulses CL from the generation of CPOS1 until the paper reaches still another sensor (signal CPOS3) lhing at a shorter distance than the other sensors is counted to check up the foregoing inclination.

Next, after the lamp is turned on, 23 clock pulses are counted and optical system forward movement signal $S_6$ and developing device driving signal $S_{12}$ are put out. However, a voltage is gradually applied to the forward movement clutch to prevent shock (step 11). When the optical system leaves its stop position, 1 of signal OHP is sensed to turn off blank lamp signal $S_8$ and again turn on the first resist roller signal $S_3$ and a full voltage is applied to the forward movement clutch to start scan (step 12).

When the lamp is turned on, paper should be passing on the paper feeding station sensor 36 and therefore, when the lamp signal is ON, the sensor 36 is checked up. When no paper is detected, it is judged as paper feed error and jam signal 4 is put out.

Next, when the optical system reaches the resist sensor 39 and signal RG is applied as input, a second resist roller signal $S_4$ is put out (step 13). When 175 clock pulses have been counted from the time when OHP has been produced, the size flag is discriminated. When the paper is of the full size, the set of the clock count 157 is counted. Thereafter, signals $S_5$ and $S_6$ are turned off to turn off the lamp, stop the forward movement of the optical system and produce signals $S_7$ and $S_8$ to start backward movement of the optical system and turn on the blank lamp (step 14).

This blank signal $S_8$ is applied as input to the supervision controller $Q_1$ and effects +1 on the copy counter COPY on the condition of 1 of AC signal $S_{10}$. The supervision controller $Q_1$, as previously described, detects whether or not the content of the set counter memory SET of RAM is equal to the content of the copy counter memory and thereby discriminates the termination of the copying and, when the content of the set counter memory SET is coincident with the content of the copy counter memory, the controller $Q_1$ turns off start signal STAT and shifts the sequence controller $Q_2$ to the backward rotation control mode. The sequence controller $Q_2$ counts 2 clock pulses after turn-on of signals $S_7$ and $S_8$ and turns off AC signal $S_{10}$ for the reason already set forth.

When the copy counter is not counting up, signal STAT is not cancelled and therefore, the step jumps to the previously mentioned paper feed step 9 to continue the copying repeatedly (step 15). When the copy counter is counting up, the sensor 38 is detected to judge 0 of OHP, whereupon the backward movement clutch is deenergized and 150 clock pulses are counted to turn off $S_{11}$ and disconnect the DC transformer, and further 260 clock pulses are counted to turn off $S_1$ and deenergize the main motor. The AC transformer is gradually decreased in voltage at this time as shown in FIG. 5 and becomes deenergized to prevent peak irregularity of the surface potential which would otherwise result from abrupt deenergization (Steps 16 and 17). Even if $S_1$ is turned off, the drum somewhat makes rotation and therefore, with such rotation taken into account, a timer of 0.5 sec. is operated and after the time thereof is up, lamp signals $S_8$ and $S_9$ are turned off to prevent potential irregularity during stop-page of the drum to the utmost (step 18). Then, the jam suppression is reset and the step jumps to the step 1.

In the above-described process, a timer T5 which effects time limiting operation by counting clock pulses CL (64 clocks) is operated with the timing of FIG. 5 and when its count is up, whether or not paper is present on the image transfer port sensor 35 is checked up and when no paper is present there, delay jam 3 is put out. Also, timer $T_2$ is operated and after its time is up, whether or not paper is present on the outlet sensor 40 is checked up and when no paper is present there, delay jam 2 is put out. Also, timer 3 is operated and after its time is up and when paper is present on the sensor 40, stagnation jam 1 is put out. The count 38 by timer $T_4$ deenergizes the first resist roller and the count 55 by timer $T_6$ deenergizes the developing device motor. The foregoing timer operations are effected by a subroutine, not shown, executed at each clock count step.

Jam signals 1-4 are applied as input to the supervision controller $Q_1$ and provide condition signals for displayed subtraction, as already described. One of these signals 1-3 operates jam relay $K_1$ (FIG. 9) so that the CPU power source is applied from the connector side. According, even if the door is opened or even if the main switch MSW is opened, RAM condition is maintained. However, the other power source is cut off, so that the display is extinguished. Also, when there is jam 4, the then process is completed and the step jumps to the backward rotation step 14 and enters a second repose condition. When the reset switch 47 (FIG. 1) is closed, the sequence controller $Q_2$ reads signal RS and turns off jam outputs 1-3 to release the jam. The paper feed station jam signal 4 reads no-cassette signal PEP and is then released.

Also, when the start signal STAT from the supervision controller $Q_1$ is turned off by stop signal, serviceman call signal or the like and when no-cassette or no-paper condition is detected by the sequence controller $Q_2$, the then process is not interrupted but is executed to the last and the backward rotation is completed to discharge the sheet and bring about the waiting (repose) condition for the first time. (Key Entry Conditions)

In FIGS. 18-1 to 18-3 which show key entry conditions, 4 designates the backward rotation interval and 5 designates the propriety of entry of the second repose interval and propriety of the enable signal. X represents that the key is not received, 0 represents that the key is received, and 6 represents a variation in display at the start of the second copying. X represents that there is no causal relation, COPY COPY represents that copying is started with the display unchanged, and 0 COPY represents that copying is started with the display rendered to 0. Further, W in FIG. 18-1 means that the other keys are not received until stoppage.

For example, in (1) and (2) of FIG. 18-2 after the cut-in copying (after interruption of the stop key or after the number SET of cut-in sets and the number COPY of cut-in copies have become coincident with each other), when the copy key is depressed, copying is started from display 0 if the number of copies before the cut-in copying is coincident with the set number thereof, but if the two numbers are not coincident, copying is started after the number of copies before the cut-in has been displayed. This holds true even in the case where stand-by signal STB is applied as input from the ADF controller to the supervision controller after the cut-in copying. Also, in the mode (3) after the cut-in copying has been interrupted by the reason of no-sheet or the like, copying is resumed with the number of copies at the time of interruption of the cut-in (independently of the clear key) being displayed. However, when the stop key is depressed during the interruption, retraction data is recalled to execute the aforementioned mode (1). In the case of (3) and (4), retraction data is not automatically recalled as in the case of (1) and (2). When jam occurs, the clear key, the stop key and up/down key may be depressed after the jam has been released. The interruption key may be depressed in the repose interval, but in the case of no-sheet and jam, jam release and stop key become necessary.

In FIG. 18-1, in the case of (1) and (2) and in the case of (4) where the ordinary copying has been interrupted by depressing the interruption key, ADF enable signal DFE is put out in the backward rotation mode 4 and the second repose mode 5. Accordingly, the next original can be set a little earlier. In the case of (4), the numeric key (ten-key), clear key, up/down key, stop key and copy key are received only in the second repose interval 5.

The reception of the ten-key at this time may be made possible after the paper has passed the discharge station sensor 40. If an increased speed of the starting of the cut-in copying is more desired then the pausing of the copying, the copy key, ten-key and other keys may be made depressible even at 4. Likewise, this may also be done when the interruption key is depressed at 4 in (1)-(3). The interruption key can be cancelled by the stop key. Also, in the case of (1)-(3) and jam, the ten-key may be rendered depressible without depressing the clear key, thereby facilitating the operation. What has been described just above also applies to FIGS. 18-2 and 18-3.

In the mode (5) wherein the copying is interrupted by jam, jam is released in the second repose interval, whereafter the interruption key, stop key, clear key, up/down key and copy key are received and the ten-key is received by the clear key after the jam has been released. DFE signal is put out in the same manner as shown in FIGS. 18-2 and 18-3 after the jam has been released and after the clear key or the interruption key has been depressed. Thereby, the original on the platen which it is desired to cancel may be automatically discharged.

After the operation of ADF, the original lamp 57 does not respond as shown in FIG. 18-3. The interruption key becomes depressible when the copies have been counted up and the machine is in repose. If design is made such that the signal of the interruption key depressed during ADF copying is held in a memory until copies of one original have been counted up so that the DEF signal at 4 is not generated by the held signal, the next original may not be set and therefore, cut-in copying can be effected in the intervals of automatic interchange of originals. Also, by suppressing the bucket sensor by that held signal, only the discharge of the preceding original can be executed (step 14 in FIG. 16).

Figure 36:
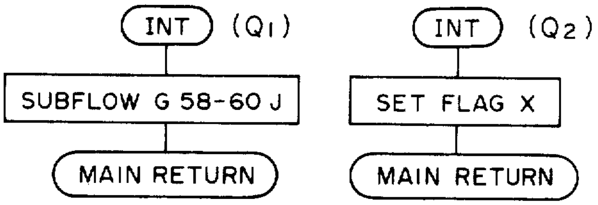
FIG. 36 is an example of program for $Q_1$ and $Q_2$.

The blank signal $S_7$ from the sequence controller $Q_2$ is applied as input to the interruption port INT of the supervision controller $Q_1$. As shown in FIG. 36, the steps 58-3 of the subflow G of $Q_1$ for judging the termination of copying is the interruption program. Then, during the rising of the signal $S_7$, the subflow G can be preferentially and quickly executed. Thus, the data STAT as to whether or not the copying has been been terminated can be delivered to $Q_1$ after only the result of the process of the flow G has been obtained, thus reducing malfunctioning and simplifying the program. In this case, F/B reset becomes unnecessary during the interruption flow and F/B set in the steps 57-3 and step 62 becomes unnecessary during the subflow G. Where $Q_1$ has an interruption port whose degree of preference is lower, the drum clock may be applied as input to this port. This is also the case with $Q_2$.

The signal STAT from $Q_1$ is also applied to the interruption port INT of $Q_2$. The step in which flag X is set to RAM is regarded as the interruption program. The step in the main flow for jusging STAT is regarded as the step for judging whether or not the flag X has been set, and when it has been judged that the flag X has been set, the flag X may be reset. Then, judgment of start or stop can be simply done by $Q_2$. In the foregoing example, the interruption is enabled in advance when power is ON in the main flow of $Q_1$, $Q_2$.

As the CPU $Q_1$–$Q_4$ of the apparatus body, use may be made of 8085 produced and sold by INTEL Co., Inc. or NCOM43 produced and sold by Nichidensha Co., Ltd. If DFE signal is applied as input to the INT of OPU $Q_3$ of ADF, control of ADF will become easier.

(Inclination Detection and Jam Release)

Figure 19:
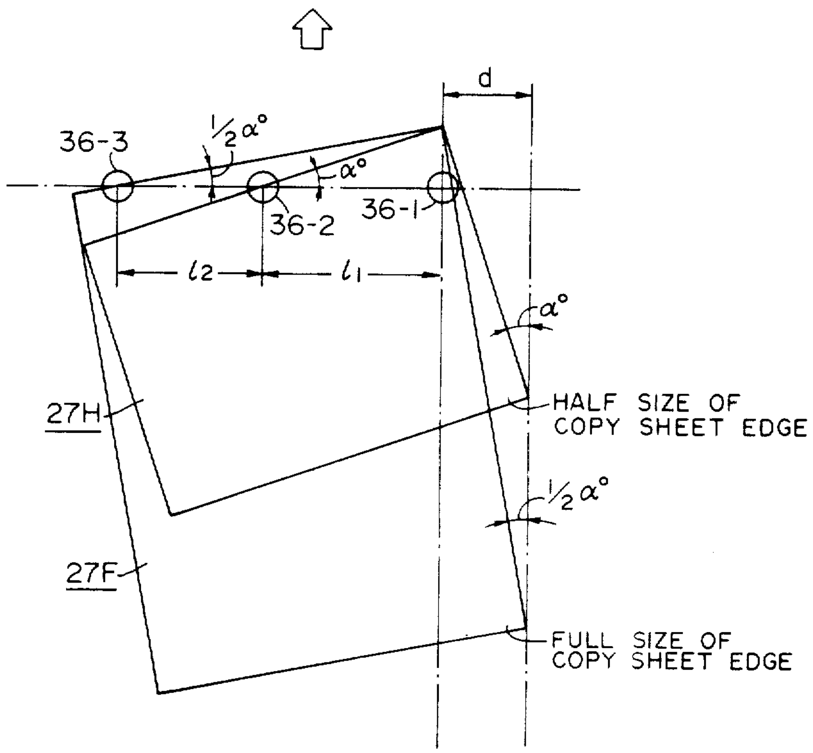
FIG. 19 is an explanatory diagram for the oblique movement detection section in the reproduction apparatus shown in FIG. 1.

The inclination detection in the present invention will further be described with reference to FIG. 19. If copy paper is inclined after fed, it assumes the condition as shown with respect to the direction of its movement indicated by arrow. If the copy paper in such condition continues to be fed toward the second resist roller 30, it will jam in the course of its movement. When a copy sheet of full size (27F) is inclined as much as a copy sheet of half size (27H), the trialing edge of the former will become more deviated. That is, for the same degree of deviation d of the trailing edge, the angle of inclination of the leading edge is smaller in the full size copy sheet than $\alpha°$ of the half size copy sheet ($\frac{1}{2}\alpha°$). Accordingly, the full size copy sheet is more liable to jam and any slight inclination thereof may cause jam.

The present invention intends to prevent jam even if the size of copy sheet differs, and may effect the detection of inclination corresponding to the size with high accuracy.

As shown, three paper sensors 36-1 to 36-3 are arranged as paper feed station sensors 36 and they are referred to as the reference sensor, the half size sensor and the full size sensor, respectively. These sensors put out signals CPOS1, CPOS2 and CPOS3, respectively. The intervals $l_1$ and $l_2$ therebetween may be substantially determined by the allowed width d of inclination, the length of the paper in the direction of movement thereof, and the velocity of the paper.

Figure 20:
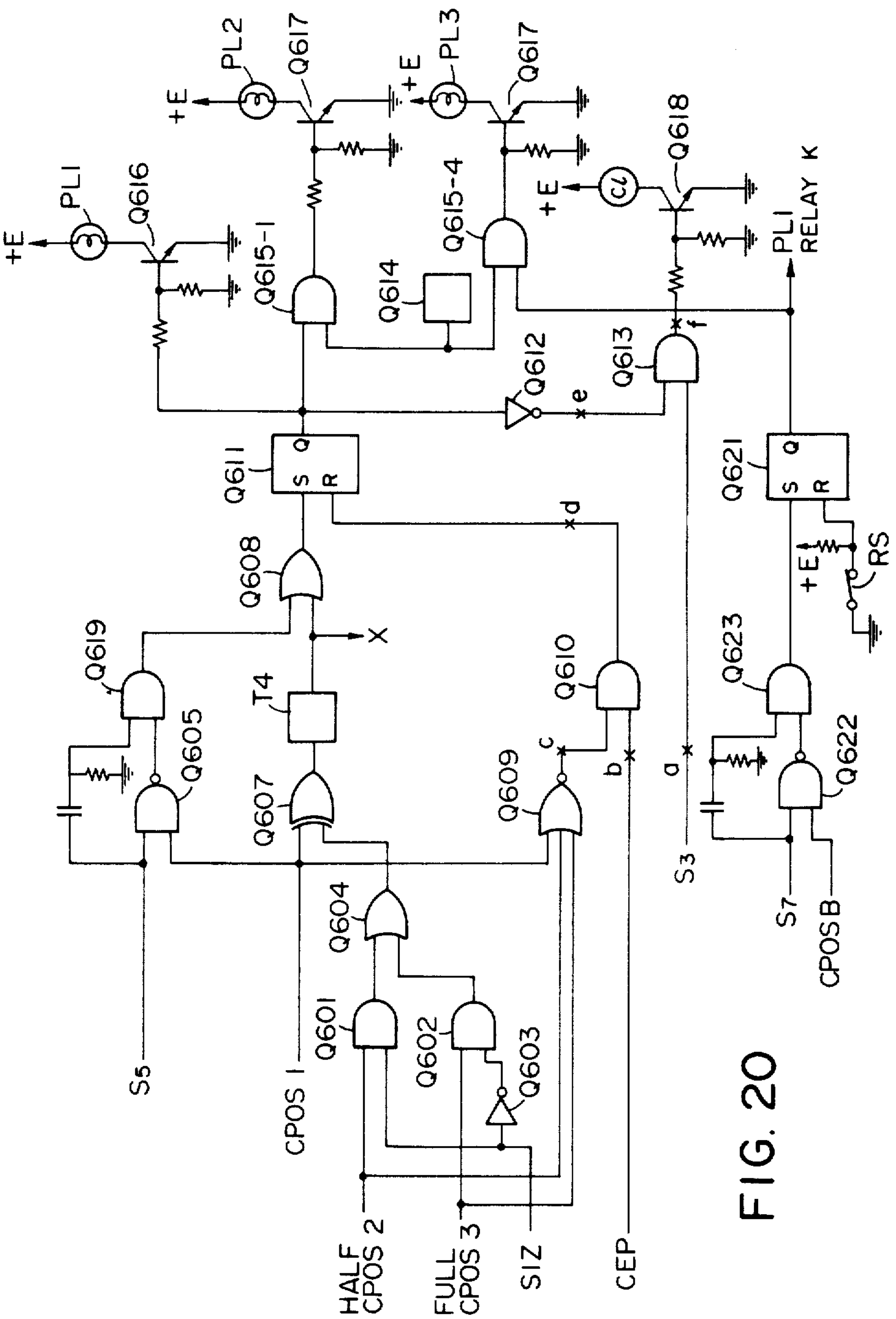

FIG. 20 shows another example of the circuit for detecting a paper trouble such as inclination or the like and in the Figure, symbols of input signals correspond to those in FIGS. 4 and 5. SIZ represents cassette size signal, $Q_{601}$ and $Q_{602}$ designate AND gates for receiving as input the signals from the half sensor and full sensor, $Q_{607}$ designates and exclusive OR gate for starting the timer $T_4$ by the refence sensor, $Q_{611}$ denotes a flip-flop, Cl designates a clutch for driving the first resist roller, and $PL_1$ denotes a lamp for clearly indicating the line 65 (FIG. 2) of the jam display portion. $PL_2$–$PL_5$ are lamps for clearly indicating the line 66 of the cassette portion of the display portion or the discharge portion 69. Timer $T_4$ measures the time required for the leading edge of paper inclined with the width of d to pass the sensor 36-1 and the half sensor 36-2 or the full sensor 36-3.

When a copy sheet is conveyed normally, the sensors 36-1 to 36-3 detect the paper at the same time. Accordingly, signals CPOS1-3 all become 1. When the size of the upper cassette designated by the key 52 is the half size (A4, B5, U2), signal SIZ becomes 1 and the gate $Q_{601}$ is selected and its output becomes 1. Consequently, the exclusive OR gate $Q_{607}$, which puts out 1 when the inputs thereto are at different levels, puts out no output and the timer $T_4$ does not start. When the size of the designated upper cassette is the full size (A3, B4, U1), signal SIZ is 0 and so, the gate $Q_{602}$ is selected and its output becomes 1. Accordingly likewise, the timer $T_4$ does not start during normal conveyance of the copy sheet. If the timer does not start, the flip-flop is not set and therefore, the lamps $PL_1$–$PL_5$ are not turned on.

When the half size paper is inclined, the output CPOS1 of the reference sensor is 1 and the output CPOS2 of the half sensor is 0 or vice versa. Thus, the inputs of the exclusive OR gate $Q_{607}$ differ from each other and this gate $Q_{607}$ puts out 1 as long as its inputs are at different levels. This output starts the timer $T_4$ and after the lapse of a preset timer time, the timer puts an output 1. If CPOS1 and CPOS2 assume the same level within the timer time, the timer operation is released and the timer produces no output. That is, the inclination of the half size paper now under discussion is not judged as inclination) because it is an inclination within the allowed width d (FIG. 19). However, when the outputs of the sensors do not assume the same level and the timer operation is completed, this is regarded as inclination and the flip-flop $Q_{611}$ is set through the gate $Q_{601}$ and level 1 is put out from the Q port. Since the repetitive pulse from an oscillator $Q_{614}$ is being applied as input to a gate $Q_{615}-1$, this pulse, coupled with the level 1 from the Q port, operates a transistor $Q_{617}$ to turn on and off the lamp $PL_2$ in accordance with the pulse. By this turn on and off, the upper stage side of the mark 66 is clearly indicated. If the lower cassette has been designated, the lower stage side of the mark 66 is clearly indicated. Also, the set output of the flip-flop $Q_{611}$ operates a transistor $Q_{614}$ to turn on the lamp $PL_1$. By this turn on, the mark 65 is statically indicated.

When the full size paper is inclined, the full sensor is selected and so, as long as the signals CPOS1 and CPOS3 from the reference sensor and full sensor are at different levels, the gate $Q_{607}$ puts out 1 to start the timer T4. If the two sensors are energized within the same timer time as that for the half size, it is not regarded as inclination but, when that time has elapsed, it is regarded as inclination.

Accordingly, the detection of inclination corresponding to the size can be accomplished by the use of the same timer. Also, for example, the detection of inclination of a copy sheet of another size whose length in the direction of movement is ¼ of the full size may be accomplished by providing a further sensor between the sensors 36-1 and 36-2 and by using the circuit suggested in FIG. 6.

The output of the flip-flop $Q_{611}$ having detected inclination blocks the output of gate $Q_{613}$ to which a first resist roller operating signal S3 is applied through an inverter $Q_{612}$ and therefore, the power supply to the resist clutch Cl is cut off to stop the roller drive. Thereby, paper feeding after detection of inclination is stopped. At this time, the trailing edge of the paper remains in the cassette as displayed by the lamp $PL_2$ or is stopped near the cassette and therefore, removal of that paper can be done very easily.

It is also possible to use the output of the flip-flop $Q_{611}$ to open the paper path near the sensors and automatically discharge the inclined paper out of the machine.

Reference is now had to FIG. 6 to describe the detection of the failure to feed paper from the cassette effected by the inclination detecting sensor 36-1. As is clear in the time chart, a signal S5 for turning on the halogen lamp when paper normally passes this sensor is being put out from the control portion. That is, when signal CPOS1 is being applied to one input of NAND gate $Q_{605}$ and when the lamp signal S5 has become 1, the output of the gate $Q_{605}$ remains 0. Consequently, gate $Q_{619}$ neither put out any output and does not set the flip-flop $Q_{611}$. However, paper feed error occurs after the operation of the paper feeding roller and paper does not reach the sensor 36 at last, CPOS1 remains at level 0 and therefore, lamp signal S5 is put out earlier and the output of the gate $Q_{605}$ assumes level H. The level H is applied to AND gate $Q_{619}$ while, on the other hand, the differentiation signal of the lamp signal S5 is applied as input to the AND gate $Q_{619}$, which thus produces an output corresponding to that differentiation signal. Accordingly, the flip-flop $Q_{611}$ is set by that output and as in the case of inclination detection, the lamps $PL_1$ and $PL_2$ are turned on to stop the rotation of the first resist roller 29. Since inclination and paper feed error are paper troubles of the same level in the paper feeding station, displayers 65, 66 and 76 are used as the warning display. During such troubles, the other drive system (rollers 30, 30', 33-1, 33-2, etc.) does not stop its operation but discharges the normal paper within the machine and the optical system is stopped at the end of its backward stroke, whereafter the rotation of the drum is stopped, thus enabling quick re-starting of the copying. Since paper feed error is checked up by the lamp signal S5, the forward movement of the optical system after the turn-on of the lamp may be blocked during the paper feed error.

The flip-flop, which is set by the detection of inclination and detection of paper feed error, is set by dismounting of the cassette and contributes to quick restart. When the cassette (here, the upper cassette) is removed from the apparatus body for the removal of erroneously fed or inclined paper, all the switches 42 are opened thereby and signal CEP or PEP is put out and applied as input to one input of gate $Q_{610}$. In the case of inclination, one of CPOS1-3 detects the paper and so, NOR gate $Q_{609}$ puts out 0 and consequently, the gate $Q_{610}$ does not put out 1. However, when the inclined paper is removed, all the inputs of the NOR gate $Q_{609}$ become 0 and therefore, it puts out 1 and gate $Q_{610}$ also puts out 1, which is applied to the reset port of the flip-flop $Q_{611}$. Thereby, the flip-flop turns off the reset lamps $PL_1$ and $PL_2$ to enable the first resist roller to be driven. That is, unless the inclined paper is removed, reset does not occur even if the cassette is removed and thus, a further trouble which would otherwise result from paper removal error may be prevented. When the paper is removed, reset occurs automatically and this eliminates the complicated procedure of depressing the reset button for re-starting the copying after removal of jam to thereby release the jam condition. In the case of paper feed error, it often happens that no paper is fed from the cassette and therefore, in such case, re-driving can be accomplished very smoothly by removing the cassette and resetting the flip-flop, and then mounting the cassette after checking up the paper feed condition. It is also possible to make such a design that the flip-flop is reset when the cassette is mounted.

Description will be made of a case where paper is stopped on the paper feed station sensor 36 without inclination or paper feed error. In such case, the paper does not reach the image transfer station sensor 35 and so, the stagnation of the paper is displayed with the presence or absence of the paper at the sensor 35 being checked up by optical system backward movement signal $S_7$. That is, the signal of the sensor 35 is 0 and so, by signal $S_7$, gates $Q_{622}$ and $Q_{623}$ put out 1 like the relation between the gates $Q_{605}$ and $Q_{619}$ to thereby set flip-flop $Q_{621}$ and turn on the lamp $PL_1$, thus clearly indicating the line 65 and the jam displayer 64 and turning on and off the lamp $PL_3$. Then, a sham relay is operated to quickly interrupt the copying (stop the operation of the motor, the optical system and paper conveyor rollers). After removal of jam, flip-flop $Q_{621}$ is reset by a reset switch RS. When the paper is stagnant on the image transfer station sensor 35, the mark 67 is irradiated by the lamp; when jam occurs between the image transfer station and the discharge station, the mark 68 is irradiated by the lamp; and when the paper is stagnant on the discharge station sensor 40, the mark 69 is irradiated by the lamp. In any case, the lamp is turned on and off and the line 65 is statically turned on.

The foregoing display marks 65-69 are pre-printed on the Mylar of the surface layer of the display portion, and a blue smoke material is provided between the Mylar and the lamp for irradiating the Mylar so that the marks are normally not viewed from outside. By doing so, the warming effect for jam and its place may be made pronounced.

Figure 21:
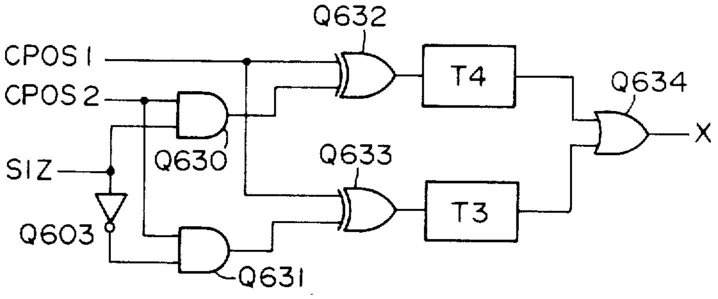
FIGS. 20 and 21 are examples of detection circuit for oblique movement of the sheet and jamming at the sheet feeding section.

In the present invention, there is another example of the inclined feeding which is effected by using paper detecting sensors 36-1 and 36-2 and providing a timer T3 whose time limit is shorter than that of the timer T4, that is, whose time limit is the time required for the leading edge of the paper to come from the sensor 36-1 to the sensor 36-2 over the allowed width d. That is, in FIG. 20, the circuit before X is made as shown in FIG. 21. In case of the half size, the timer T4 is operated with the input conditions of exclusive OR gate $Q_{632}$ satisfied through gate 30 like the aforementioned $Q_{607}$, and in case of the full size, the timer T3 is operated by exclusive OR gate $Q_{633}$ through gate 31 and inclination detection signal is put out upon completion of the timer operation.

(Jam Place Confirmation)

Figure 22:
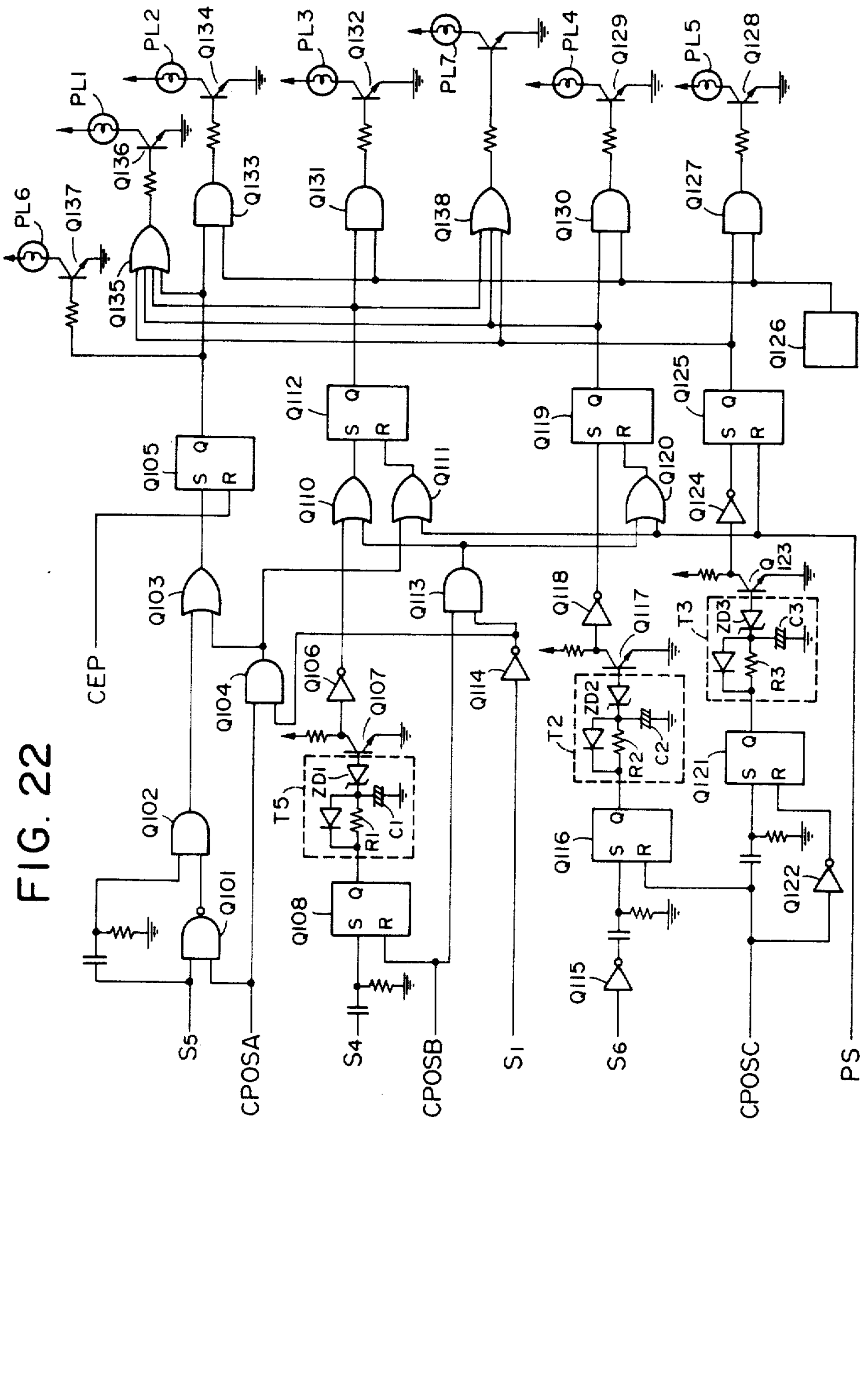
FIG. 22 shows a jam location indicating circuit.

FIG. 22 shows another example of the jam detecting circuit in the paper feed station, the image transfer station, the fixing station and the discharge station. The timing at which the paper passes each sensor is shown in FIG. 5.

The delay jam which occurs when the paper fed from the upper cassette reaches the paper feed station sensor 36 is detected as a paper feed error by the check signal which is lamp signal $S_5$ and the paper detection signal CPOSA produced by the upper stage sensor 36, as previously mentioned. That is, in case of a paper feed error, flip-flop $Q_{105}$ is set by the previously described gate operation to turn on and off the lamps $PL_1$ and $PL_2$, and the displayer 76 of the operating portion is turned on by $PL_6$.

Detection of the delay jam to the image transfer station sensor 35 is effected by the second resist roller signal $S_4$ and the paper detection signal CPOSB of the sensor 35.

That is, flip-flop $Q_{108}$ is set by signal $S_4$ and timer $T_5$ is operated by the set signal. Upon termination of the time limit of the timer $T_5$, transistor $Q_{107}$ is turned on and level 1 is put out from inverter $Q_{106}$. Flip-flop $Q_{112}$ is set thereby and lamp $PL_3$ is turned on and off in accordance with the repetitive pulse from oscillator $Q_{126}$, to thereby turn on and off the image transfer station mark 67. However, when the sensor 35 detects paper within the time limit of the timer $T_5$, flip-flop $Q_{108}$ is reset by signal CPOSB to release the time limit operation of the timer $T_5$. Accordingly, $Q_{112}$ is not set and the aforementioned turn on and off does not occur. The limit time of the timer $T_5$ is the time required for the leading edge of the paper to reach the image transfer station sensor 35 after signal $S_5$ has been produced by resist sensor $S_{16}$, plus some allowance.

When jam is detected by the sensor 35, the roller 30 is stopped while the other rollers 29, 30', 33-1 and 33-2 continue to rotate to move another sheet to near the image transfer station or discharge such sheet. By this, removal of the sheet can be effected at a single location.

Check-up of the delay jam to the discharge station sensor 40 is effected by optical system reversal signal and paper detection signal CPOSC produced by sensor 40. That is, when forward movement signal $S_6$ is turned off (reversal of the optical system), flip-flop $Q_{116}$ is set through inverter $Q_{15}$ and timer $T_2$ is operated by the set signal. Upon termination of the time limit of the timer $T_2$, flip-flop $Q_{117}$ is set in the same manner as that described above to turn on and off lamp $PL_4$ and turn on and off the fixing station mark 68. However, if the sensor 40 detects paper within the time limit of the timer $T_5$, flip-flop $Q_{116}$ is reset by signal CPOSC to release the time limit of the timer $T_2$. Accordingly, the lamp $PL_4$ is not turned on and off. The time of the timer $T_2$ is the time required for the leading edge of the paper to reach the sensor 40 after the signal $S_6$ has been turned off, plus some allowance.

Check-up of the stagnation jam on the discharge station sensor is accomplished by setting flip-flop $Q_{121}$ by paper detection signal CPOSC and resetting the same flip-flop by paper discharge signal $\overline{CPOSC}$ (inverted CPOSC). That is, timer $T_3$ is operated by the set signal of the flip-flop $Q_{121}$ and, when the paper is discharged from the sensor 40 within the limit time of the timer, the flip-flop $Q_{121}$ is reset to release the operation of the timer $T_3$. When the time limit of the timer $T_3$ is terminated without the sensor 40 detecting the trailing edge of the paper, flip-flop $Q_{125}$ is set in the described manner and lamp $PL_5$ is turned on and off in accordance with repetitive pulse. Thus, the jam line 65 is turned on and the discharge station mark 69 is turned on and off, thereby warning about the stagnation of the paper on the sensor 40. Also, during the jam accurring from the image transfer station to the discharge station, lamp $PL_7$ is turned on to cause jam displayer 64 to display the jam. The output of gate $Q_{138}$ for turning on the lamp $PL_7$ is applied as input to the control portion so that each control signal is turned off to stop the operation of process treating loads such as main motor and clutch. At the same time, jam relay is operated and mechanically held. It is also possible to make such a design that the motor is not immediately stopped by the output of $Q_{138}$ but it is stopped after the drum surface has been discharged and cleaned. Also, when delay or stagnation jam is detected by the sensor 40, the rollers 33-1 and 33-2 are stopped while the other rollers 29, 30 and 30' continue to rotate to move another sheet to near the outlet. By this, removal of the sheet can be effected at a single location.

FIG. 38 shows the circuit therefor comprising a combination of OR gates. CL1-3 designate clutch drive circuits for connecting the main motor to the first and the second resist roller and the fixing roller.

The copying cannot be re-started even if the housing door is simply opened and jammed paper is removed. Also, the power supply to the process loads is cut off, but the power supply (DC) to the displayers and the control portion is held.

During a trouble, it is also possible to turn on and off the relevant one of the marks 65-69 and statically turn on the other marks. Accordingly, during jam treatment, lamps $PL_1$–$PL_7$ are turned on to facilitate the treatment. During the treatment, if a reset button 47 provided in the housing is depressed, the aforementioned jam relay is released and flip-flops $Q_{112}$, $Q_{114}$ and $Q_{125}$ of FIG. 8 are reset by the signal RS produced by the depression of the reset button, to turn off the lamps $PL_1$–$PL_5$ and $PL_7$.

Change-over of the display of jam place will now be described. If the main motor signal $S_1$ is turned off after a predetermined time of backward rotation as already described when the lamp $PL_3$ is being turned on and off by the detection of image transfer station jam, a signal inverted by inverter $Q_{114}$ is applied as input to gates $Q_{104}$ and $Q_{113}$. If, at this time, signal CPOSA is being put out with paper stagnant on the paper feed station sensor 36, flip-flop $Q_{112}$ is reset by the output of gate $Q_{104}$ through OR gate $Q_{111}$ to turn off the lamp $PL_3$ and flip-flop $Q_{105}$ is set through OR gate $Q_{103}$ to turn on the lamps $PL_2$ and $PL_6$. Accordingly, the turn on and off is changed over from the image transfer station display mark 67 to the upper cassette portion of the paper feed station display mark 66. Also, when the main motor is stopped after backward rotation during the while that the lamp $PL_4$ is turned on and off by the detection of fixing station jam, if signal CPOSB is put out with paper stagnant on the image transfer station sensor 35, flip-flop $Q_{119}$ is reset by the output of gate B through gate $Q_{120}$ to turn of the lamp $PL_4$ and flip-flop $Q_{112}$ is set through gate $Q_{110}$ to turn on the lamp $PL_3$. Accordingly, the turn on and off is changed over from the fixing station display mark 68 to the image transfer station mark 67.

To facilitate removal of other sheets in the path after the jam place has been confirmed, the first and second resist rollers and the fixing roller may be controlled as described previously so that any sheet before the jam place may be moved to that place and any sheet after the jam place may be discharged.

(Diagnosis of Platen Lamp)

Figure 23:
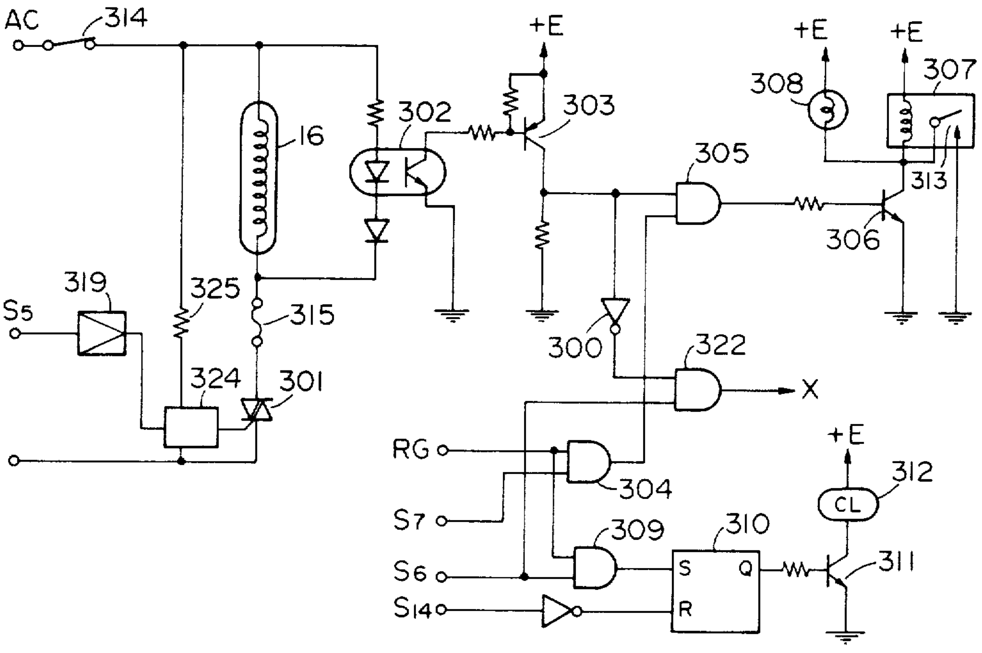
FIGS. 23 and 24 show other examination circuits for the lamp circuit.

FIG. 23 shows an example of the platen lamp diagnosis circuit. Where the lamp 16, once turned off, is turned on when signal RG is generated from the backwardly moving resist sensor, photocoupler 302 is turned on by the voltage applied to the lamp to drive transistor 303 and an output at level 1 is produced at gate 305 and thus, the gate 305, coupled with the resist sensor signal RG, drives transistor 306 through gate 304, as a result of which relay 307 is energized to self-hold at its contact 313 while, at the same time, displayer 308 is turned on to warn that the halogen lamp is abnormally turned on on the operating portion. Also, the line of the lamp is cut off by the contact 313 of the relay 307 to turn off the lamp. Since the relay 307 is self-holding, it is not deenergized by the turn off of the lamp. The copying operation is interrupted by unshown other contact of the relay 307 and such interruption is mechanically locked. Such locked condition may be released by opening the contact 313 by means of reset switch 49. The stoppage of the copying is not effected by interrupting the main motor simultaneously with the warning, but the main motor is stopped after lapse of the time required for the discharge or the like of the copy paper (backward rotation mode).

Gate 304 is not opened even if the resist sensor is operated during the forward movement of the optical system and therefore, even if 1 is applied to one input of gate 305, the aforementioned warning operation does not take place. Also, if the halogen lamp 16 is turned off during the operation of the backwardly moving resist sensor, the photocoupler 302 and the transistor 303 are in OFF state and so, the warning operation does not take place in this case again.

When the halogen lamp is so left turned on for some reason or other even after the termination of the exposure scanning, check-up is effected by diverting the signal of the resist sensor to that purpose and thus, the life of the expensive halogen lamp can be prolonged by a simple construction.

If, besides the resist sensor, there is a sensor idly operating during the backward movement of the optical system, it is also possible to generate this check timing signal by diverting such sensor to this purpose. Of course, in the present invention, it is possible to use an idle signal produced by the backward movement of the original carriage after exposure if the apparatus is of the reciprocally movable original carriage type, or it is also possible, if the apparatus is of the type in which the process timing of exposure scanning or the like is taken by the use of a cam provided on the drum and a microswitch provided in the apparatus body, to utilize the idle operation of the microswitch corresponding to the time after termination of exposure.

It is also possible to check up not only the lamp but also the condition of a load such as forward movement clutch or the like which operates at timing by other timing signal or idle signal generated during the inoperative condition of the load.

When the halogen lamp is not turned on during the copying operation, the operator can know that fact through the original platen. However, by that alone, the operator cannot know the reason why the lamp is not turned on. This is because the reasons why the lamp is not turned on include the breakage of the lamp itself, the damage of the lamp turn-on stabilizer or of the driver circuit 311, or the melting of the temperature fuse 315, etc. Therefore, the present invention makes it easy for the operator to take a countermeasure for the trouble by enabling the cause of the trouble to be displayed in the machine.

Figure 24:
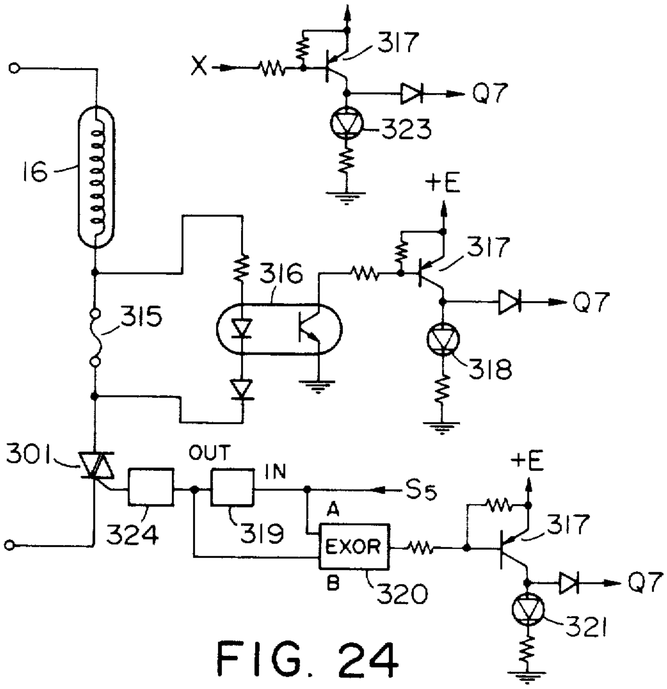
Figure 26:
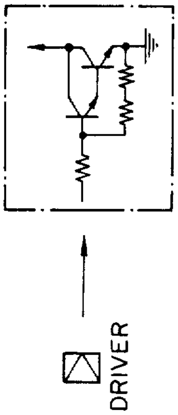
FIGS. 25 and 26 are other examination circuits for the driver circuit.

Reference is now had to FIG. 24 to describe an example of the circuit for checking up the impossibility of turn-on of the halogen lamp 16.

Designated by 315 in FIG. 24 is a temperature fuse TF which is provided at the position of FIG. 1. This fuse is provided near a blower provided to cool the interior of the machine heated by the lamp 16, particularly, the original carriage platen. Denoted by 316 is a photocoupler for detecting the condition of the temperature fuse to produce an output at transistor 317, and designated at 318 is a light-emitting diode for displaying the condition of the temperature fuse. FIG. 24 further includes a driver circuit 319 for amplifying signal $S_5$ to supply trigger power to a triac 301, a logic circuit 320 for checking up the condition of the driver circuit 319, a light-emitting diode 321 adapted to be turned on when the driver circuit 319 is abnormal, and a gate 322 (FIG. 23) for detecting the non-turn-on of the lamp 16 during exposure timing. One port of the gate 322 receives as input the signal from the photocoupler 302 and the other port of the gate 322 receives an input signal $S_5$ which moves the optical system forwardly. The gate 322 is connected to the X port of FIG. 24. FIG. 24 further shows a light-emitting diode 323 adapted to be turned on when the lamp is not turned on, a transistor 317 for amplifying a signal to turn on the light-emitting diode, and a stabilizer 324 for detecting the voltage applied to the halogen lamp 16 by a resistor 325 and holding and controlling the voltage at a predetermined level.

The circuit of FIG. 24 is one comprising the circuit of FIG. 23 having a lamp diagnosis circuit added thereto and it can collectively check up the condition of the exposure lamp and display the warning by cause of trouble. More specifically, when the stabilizer 324 of the halogen lamp is abnormal, the triac 301 does not operate and so, no voltage is applied to the lamp 16. Accordingly, the photocoupler 302 (FIG. 23) is not turned on, so that signal of level 1 inverted by inverter 300 is applied as input to the gate 322. At this time, when optical system forward movement signal $S_6$ (level 1) is put out to start the exposure scanning, 1 is put out by the gate 322 to drive the transistor 317 and turn on the light-emitting diode 323. Consequently, the damage of the stabilizer 324 can be displayed as a warning.

Next, when the neighborhood of the platen 14 becomes over-heated, the temperature fuse 315 melts and thereby a voltage is applied to the photocoupler 316, which is thus operated to turn on the transistor 317. Thus, the light-emitting diode 318 is turned on to display the melting of the fuse. That is, the impossibility of turn-on of the lamp due to the melting of the fuse is warned.

Next, when the driver circuit 319 is damaged, the triac 301 no longer operates as directed by signal $S_5$. Incidentally, the output signal of the driver circuit 319 generally becomes inverted with respect to the input signal thereto and therefore, the damage of the driver can be discriminated by comparing the phase of the input signal. Signal $S_5$ (A) is applied as input to one port of the logic circuit 320 while the output Out (B) of the driver 319 is applied as input to the other port of the logic circuit, and logic discrimination of the exclusive OR gate is effected by the logic circuit 320. That is, when the result of the logic discrimination $\overline{A}\cdot B+A\cdot\overline{B}$ becomes 1, 1 is put out by the logic circuit 320 to turn on the transistor 317 and turn on the light-emitting diode 321. That is, when both A signal and B signal are 1 or 0, the driver 319 is regarded as abnormal and warning display is effected. The light-emitting diode 313 is turned on when the lamp and the stabilizer are normal and the temperature fuse alone blows; the light-emitting diode 321 is turned on when the driver is abnormal; and the light-emitting diode 323 is turned on when the stabilizer and the driver are abnormal, and thus warning is displayed by cause of trouble. Causing the trouble of the stabilizer alone to be displayed by the light-emitting diode 323 becomes possible by providing a further gate so that the output of the gate 322 is turned off when the judgment output of the logic circuit 320 is 1. $Q_7$ in FIG. 24 is a signal for switching off the power source or the like to inhibit the operation of the copying machine and this signal can also open the switch 314 of FIG. 25. $Q_7$ is also a signal for causing the various warnings to be collectively displayed as a serviceman call by a single lamp on the operating portion of the copying machine.

As has been described above, the present invention effects warning display and interrupts the drive of the machine by detecting the condition of the temperature fuse of the light source, the condition of the driver circuit of the light source, the abnormally turned-on state of the light source, the damage of the stabilizer, etc., and therefore enables accurate self-diagnosis about the lamp and facilitates the maintenance of the copying machine.

(Driver Diagnosis)

Figure 25:
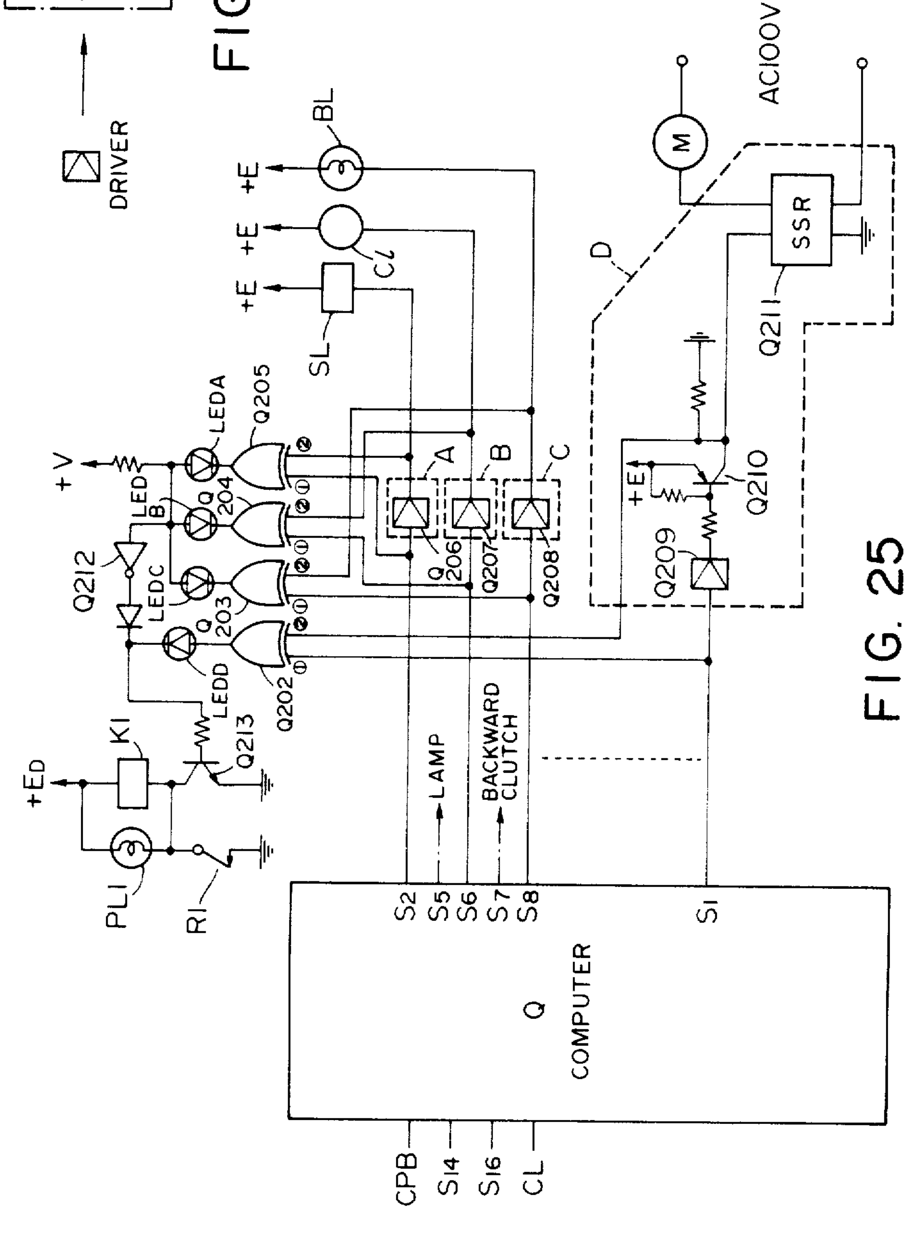

FIG. 25 shows another example of the driver diagnosis circuit. LED-A to LED-D display the abnormality of the paper feed control circuit A, the optical system forward movement control circuit B, the blank lamp control circuit C and the motor control circuit D (these circuits are provided on independent, detachable printed plates).

When signal $S_1$ is put out from the sequence control portion Q (including $Q_1$ and $Q_2$ of FIG. 3) at the timing of FIG. 5, signal $S_1$ of level H is applied as input to the base of transistor $Q_{209}$. When the transistor $Q_{209}$ is turned on, transistor $Q_{210}$ is turned on and level H is put out at the collector of the transistor $Q_{210}$. This signal turns on $Q_{211}$ of SSR to rotate the main motor M. The input port of the driver $Q_{209}$ is connected to the port 1 of gate $Q_{202}$ and the collector of the transistor $Q_{210}$ is connected to the port 2 of the gate $Q_{202}$ and therefore, level H is applied both to the ports 1 and 2 during the above-described normal operation. Accordingly, the output of the gate $Q_{202}$ puts out a logic output of $A\cdot\overline{B}+\overline{A}\cdot B$, where A is the signal of port 1 and B is the signal of port 2, and therefore the output of the gate $Q_{202}$ becomes level L and the LED-D is not turned on. However, when the driver $Q_{209}$ and the transistor $Q_{210}$ are abnormal, the motor is sometimes not energized in spite of the signal $S_1$ being at level H. At this time, one of the ports 1 and 2 becomes level H or level L and so, the output of the gate $Q_{202}$ becomes level H. Accordingly, LED-D is turned on to turn on transistor $Q_{213}$ and operate relay $K_1$, thus turning on an alarm lamp PL. Also, when the timing signal $S_1$ is not being out, namely, when it is at level L, if the collector output of the transistor $Q_{210}$ is also at level L, the gate $Q_{202}$ does not put out an alarm, but if the collector output of the transistor $Q_{210}$ is at level H, the gate $Q_{202}$ puts out level H to turn on lamp $PL_1$.

Also, when solenoid SL is energized to effect paper feed operation, timing signal $S_2$ becomes level H. However, if the control circuit A has gone wrong and the driver $Q_{206}$ does not invert the input but the output remains at level H, both of the input ports 1 and 2 of the gate $Q_{205}$ become level H and in accordance with the logic thereof, the output becomes level L to turn on LED-A by a voltage V. In this case, when the inputs are at the same level, abnormality is judged. This L signal is inverted by inverter $Q_{212}$ to turn on the alarm lamp $PL_1$ in the manner already described. When $Q_{206}$ is normal, the input and output of the driver $Q_{206}$ are out of phase with each other and therefore, the gate $Q_{205}$ puts out level H and thus, LED-A is not turned on. As regards the trouble diagnosis of drivers $Q_{207}$ and $Q_{208}$, LED for designating the broken down printed plate is turned on by similar operation to turn on the ordinary serviceman call lamp $PL_1$.

The holding relay $K_1$ releases its holding operation by closing a reset switch provided within the housing of the copying machine. By using this reset switch also to release a well-known machine holding relay operable when copy paper jams, the intricacy of the operation of the reset switch may be reduced. If design is made such that +E is turned off when the housing is opened to repair the disordered part, LED and alarm lamp $PL_1$ are not turned off by opening the main switch alone, thus eliminating malfunctioning. Also, design is made such that in the operative condition of the relay $K_1$, copying (exposure) operation is not started even if the copy button is depressed and, when the relay $K_1$ is operated during the copying, the copying is immediately interrupted and the drum is stopped with the output signal from control portion $Q_1$ as the operation stopping output, thereby turning off the apparatus lamp. Also, if the place of trouble is one which does not require the other operating loads to be deenergized, it is possible to return the optical system to its initial stop position and prevent it from moving forward again even if the relay $K_1$ is operated, or to stop the rotation of the drum after the drum has continued its rotation so that the drum surface may be electrically or physically cleaned by the discharger or by the cleaner.

(Control of the shift to the Safe Side)

Figure 27:
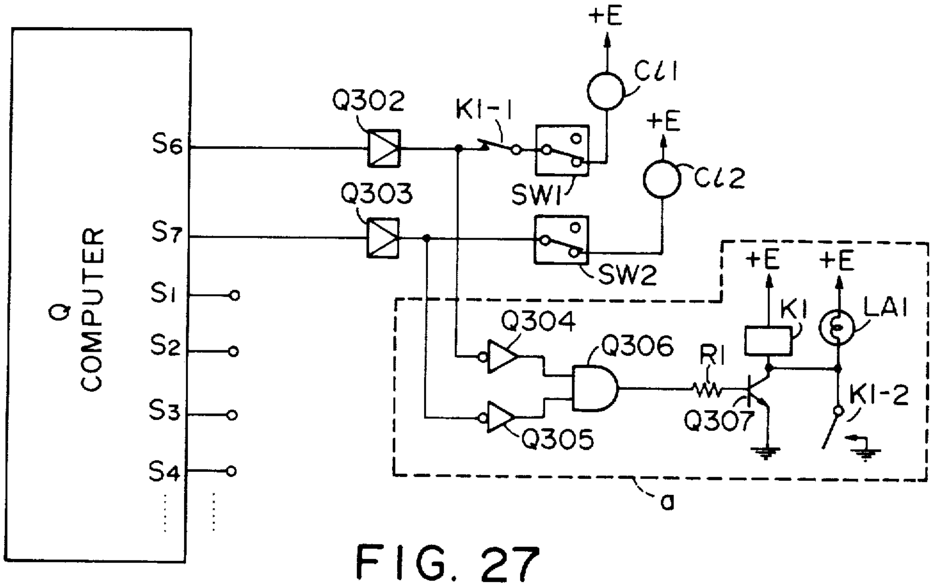
FIG. 27 shows a safe operation circuit.
Figure 28:
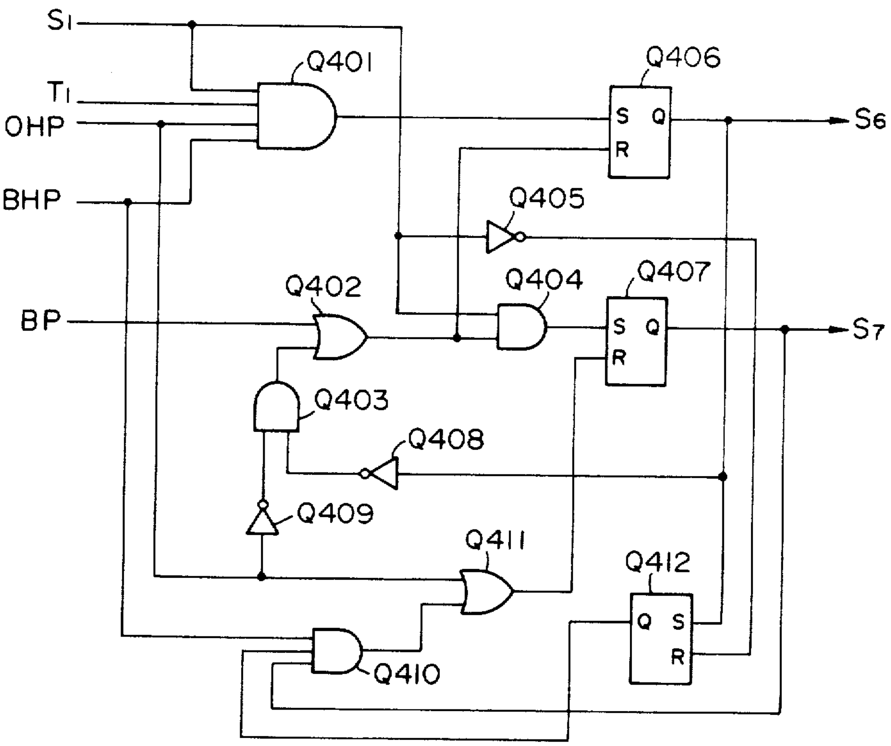
FIG. 28 shows a soft stop circuit.

In FIG. 27, when forward movement signal $S_6$ is generated from the control circuit Q, hammer driver $Q_{302}$ is energized to energize optical system forward movement clutch $Cl_1$. Likewise, when backward movement signal $S_7$ is generated, hammer driver $Q_{303}$ is energized to energize optical system backward movement clutch $Cl_2$. A microswitch SW1 preventing over-running of the optical system during its forward movement and a microswitch SW2 for preventing over-running of the optical system during its backward movement, which are provided at the positions shown in FIG. 1, are series-connected to the clutches $Cl_1$ and $Cl_2$ in the circuit diagram.

Now, if $Q_{301}$ becomes abnormal during the forward movement of the optical system and forward movement signal $S_6$ remains set or if the hammer driver $Q_{302}$ becomes abnormal and remains energized, there is a danger that the optical system unit 15, 16, 17 does not move backwardly at the reversal position but overruns and collides with the barrier wall 51 so that the optical system unit is damaged and therefore, the microswitch SW1 is operated and connected to the upper terminal to deenergize the forward movement clutch $Cl_1$. When the optical system unit becomes abnormal during its backward movement, the microswitch $SW_2$ is likewise operated to deenergize the backward movement clutch $Cl_2$.

Further, as is apparent from the timing chart of FIG. 5, forward movement signal $S_6$ and backward movement signal $S_7$ are not put out simultaneously, but when these signals $S_6$ and $S_7$ act simultaneously, the apparatus is brought into a dangerous condition and this is always monitored by a monitoring circuit a.

If the signal $S_7$ is put out when the signal $S_6$ is being put out or if the signal $S_6$ is put out when the signal $S_7$ is being put out, namely, if the signals $S_6$ and $S_7$ are put out simultaneously, both the outputs of inverters $Q_{304}$ and $Q_{305}$ become H and so, the output of AND gate $Q_{306}$ becomes H to turn on transistor $Q_{307}$ and energized relay $K_1$. At the same time, lamp LA1 is turned on to inform of the abnormality of the control circuit Q. When the relay $K_1$ is energized, its normally open contact is closed to hold the relay $K_1$ while its normally closed contact $K_{1-1}$ is opened to deenergize the forward movement clutch $Cl_1$ and only the backward movement clutch $Cl_2$ is energized to return the optical system unit to the aforementioned initial stop position.

As noted above, when two loads such as foward movement clutch and backward movement clutch which usually should not be driven simultaneously are going to be driven simultaneously, the circuit of FIG. 27 is operating to shift at least one of the loads to the safe side to inhibit the simultaneous driving. By so constructing the circuit, the machine may be prevented from falling into an unexpected situation. Further, by setting the other load to drivable condition, the machine can be put into a predetermined condition.

(Soft Stop Control)

Figures 1, 29:
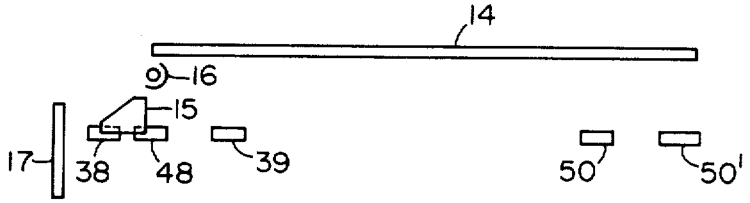
Figures 2, 29:
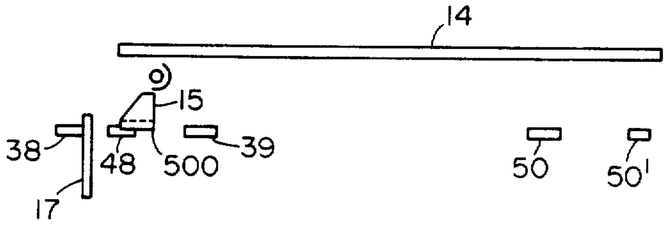
Figures 3, 29:
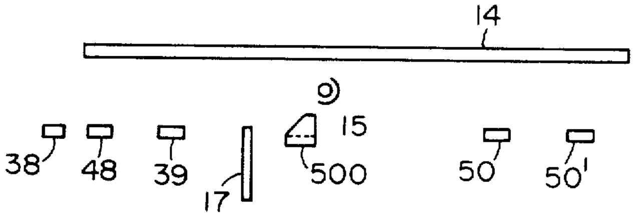

As shown in FIG. 29-1, the magnet on the first mirror is at rest on 38 and 48. When the magnet has left the sensor 38 after the mirror has been started, a rated voltage is applied to a clutch to forwardly move the mirror with a predetermined force and thereby start the exposure. At this time, the signal of the read switch 48 at the back home position changes from 1 to 10 but this does not affect the control system. As soon as the optical system reaches the read switch after completion of the exposure scanning, a signal is generated to reset flip-flop $Q_{406}$ through gates $Q_{402}$ and $Q_{404}$ and turn off forward movement signal $S_6$ and clutch voltage. At the same time, flip-flop $Q_{407}$ is set and backward movement signal $S_7$ is put out from port Q to supply a voltage to backward movement clutch $CL_2$. At this time, as is the case with forward movement clutch $CL_1$, a monotonously increased voltage is supplied to prevent the vibration which would otherwise occur during the energization of the clutch. The optical system moves backwardly at a velocity double that of the forward movement. In the course of the backward movement, the magnet operates the sensor 40 by a variation in magnetic field and the Hall element 40 puts out BHP signal (=1). The output of the output port Q of flip-flop $Q_{412}$ and backward movement signal $S_7$ are applied to the inputs of gate $Q_{410}$. The flip-flop $Q_{412}$ is putting at 1 because it is not reset unless main drive signal $S_1$ becomes 0. Accordingly, the inputs of the gate $Q_{410}$ all become 1 when the optical system has reached the back home position, and therefore flip-flop $Q_{407}$ is reset through gate $Q_{411}$ to turn off the backward movement signal $S_7$. Consequently, the voltage to the backward movement clutch $CL_2$ is interrupted and the optical system is now moved only by inertia and quietly comes to a halt at the initial stop position. It is also possible to bring a brake shoe into contact with the movable portion of the optical system at the back home position to thereby effect control operation. The distance between the back home position and the stop position is determined by the weight of the optical system and the velocity of the backward movement, and is set to a length required for the optical system to reach the stop position without imparting any shock after deenergization of the clutch. The resist sensor 39 puts out resist signal RG when actuated by the passage of the magnet, and turns on second resist roller drive signal $S_4$ to rotate the second resist roller and effect registration between the copy paper and the drum toner image. When the optical system has come to the stop position 38, the signal $S_4$ is turned off to stop the second resist roller from rotating and contribute to the next resist operation.

Before the electrical treating portion and control portion of the copying machine are connected to the power source. there may occur a case where the optical system has been moved to the neighborhood of the back home position or more toward the reversal position by the operation such as movement of the body or the like (see FIGS. 29-2 and 29-3).

Before the copying is started, backward movement control is effected to return the optical system to the stop position, but the backwardly moving force has already been nulled in the vicinity of the back home position and therefore, in some cases, the optical system may not return to the stop position 38. Compensation of such inconvenience will be desired hereinafter.

When the main switch is closed and the copy button is depressed, one input of gate $Q_{404}$ is rendered to 1 by drive signal $S_1$. When the optical system is deviated from the stop position 38 and lies near the back home position (FIG. 29-2), signal OHP is 0 and therefore, 1 is applied to one input of gate $Q_{403}$ through an inverter. Since forward movement signal $S_6$ is also still 0, 1 is applied to the other input of the gate $Q_{403}$ through an inverter. Accordingly, the output of the gate $Q_{403}$ becomes 1, which is put out to gate $Q_{404}$ through OR gate $Q_{402}$. Since one input of the gate $Q_{404}$ is 1 as already noted, flip-flop $Q_{407}$ is set to turn on backward movement signal $S_7$ and operate backward movement clutch $CL_2$ as already described. At this time, back home signal BHP is 1, but forward movement signal $S_6$ is not yet put out and thus, the output Q of flip-flop flop $Q_{412}$ remains to be 0 and accordingly, the reset signal for flip-flop $Q_{407}$ passed through gates $Q_{410}$ and $Q_{411}$ is 0 and does not affect backward movement signal $S_7$.

Likewise, when the optical system is deviated from the back home position toward the reversal position as shown in FIG. 29-3, no variation occurs to the flip-flop $Q_{412}$ even if the back home sensor 48 is actuated during the return of the optical system before exposure is started, and therefore the signal through gates $Q_{410}$ and $Q_{411}$ does not become 1. Consequently, flip-flop $Q_{407}$ is not reset and therefore, backward movement signal $S_7$ is present even if the sensor 48 is actuated.

When the optical system reaches the stop position by the backward movement signal in this manner, the flip-flop $Q_{407}$ is reset by 1 of stop position signal OHP through the gate $Q_{411}$. Accordingly, the backward movement signal $S_7$ is turned off and the voltage of the clutch $CL_2$ is cut off. The R port of each flip-flop is a port for resetting the flip-flop by the input thereto. This return movement differs from the backward movement after the exposure scanning in that the optical system is only moved over a short distance and therefore, there is little or no influence resulting from the collision of the optical system against the terminal end. If the optical system has been moved near the reversal position, it is also possible to deenergize the clutch at the back home position as during the backward movement stroke when a predetermined backward movement time is required for the return.

When the backward movement signal $S_7$ is turned off after said return, the lamp is turned on and forward movement is started by the timing signal resulting from the drum rotation. Accordingly the number $n_1$ of clocks forming the lamp turn-on signal corresponds to the maximum time required for the initial setting by the above-described return movement. Here, substantially one full rotation of the drum is enough. During such rotation, the drum surface may be electrostatically and physically cleaned in advance.

When said main switch is closed, it is also possible to detect whether or not the optical system is present at the stop position and effect the aforementioned return control. In that case, use is made of signal SWS (FIG. 9) resulting from the closing of the main switch, instead of the input signal $S_1$ to gate $Q_{404}$.

The reversal position 50 may also be such as shown at 50' in the Figure in accordance with the copy size and in the case of such a short distance stroke, the shock at the terminal end of the backward movement is so small that the clutch off control by the back home position can be omitted. It is optimal to vary the clutch voltage in accordance with this reversal position, namely, to render the voltage lower for a shorter stroke. Also, in an apparatus wherein high-speed exposure is effected, inconvenient influence resulting from collision occurs at the terminal end of exposure as well. Accordingly, it is also possible to provide a sensor for energizing the backward movement clutch with some delay from the position of the sensor for deenergizing the forward movement clutch $CL_1$, namely after the idle movement by inertia force.

(Feed Slip Prevention)

In the present embodiment, to prevent a phenomenon of feed slip, the first resist roller 29 is controlled by the use of sensors 36 and 37 (for detecting inclination of copy paper and for detecting a paper feed error) provided ahead of the first resist roller 29. That is, copy paper is fed by the paper feed roller 28 and conveyed by the first resist roller 29, which is stopped in a predetermined time $T_4$ after the sensor 36 has detected the leading edge of the copy paper. By such means, slip of the copy paper resulting from the material of the copy paper and the resist roller may be absorbed.

Figure 30:
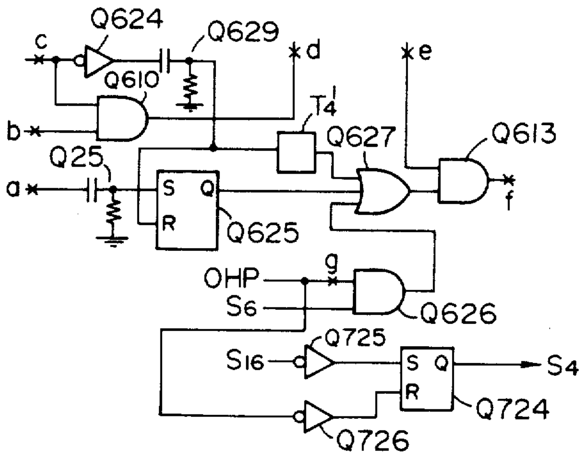
FIG. 30 shows another forward roller control circuit.

This resist control will be described by reference to the circuit diagram of FIG. 30 which is a diagram obtained by arranging FIG. 20. In FIG. 30, a-f designate the circuit replacing the circuit within a-f of FIG. 20. The circuit of FIG. 30 includes an inverter $Q_{624}$ for operating timer $T_4$, a flip-flop $Q_{625}$ for operatively controlling the first roller 29, a gate $Q_{626}$ to which the operation signal of the first roller is applied as input, and an OR gate $Q_{627}$ for operating the first roller. First resist signal S is produced after paper feed signal $S_2$. In FIG. 30, when the first resist signal is produced, the signal is applied to the set terminal of the flip-flop $Q_{625}$ through a differentiation circuit $Q_{29}$ and output Q becomes H level, and the high level signal is applied to one input of AND gate $Q_{613}$ through the gate $Q_{627}$ while, on the other hand, the other input of the AND gate $Q_{613}$ is at H level and therefore, the output of $Q_{613}$ also becomes H level turn on transistor $Q_{618}$ and energize a first resist clutch Cl, thus starting rotation of the first resist roller. When the first resist roller starts rotating, copy paper is conveyed by being nipped and the leading edge of the copy paper is detected by sensors 36. There such sensors 36 are provided to detect inclination or the like of the copy paper. When one of these sensors detects the leading edge of the copy paper, H level signal is applied to the input of NOR gate $Q_{609}$. Thereupon, the output of the NOR gate $Q_{609}$ becomes 0 and the input of inverter $Q_{624}$ becomes H level, and the signal is applied to the reset terminal of $Q_{25}$ and timer circuit T4' through the differentiation circuit. That is, the function of the timer T4' is to drive the first resist roller during a predetermined time after the sensor 36 has detected the leading edge of the copy paper. The output of the timer T4' is connected to the OR gate $Q_{627}$ and further to the input of AND gate $Q_{613}$. The output of gate $Q_{26}$ is connected to the other input of $Q_{627}$, and optical system stop position signal OHP and optical system forward movement signal are applied to the input terminal of $Q_{626}$ to energize a clutch for operating the first resist roller in the timing chart of FIG. 3.

The timing of the timer T4' is such that the paper is stopped before it reaches an intermediate 30'. Accordingly, when one of the sensors 36 has detected the paper with the timer T4' as 0, the first resist roller 29 may also be stopped. Also, the timing at which the optical system starts scanning may be determined on condition that the sensor 36 has detected the paper. That is, it is also possible that the forward movement is started in a predetermined time after the paper has been detected.

In the present invention, as has been described, paper feed is controlled after the feeding member provided between the feed rollers has been detected and therefore, there is no possibility of creating image misregistration which could otherwise result from the slip of the feed rollers in case of smooth-surfaced paper.

(Timing Adjustment)

Figure 31:
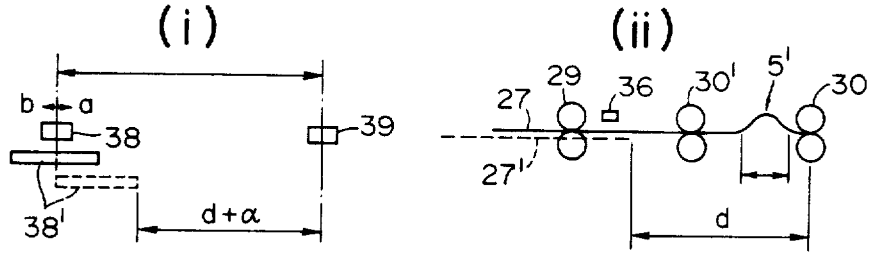
FIG. 31 is an explanatory diagram for a reciprocating path sensor.

The position of copy paper 27 at the timing T1 of FIG. 5-2 is the position indicated by broken line in FIG. 31 (ii). At timing T2, the copy paper 27 is conveyed to the second resist roll 30 through intermediate roll 30' and, since the second resist roll 30 is not rotating, a loop 5' is formed to correct the inclination of the copy paper 27. If the flexure of the loop 5' is small, correction of the inclination is impossible and if the flexure of the loop 5 is great, paper jam will be induced. In the present embodiment, the amount of flexure of the loop 5' is determined by the timing T2 of which the rotation of the first resist roll 29 is assumed to the timing at which the second resist roll 30 starts rotating.

The timing T2 at which the first resist roll 29 resumes rotation is the time when the magnet 38' provided on the moving optical system leaves the optical system home position sensor 38 comprising a Hall element. The timing T3 at which the second resist roll 29 starts rotating is the time when the second resist sensor 39 comprising a Hall element has detected the magnet 38'. Also, if, as shown in FIG. 31(ii), the distance from the leading edge of the copy paper 27 at position 27' to the second resist roll 30 is d and, as shown in FIG. 31(i), the distance from the fore end of the magnet 38' to the second resist sensor 39 at the point of time whereat the magnet 38' has left the optical system home position sensor 38 is $d+\alpha$, then the amount of flexure of the loop 5' is expressed as $\alpha$. To adjust this amount of flexure $\alpha$, the position of the optical system home position sensor 38 as the signal source for the reference position of the image formation process sequence is made movable with respect to the direction of movement of the optical system. In FIG. 3(i), if the sensor 38 is moved in the direction a, the amount of flexure $\alpha$ becomes smaller and, if the sensor 38 is moved in the direction b, the amount of flexure $\alpha$ becomes greater.

By the construction as described above, correction of the amount of flexure of the loop becomes possible without deranging the image transfer timing and thus, stable image transfer can be realized. That is, by providing the signal source for the reference position of the image formation process sequence in the path of the reciprocally moving means for effecting the exposure scanning and rendering the position of said signal source adjustable in the direction of the reciprocal movement, the sequence timing of the image formation process can be controlled more accurately. Also, even if the position of the signal source is moved, the signal generation timing only is varied and the entire process sequence is not varied and therefore, the control circuit need not be altered.

Other examples of the feed control circuit are shown in detail in FIGS. 20 and 30.

On the other hand, when the optical system comes to a predetermined position and the magnet 38' energizes the second resist sensor 39, the output signal S16 of the second resist sensor 39 becomes L to set F/F $Q_{724}$ and drive the second resist roll 30.

As the sensor in the path of reciprocal movement, use may of course be made of a microswitch, or a light-receiving element, or a mechanical or optical sensor.

(Original Interchange)

Figure 32:
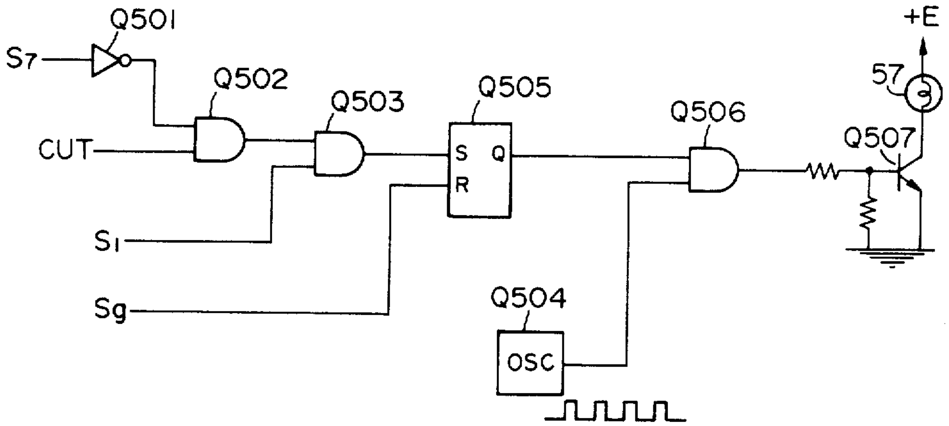
FIG. 32 is a circuit diagram for the reproduction apparatus shown in FIG. 1.
Figure 33:
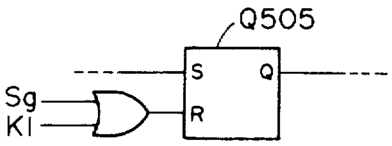
FIGS. 33 and 34 are warning circuits for an image original left in the reproduction apparatus.

FIG. 32 shows another example of the circuit for effecting original interchange.

Before an original is set on the original carrier 14, cover 226 is closed and signal Sg is rendered to 0 by the closing of switch 500, but lamp 57 is not turned on because flip-flop $Q_{505}$ is not yet set. Even if the cover 226 is opened to set an orginal, thelamp 57 is not turned on. After the setting of the dial, when copying is started by depressing the copy button and driving the main motor, signal $S_7$ is put out at the reversal time of the optical system after the first sheet of original has been exposed to light but, since the copy count number is 1, CUT remains to be 0, that is, gate $Q_{502}$ is 0. Accordingly, even if main motor signal $S_1$ is 1, the output of gate $Q_{503}$ is 0 and so, flip-flop $Q_{505}$ is not set. Consequently, the lamp 57 is not turned on. Immediately before the last copy is started, the copy count number becomes coincident with the set number by paper feed signal $S_2$ and so, $CU_1$ becomes 1. Accordingly, upon termination of the last exposure ($S_7$ is 1), the flip-flop $Q_{505}$ is set by gate $Q_{502}$. During the set output thereof, the pulse from circuit $Q_{504}$ passes through gate $Q_{506}$ and therefore, the lamp 57 is turned on and off by transistor $Q_{507}$ in synchronism with the pulse. By this, it is displayed that the set number of copies have been terminated, thus informing the operator of the interchange of the original. When the cover 226 is opened, a microswitch 500 is opened so that Sg becomes 1 and resets the flip-flop $Q_{505}$. Accordingly, the pulse output by gate $Q_{506}$ is stopped to turn off the lamp 57. Since the microswitch 500 is situated near the pivot axis of the cover 226, the switch 500 is not opened unless the cover 226 is completely opened. Accordingly, when the cover 226 has only slightly been opened, the lamp 57 is not turned off and this eliminates the undesirable possibility that the lamp 57 is turned off by vibration or the like to cause the operator to misjudge that the original has been removed. Malfunctioning may be prevented also by installing the switch 500 at an arbitrary position and using, as the switch signal Sg, a signal delayed about 1 second after the opening of the microswitch.

Generally, when depression of the stop key and jam of copy paper take place before the set nuumber of copies have been completed, the then process is completed to stop the main motor, etc., but the count up signal CUT does not become 1 and so, the lamp 57 is not turned on.

After the set number of copies have been completed, signal $S_1$ is turned off to stop the main motor, but flip-flop $Q_{505}$ is set and held and pulse is being put out from $Q_{504}$, so that the lamp 57 is continuedly turned on and off to give a warning on the original left on the original carriage. The warning forms no hindrance against the resumption of the copying.

Figure 34:
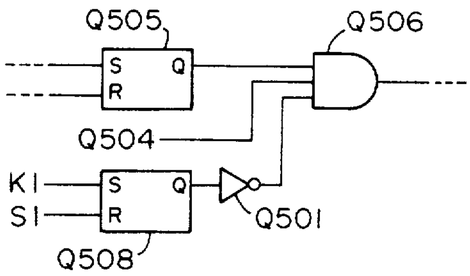
Figure 35:
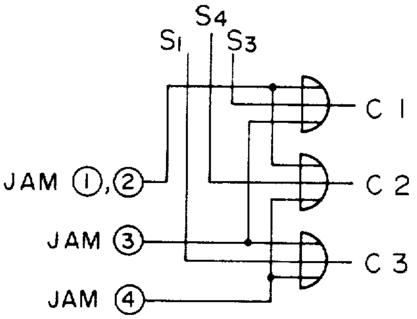
FIG. 35 is a circuit for disposing jam occurred.

It is possible to provide a self-returnable reset key in the operating portion in order to save the trouble of opening the cover 226 when it is desired to again copy an original which has already been copied and to make such a design that the key output is applied as input to the R port of flip-flop $Q_{505}$ (FIG) 33). That is, that key may be depressed (key signal $K_1$) during the turn on and off of the lamp to reset the flip-flop and turn off the lamp 57. Further, that key may be depressed prior to the turn on and off of the lamp to thereby stop the turn on and off of the lamp 57 (FIG. 34). In this case, a flip-flop $Q_{508}$ similar to $Q_{505}$ is provided and this flip-flop $Q_{508}$ is set by key $K_1$ and the output thereof is inverted to 0 by $Q_{501}$ and applied to gate $Q_{506}$. Then, the flip-flop $Q_{508}$ is reset by main motor on signal $S_1$. Accordingly, when the key $K_1$ is depressed, the output of the gate $Q_{506}$ becomes 0 and so, lamp 24 is not turned on and off. This lamp is not turned on and off as long as copying is resumed before the main motor is stopped. However, when copying is resumed after the copying machine has long been left unused with the main motor stopped, the flip-flop $Q_{508}$ is reset by motor signal resulting from the resumed copying and therefore, the lamp 24 is operated upon termination of the copying.

As has been described above, the present invention is so designed that the time during which the original interchangeable is displayed and such display is stopped by the opening-closing of the original cover and therefore, the time required for the operator to carry out copying can be shortened as much as possible and moreover, a warning on a forgotten original can be given.

It is also possible to provide a timer so that the turn on and off may be continued even if the cover is opened and closed for a short time during the turn on and off.

What we claim is:

1. A printing or copying apparatus comprising:

a recording medium;

operable means for forming an image on said recording medium;

means for generating a first signal required for the timing operation of the operable means;

key means for entering an instruction for controlling execution of image formation;

first control means for controlling the operable means in accordance with said first signal and for controlling said operable means to stop repetitive image formation before completion thereof in accordance with an improper state in the apparatus, said first control means comprising a memory for storing a program for operation control of said operable means for image formation; and second control means, distinct from said first control means, for controlling said first control means in accordance with said key instructing means for controlling the execution of image formation, said second control means comprising a memory for storing a program for entry of a said instruction from said key means and for operation control of said first control means; said first control means further controlling said second control means to enable entry of said key means instruction into said second control means.

2. A printing or copying apparatus according to claim 1 wherein said key means comprises numerical key means for setting a number for repeat execution of image formation, wherein said second control means controls the first control means in accordance with the key means for repeat operation of the operable means.

3. A printing or copying apparatus according to claim 1 or 2 wherein said program comprises a main and a sub-program, said first or second control means comprises an input port for interrupting the execution of the main program and for executing the sub-program in accordance with other control means.

4. A printing or copying apparatus according to claim 1, wherein said second control means inhibit said entry after the suspension caused by said improper state.

5. A copying or printing apparatus comprising:

a recording medium;

operable means for forming an image on said recording medium;

means for generating a first signal required for the execution of image formation;

means for generating a second signal for stopping repetitive execution of image formation;

first control means for controlling said operable means to operate in sequence in response to said first signal, said first control means comprising a memory for storing a program for operation control of said operable means; and second control means, distinct from said first control means, for controlling said first control means in response to said second signal to stop operation of the operable means, said second control means comprising a memory for storing a program for entry of the second signal and for operation of said first control means, either one of said first and second control means further being operative to control the other thereof to execute sequential processing at a predetermined timing, said first control means being operative to control the operable means to stop repeat operations at a predetermined point of a sequence in accordance with the second control means.

6. A printing or copying apparatus according to the claim 5 further comprising means for setting the number for repeat operation, said second control means controls the first control means in accordance with the setting means for repeat operation of the operable means.

7. A printing or copying apparatus according to the claim 6 wherein said first control means controls the second control means to enable the entry operation of the setting means.

8. A printing or copying apparatus according to claim 6 wherein said second control means holds the number related to the repeat operations of image formation during the interruption, and enables the execution of the remaining number of repeat operations after the interruption.

9. A printing or copying apparatus according to claim 5, wherein said first control means control said second control means to inhibit a key entry to the second control means during image formation.

10. A printing or copying system comprising:

a recording medium;

first and second operable means for forming an image on said recording medium, said first operable means being associated with copy production, said second operable means being associated with supporting the copy production;

first and second detecting means for detecting factors required for the execution of image formation, said first and second detecting means detecting states of said first and second operable means, respectively;

means for generating an instruction signal for controlling the execution;

first control means for controlling the first operable means in accordance with the first detecting means, said control means comprising a memory for storing a program for operation control of said first operable means for image formation;

second control means for controlling the second operable means in accordance with the second detecting means for increasing the functions of the apparatus, said second control means comprising a memory for storing a program for operation control of said second operable means; and third control means for controlling said first control means and second control means in response to an instruction signal from said signal generating means and a signal from said first and second control means for controlling operation of the first and second operable means, said third control means comprising a memory for storing a program for operation control of the first and the second control means;

said second and third control means being operative wherein at least one of said second and third control means provides the other of said second and third control means with a signal enabling operation of one of said first and second operable means in response to a state of the other of said first and second operable means.

11. A printing or copying apparatus according to the claim 10, wherein said first operable means includes means for feeding the recording medium to an image forming station and said second operable means includes means for feeding an original automatically to an original exposing station.

12. A printing or copying system according to the claim 10, wherein said signal generating means includes a instructing key, said first control means and said second control means control said third control means for enabling the entry operation of said instructing key.

13. A printing or copying apparatus comprising:
operable means for forming an image;
manual input means for producing an instruction;
first control means responsive to said input means for controlling said operable means in sequence to form an image repetitively; and
second control means, distinct from said first control means, for controlling said first control means in accordance with said input means for controlling the execution of image formation, said second control means comprising a memory for storing a program for entry of a said instruction from said input means and for operation control of said first control means;
said first control means further controlling said second control means to enable entry of said input means instruction into said second control means, wherein said instruction entry is inhibited during image formation but is permitted before completion of operation of the operable means.

14. Apparatus according to claim 13, wherein said instruction entry is inhibited during repetitive image formations.

15. Apparatus according to claim 14, wherein one of said stopping means includes key input means for stopping the image formation and another of said stopping means includes detecting means for detecting an improper state of the apparatus.

16. Apparatus according to claim 13, wherein said operable means includes a rotatable member on which an image is formed, and wherein said instruction entry is permitted during a rotation of said rotatable member for cleaning thereof.

17. Printing or copying apparatus comprising:
operable means for forming an image;
manual input means for producing an instruction;
means for detecting an improper state of the apparatus;
first control means responsive to said input means for controlling said operable means in sequence to form an image repetitively; and
second control means, distinct from said first control means, for controlling said first control means in accordance with said input means for controlling the execution of image formation, said second control means comprising a memory for storing a program for entry of a said instruction from said input means and for operation control of said first control means;
said first control means further controlling said second control means to enable entry of said input means instruction into said second control means, wherein said instruction entry is inhibited during suspension or prevention of the image formation caused by an improper state detected by said detecting means.

18. Apparatus according to claim 17 wherein said suspension or prevention occurs in response to the jamming of a copying sheet.

19. Printing or copying apparatus comprising:
operable means for forming an image;
manual input means for producing an instruction;
means for detecting a plurality of different kinds of improper states of the apparatus;
first control means responsive to said input means for controlling said operable means in sequence to form an image; repetitively; and
second control means for entering said instruction from said input means for controlling the execution of image formation, said second control means comprising a memory for storing a program for entry of a said instruction from said input means, wherein said instruction entry is inhibited after an improper state detected by said detecting means but permitted after another improper state detected by said detecting means.

20. Apparatus according to claim 19 wherein said modes of detected improper states comprise a mode caused by a detected jamming of a copying sheet and a mode caused by a detected shortage of a copying sheet.

21. Printing or copying apparatus comprising:
operable means for forming an image;
manual input means for producing an instruction;
means for selecting an image formation mode;
first control means responsive to said input means for controlling said operable means in sequence to form an image repetitively; and
second control means for entering said instruction from said input means for controlling the execution of image formation, said second control means comprising a memory for storing a program for entry of said instruction from said input means, wherein said instruction entry is inhibited in an image formation mode selected by said selecting means but is permitted in another selected image formation mode.

22. Apparatus according to claim 21 wherein one of said copying modes comprises a mode in which a higher priority copying is performed during an interruption of a lower priority copying.

23. Apparatus according to claim wherein one of said copying modes comprises a mode in which copying is performed after an automatic document feeding device has been set.

24. Printing or copying apparatus comprising:
operable means for forming an image;
manual input means for producing an instruction different from an instruction to start an image formation;
means for detecting an improper state of the apparatus;
first control means responsive to said input means for controlling said operable means in sequence to form an image repetitively; and
second control means for entering said instruction from said input means for controlling the execution of image formation, said second control means comprising a memory for storing a program for entry of said instruction from said input means wherein said instruction entry is inhibited after suspending or preventing image formations caused by an improper state detected by said detecting means but is permitted after release of said preventing state.

25. Printing or copying apparatus comprising:
operable means for forming an image;
manual input means for producing an instruction;
a plurality of means for suspending the image formation;
first control means responsive to said input means for controlling said operable means in sequence to form an image repetitively; and second control means for entering said instruction from said input instructing means for controlling the execution of image formation, said second control means comprising a memory for storing a program for entry of said instruction from said input means, wherein said instruction entry is inhibited after suspension caused by one of said suspending means but is permitted after suspension caused by another of said suspending means.

26. Apparatus according to claim 25, wherein one of said suspending means includes an interrupt key for interrupting the repetitive image formation before completion thereof.

27. Printing or copying apparatus comprising:

operable means for forming an image;

a plurality of kinds of manual input means for producing an instruction;

first control means responsive to said input means for controlling said operable means in sequence to form an image repetitively; and second control means for entering said instruction from any one of said input means for controlling the execution of image formation, said second control means comprising a memory for storing a program for entry of said instruction from said one of said input means, wherein each of said instruction entries is inhibited each different time in accordance with the kind of said input means.

28. A printing or copying system comprising:

a recording medium;

first operable means being associated with copy production;

second operable means being associated with copy production;

detecting means for detecting factors required for the execution of image formation;

means for generating an instruction signal for controlling the execution of image formation;

first control means for controlling the first operable means in accordance with the detecting means, said control means comprising a computer for storing a program for operation control of said first operable means for image formation;

second control means for controlling the second operable means for increasing the functions of the apparatus, said second control means comprising a computer for operation control of said second operable means; and third control means for entering said signal generating means for controlling operation of at least one of said first and second operable means, said first and second control means being operative wherein at least one of said first and second control means is associated with the third control means for enabling operation of one of said first and second operable means in response to a state of the other of said first and second operable means.

29. Printing or copying apparatus comprising:

operable means for forming an image;

a plurality of manual input means for producing instructions;

a plurality of means for stopping the operation of the operable means before completion of the image formation;

first control means responsive to said input means for controlling said operable means in sequence to form an image; and second control means for entering said instructon from said input instructing means for controlling the execution of image formation, said second control means comprising a memory for storing a program for entry of said instruction from said input means, wherein said instruction entry is inhibited after stoppage caused by another of said stopping means, and wherein another of said instruction entries is permitted after stoppage caused by said one of said stopping means.

30. A copying device comprising:

first operable means for forming an image on a sheet;

second operable means for feeding a document to an exposing system;

means for generating a common signal to determine operation timings both for said first and said second operable means;

first control means for controlling the first operable means for image reproduction of the document image in accordance with one of said signals;

second control means for controlling the second operable means for feeding and ejecting the document in accordance with another of said signals;

each of said first and said second control means comprising a memory for storing a program for the operation control of the operable means, and both said first and said second control means being associated with a common signal of said signal generating means.

31. A copying system comprising:

first operable means for forming an image on a sheet;

second operable means for feeding a document to an image exposing station;

means for generating signals to detect improper operational states in the system;

first control means for controlling the first operable means for image reproduction of the document image and stopping the image reproduction before completion thereof according to the detection of one of said improper states; and second control means for controlling the second operable means for feeding and ejecting the document and preventing the feeding or ejecting thereof according to the detection of another said improper state;

each of said first and said second control means comprising a memory for storing a program for the operation control of the operable means, and both said first and second control means being associated with the signal of the signal generating means.

32. A system according to claim 31, wherein said signal generating means includes means for sensing the document, and said improper state is detected with the aid of said document sensing means.

33. A system according to claim 31, wherein said signal generating means includes means for sensing the sheet, and said improper state is detected with the aid of said sheet sensing means.

34. A printing or copying system comprising:

first operable means for forming an image on a sheet;

second operable means for sorting the sheets transported after the image formation thereon;

means for generating a signal according to sensing of the sheet transported after the image formation;

first control means for controlling the first operable means for image formation in accordance with said signal generating means; and second control means for controlling the second operable means to sort the sheets transported in accordance with said signal generating means which is associated with said control means, each said first and second control means comprising a memory for storing a program for the operation control of the operable means.

35. A printing or copying system comprising:

first operable means for forming an image on a sheet;

second operable means for sorting sheets transported after the image formation;

means for generating a signal to detect an improper state in the system;

first control means for controlling the first operable means for image formation and for preventing image formation upon detection of the improper state; and second control means for controlling the second operable means for sorting the sheets transported in accordance with said signal generating means which is associated with first control means, each said first and second control means comprising a memory for storing a program for the operation control of the operable means.

36. A system according to claim 34 or 35, wherein said second control means comprises a computer associated with said signal generating means for the operation control of said second operable means.

37. A system according to claim 34 or 35, wherein said first control means has a memory for storing a program for the operation control of the first operable means.

38. An apparatus according to claim 34 or 35, wherein said signal is for detecting a jamming of the sheets, and said first control means stops the image formation before completion of repetitive image formations in response to said jamming.

* * * * *

CERTIFICATE OF CORRECTION

PATENT NO. : 4,530,063

DATED : July 16, 1985

INVENTOR(S) : SHUNICHI MASUDA, ET AL.

It is certified that error appears in the above-identified patent and that said Letters Patent is hereby corrected as shown below:

COLUMN 1, line 17, change "verstile" to read --versatile--.
line 53, after "on" insert --a--.
lines 54 and 67, change "sheet" to read --sheets--.

COLUMN 2, line 29, change "withing" to read --within--.
line 31, change "at" to read --which is--.

COLUMN 3, line 16, after "machine" insert --which--.
line 20, change "other" to read --another--.

COLUMN 6, line 43, change "circuit" to read --circuits--.

COLUMN 7, line 64, change "is cleaned its surface" to read --has its surface cleaned--.

COLUMN 8, line 1, delete "a" (second occurrence).
line 20, change "are" to read --is--.

COLUMN 9, line 48, before "a" insert --is--.

COLUMN 10, lines 18, 20 and 22, before "a" insert --is--.

COLUMN 12, line 1, change "overlook" to read --an oversight--.

COLUMN 13, line 10, change "other occasion" to read --occasions other--.

COLUMN 15, line 52, change "key" to read --keys--.

COLUMN 16, line 12, after "10-key" insert --which--.

COLUMN 17, line 27; COLUMN 18, line 32; and COLUMN 23, line 9, change "upto" to read --up to--.

UNITED STATES PATENT AND TRADEMARK OFFICE

CERTIFICATE OF CORRECTION

PATENT NO. : 4,530,063

DATED : July 16, 1985

INVENTOR(S) : SHUNICHI MASUDA, ET AL.

It is certified that error appears in the above-identified patent and that said Letters Patent is hereby corrected as shown below:

COLUMN 18, line 33, after "ADF," insert --and--.

COLUMN 19, line 8, change "This" to --These--.

COLUMN 20, line 39, change "proper" to read --paper--.

COLUMN 22, line 38, before "connector" insert --the--.
line 41, change "DWS" to read --DSW--.

COLUMN 23, line 40, change "are" to read --at--.
line 57, change "to produce" to read --produces--.

COLUMN 24, line 32, change "change" to read --changes--.

COLUMN 26, line 50, change "withdrawl" to read --withdrawal--.

COLUMN 27, line 32, change "key entry" to read --key-entry--.
line 50, change "D/F" to read --DFE--.
line 57, change "creminated" to read --criminated--.

COLUMN 28, line 22, change "DF" to read --DFE--.
line 38, delete "fine".

COLUMN 29, line 20, change "cancel" to read --cancels--.
line 25, change "has" to read --have--.

COLUMN 30, line 13, change "DFF" to read --DFE--.

COLUMN 31, line 23, change " = " to read -- - --.
line 29, change "AFF" to read --ADF--.
line 62, change "threfore" to read --therefore--.

COLUMN 32, line 40, change "putput" to read --put out--.

UNITED STATES PATENT AND TRADEMARK OFFICE

CERTIFICATE OF CORRECTION

PATENT NO. : 4,530,063

DATED : July 16, 1985

INVENTOR(S) : SHUNICHI MASUDA, ET AL.

It is certified that error appears in the above-identified patent and that said Letters Patent is hereby corrected as shown below:

COLUMN 33, line 2, change "affected" to read --effected--.
lines 18 and 19, after "24" insert --,--.
line 24, change "ffect" to read --effect--.
line 36, change "accurred" to read --occurred--.
line 61, change "other special time zone" to read --special time zone other--.

COLUMN 34, line 21, change "This" to read --That--.
line 22, after "applied" insert --as--.

COLUMN 35, line 27, change "sc" to read --so--.

COLUMN 37, line 4, change "have" to read --has--.
line 44, change "it waits up" to read --the occurrence of--.

COLUMN 38, lines 3, 4, 35, 43, 44; COLUMN 39, line 34; COLUMN 41, line 51; COLUMN 42, line 14, COLUMN 43, lines 15, 17 and 48; COLUMN 47, lines 12, 15, 33, 38, 45, 48; COLUMN 52, lines 19, 21, 22, 25, 26; COLUMN 53, lines 53, 56, 58, 62, 63; COLUMN 54, lines 3, 5, 12, 13, 14, 25, 33, 38, 55, 56, 63, 64; and COLUMN 55, lines 1, 2, 6, 8, 39, 40, 41, change "resist" to read --register--.

COLUMN 38, line 24, delete "lhing".

COLUMN 39, line 19, change "stop-page" to read --stoppage--.
line 43, change "According" to read --Accordingly--.
lines 47 and 58, delete "then".
between lines 63 and 64, insert the sub-heading --(Key Entry Conditions)--.

UNITED STATES PATENT AND TRADEMARK OFFICE

CERTIFICATE OF CORRECTION

PATENT NO. : 4,530,063 Page 4 of 5

DATED : July 16, 1985

INVENTOR(S) : SHUNICHI MASUDA, ET AL.

It is certified that error appears in the above-identified patent and that said Letters Patent is hereby corrected as shown below:

COLUMN 41, line 5, change "DEF" to read --DFE--.
line 20, change "after only" to read --only after--.
line 32, change "jusging" to read --judging--.
line 48, before "fed" insert --it is--.
line 54, change "trialing" to read --trailing--.

COLUMN 42, line 12, change "and" to read --an--.
line 13, change "refence" to read --reference--.

COLUMN 43, line 36, change "put" to --puts--.

COLUMN 46, line 65, change "of" to --off--.

COLUMN 50, line 2, before "out" insert --put--.

COLUMN 51, line 3, change "energized" to read --energize--.
line 40, change "drivable" to read --driveable--.

COLUMN 52, line 1, change "is putting at" to read --puts out a--.
line 40, change "desired" to read --described--.
line 56, delete "flop" (second occurrence).

COLUMN 54, line 7, change "$Q_{29}$" to read --$Q_{629}$--.
line 23, change "$Q_{25}$" to read --$Q_{625}$--.
line 29, change "$Q_{26}$" to read --$Q_{626}$--.

COLUMN 55, line 53, change "thelamp" to read --the lamp--.
line 65, change "$CU_1$" to read --CUT".

COLUMN 56, line 58, after "original" insert --is--.

COLUMN 59, line 27, change "14" to read --29--.

UNITED STATES PATENT AND TRADEMARK OFFICE

CERTIFICATE OF CORRECTION

PATENT NO. : 4,530,063 Page 5 of 5

DATED : July 16, 1985

INVENTOR(S) : SHUNICHI MASUDA, ET AL.

It is certified that error appears in the above-identified patent and that said Letters Patent is hereby corrected as shown below:

COLUMN 60, line 37, after "claim" insert --21--.

COLUMN 62, line 6, after "wherein" insert --one of--; change "entry" to read --entries--.
line 7, after "by" insert --one of said stopping means but is permitted after stoppage caused by--.

Signed and Sealed this

*Twenty-sixth* Day of *August, 1986*

[SEAL]

*Attest:*

DONALD J. QUIGG

*Attesting Officer* *Commissioner of Patents and Trademarks*